(12) United States Patent
Katz et al.

(10) Patent No.: US 8,086,855 B2
(45) Date of Patent: Dec. 27, 2011

(54) ACCESS TO PLMN NETWORKS FOR NON-PLMN DEVICES, AND TO ISSUES ARISING IN INTERFACES IN GENERAL BETWEEN PLMN AND NON-PLMN NETWORKS

(75) Inventors: Eyal Katz, Ramat Gan (IL); Stuart Jeffery, Los Altos, CA (US); Ilan Zorman, Palo Alto, CA (US); Dan Kolkowitz, Los Altos, CA (US); Yair Karmi, Rishon Le Zion (IL); Gil Ben-Noon, San Francisco, CA (US)

(73) Assignee: Flash Networks Ltd., Herzlia-Pituah (IL)

( * ) Notice: Subject to any disclaimer, the term of this patent is extended or adjusted under 35 U.S.C. 154(b) by 1760 days.

(21) Appl. No.: 10/502,791

(22) PCT Filed: May 16, 2002
(Under 37 CFR 1.47)

(86) PCT No.: PCT/IL02/00382
§ 371 (c)(1),
(2), (4) Date: Jul. 20, 2006

(87) PCT Pub. No.: WO02/093811
PCT Pub. Date: Nov. 21, 2002

(65) Prior Publication Data
US 2006/0291455 A1 Dec. 28, 2006

Related U.S. Application Data

(60) Provisional application No. 60/324,914, filed on Sep. 27, 2001, provisional application No. 60/297,798, filed on Jun. 14, 2001, provisional application No. 60/295,561, filed on Jun. 5, 2001, provisional application No. 60/290,963, filed on May 16, 2001, provisional application No. 60/290,961, filed on May 16, 2001, provisional application No. 60/290,960, filed on May 16, 2001, provisional application No. 60/290,959, filed on May 16, 2001.

(51) Int. Cl.
*H04L 9/32* (2006.01)
(52) U.S. Cl. ...................................................... 713/170
(58) Field of Classification Search ........................ None
See application file for complete search history.

(56) References Cited

U.S. PATENT DOCUMENTS 5,887,256 A * 3/1999 Lu et al. ...................... 455/426.1
(Continued)

FOREIGN PATENT DOCUMENTS

GB 2379525 3/2003
(Continued)

OTHER PUBLICATIONS

Pfleger "Using Encryption: Protocols and Practices. Modes of Encryption", Security in Computing, 2nd Ed., p. 168-169, 414, 1996.

(Continued)

*Primary Examiner* — Peter Poltorak
(74) *Attorney, Agent, or Firm* — Smith Risley Tempel Santos LLC; Gregory Scott Smith

(57) ABSTRACT

Interface device for interfacing between a PLMN network and a non-PLMN network, the PLMN network being configured to recognize cellular base stations as nodes thereof through which to mediate connections to cellular mobile devices, the non-PLMN networks each comprising a plurality of access points for mediating connections to network compatible mobile devices, and for which the network compatible mobile devices are not required to be cellular devices. The interface device is configured as a node of the PLMN network to appear to the PLMN network as a standard cellular base station, and comprises functionality to make non-cellular devices connecting to the non-PLMN network and attempting to access the PLMN network through the non-PLMN network appear as cellular devices to the PLMN network.

20 Claims, 31 Drawing Sheets

U.S. PATENT DOCUMENTS

| | | | |
|---|---|---|---|
| 6,104,928 A * | 8/2000 | Waugh | 455/445 |
| 6,138,158 A | 10/2000 | Boyle et al. | |
| 6,192,361 B1 | 2/2001 | Huang | |
| 6,317,830 B1 * | 11/2001 | Stolz | 713/168 |
| 6,515,997 B1 * | 2/2003 | Feltner et al. | 370/401 |
| 6,608,832 B2 * | 8/2003 | Forslow | 370/353 |
| 6,826,414 B1 * | 11/2004 | Reynolds et al. | 455/555 |
| 7,653,200 B2 * | 1/2010 | Karmi et al. | 380/270 |
| 2001/0010714 A1 | 8/2001 | Nemoto | |
| 2001/0034767 A1 | 10/2001 | Aho | |
| 2001/0037254 A1 | 11/2001 | Glikman | |
| 2001/0046215 A1 * | 11/2001 | Kim | 370/329 |
| 2001/0050908 A1 | 12/2001 | Verkama | |
| 2001/0052077 A1 | 12/2001 | Fung et al. | |
| 2002/0012433 A1 * | 1/2002 | Haverinen et al. | 380/247 |
| 2002/0037741 A1 * | 3/2002 | Tjalldin et al. | 455/552 |
| 2002/0039907 A1 * | 4/2002 | McKenna et al. | 455/517 |
| 2002/0071396 A1 * | 6/2002 | Lee et al. | 370/252 |
| 2002/0085540 A1 * | 7/2002 | Hyvarinen et al. | 370/352 |
| 2002/0090089 A1 | 7/2002 | Branigan et al. | |
| 2002/0101859 A1 | 8/2002 | Maclean | |
| 2002/0142761 A1 * | 10/2002 | Wallstedt et al. | 455/416 |
| 2002/0187789 A1 * | 12/2002 | Diachina et al. | 455/452 |
| 2002/0194499 A1 | 12/2002 | Audebert et al. | |
| 2003/0005136 A1 | 1/2003 | Eun | |
| 2003/0021250 A1 | 1/2003 | Willins et al. | |
| 2003/0061503 A1 | 3/2003 | Katz et al. | |
| 2004/0010609 A1 * | 1/2004 | Vilander et al. | 709/230 |

FOREIGN PATENT DOCUMENTS

| | | | |
|---|---|---|---|
| WO | WO 97/45814 | | 4/1997 |
| WO | WO 00/57655 | * | 9/2000 |
| WO | WO 02/093811 | | 11/2002 |

OTHER PUBLICATIONS

Rose "Authentification and Security in Mobile Phones", QUALCOMM Australia, p. 1-6, 1997.

Guthery et al. "GSM SIMs as Web Servers", http://www.scdk.com/websim.pdf, 2000.

* cited by examiner

ACCESS TO PLMN NETWORKS FOR NON-PLMN DEVICES, AND TO ISSUES ARISING IN INTERFACES IN GENERAL BETWEEN PLMN AND NON-PLMN NETWORKS

RELATED PATENT APPLICATIONS

This application is a National Phase Application of PCT/IL02/00382 having International Filing date May 16, 2002, which claims priority from U.S. patent application Ser. No. 09/990,875, filed Nov. 23, 2001; and Provisional Patent Application Ser. No. 60/324,914, filed Sep. 27, 2001; Provisional Patent Application Ser. No. 60/297,798, filed Jun. 14, 2001; Provisional Patent Application Ser. No. 60/295,561, filed Jun. 5, 2001; Provisional Patent Application Ser. No. 60/290,963 filed May 16, 2001; Provisional Patent Application Ser. No. 60/290,961 filed May 16, 2001; Provisional Patent Application Ser. No. 60/290,960 filed May 16, 2001; and Provisional Patent Application Ser. No. 60/290,959 filed May 16, 2001.

FIELD OF THE INVENTION

The present invention relates to providing access to PLMN networks for non-PLMN devices and to issues arising in interfaces in general between PLMN and non-PLMN networks.

BACKGROUND OF THE INVENTION

The demand for high-speed data access is growing rapidly. In the late 90's 28 Kbps was considered fast for wired service. Now even 56 Kpbs is considered slow for wired service with 384 Kpbs considered the norm. With these higher speeds, downloading complex web pages and "rich media" such as streaming video are now practical.

Wireless operators are struggling to offer their customer a wireline type experience on wireless. Today, cellular operators offer their subscribes only limited data and no "rich media" services because they have a limited amount of licensed radio bandwidth. Typical data rates on wireless today are 9.6 Kbps. GPRS will soon raise that to 50 to 80 Kbps (115 Kbps theoretical), but even this is slow compared to wireline's 384 Kbps.

To address this issue, carriers are aggressively trying to obtain additional licensed spectrum and are aggressively pushing the engineering community to find more efficient ways of using the current and anticipated radio allocations. But the results of these actions are several years off and will cost substantial amounts of money.

Unlicensed radio is becoming very popular and very affordable of obtaining high speed wireless access. Unlicensed radio operates in the ISM (Industrial, Scientific and Medical) Bands and is limited to very low power, which means the frequencies can be reused many times over.

IEEE 802.11b is one example of unlicensed technology that is very affordable and very capable, offering speeds of up to 10,000 Kbps. An 802.11b Wireless Local Area Network (LAN) covering a small home or office and supporting 3 computers can be purchased for about $500.00 and the equipment is becoming a standard feature of many computer product lines including Dell and Apple. 802.11b is but one of several Wireless LAN technologies. Others include HomeRF, 802.11x, Bluetooth, etc.

While these technologies were originally developed for Wireless Local Area Networks (WLAN) for office and homes, a new class of service operators are emerging using this technology.

For a fee, these operators are offering public access via 802.11b networks. These networks are being installed at airports, coffee shops, etc and other places where people will use computers for an extended period of time. The present embodiments relate to the question of interfacing between the wireless LANs and the cellular or PLMN networks.

High speed unlicensed and licensed wireless access technologies are now available that will support speeds of 700 Kbps to 10 Mbps and even higher. Examples of these wireless access technologies include Bluetooth and Wireless LANs such as 802.11(x). These networks have sufficiently high speed to support rich media services such as videophones, streaming videos, etc.

PLMN subscribes can use these non-PLMN Access Networks (AN) for high-speed access to rich media services.

In some venues the non-PLMN Access network may be carrying a substantial amount of rich media that is local to the venue. An example would be a sports arena where the predominate rich media source would be near real time playback of game highlights. While this rich media could be delivered via communication through the PLMN, keeping this rich media traffic out of the core network will reduce the burden on that network.

In order to take advantage of such data but additionally be part of the larger, PLMN network, it is necessary to support, in an integrated manner, Peer-to-Peer, Peer to Local Sever and Peer to Off Network connection types in such a way that a single connecting client can take advantage of all of the connection types. This is because subscribes do not want to have multiple terminals, so supporting voice communication is also a key technical requirement.

One of the issues involved in providing such interfacing is in that PLMN type networks are designed to ensure that the only users of the network are devices that can prove that they are authorized holders of unique telephone numbers. The purpose of such design is to ensure that billing can be carried out reliably and correctly, that impersonation of other uses is not possible and that unauthorized access to the network is not in general possible. To this end the cellular telephony devices are either provided with a subscriber identity module (SIM) which is a security chip having secure keys and algorithms to identify the device to the PLMN and which in addition carries out data encryption and decryption, depending on the configuration of the specific network; or they have stored identity data that the system uses in order to authenticate them to the network.

SIMs are physical devices that are secure from duplication and internal inspection, meaning that the data can not be externally read and can not be recovered by dissecting the part.

The SIM is typically in the physical possession of the subscriber and is installed by the subscriber in the device, typically the cellular telephone, that is used for access to the network. This means the access device has a SIM card carrier and reader. The SIM concept is widely used and furthermore allows the subscriber to exchange the device being used to access the network whilst keeping the same identity and telephone number, by simply removing his SIM from the existing device and placing it in the new device SIM based authentication is appropriate for cellular devices connecting directly to the PLMN. However it is also contemplated that users connect to a local non-PLMN network such as a Bluetooth network and from there connect via the cellular network. Furthermore the local non-PLMN network is generally compatible with a wide range of devices, such as portable computers, PDA type devices and the like which are not conventional cellular devices and which are not typically equipped with a cellular identity, SIM or even a SIM card carrier and reader. These devices are collectively designated "non-SIM devices". It is desirable to provide an infrastructure for allowing such non-SIM devices to connect via the local network to the cellular network, or at least to approve their access to other networks e.g. Internet based on their cellular identity.

Furthermore local non-PLMN networks are by their nature very localized. A user may wish to move whilst using one and may easily find himself out of range of any convenient access point. More particularly, mobile users within a small or confined area may get service from a local Access Point (AP) using any technology suitable for short ranges in the order of 10 to 100 meters. Each such AP supports a network of local mobile users. The communication conditions between each user and the AP may vary within a large range as a result of variable propagation path loss, available transmission power, interference level and network loading.

If more than one AP is operational within the area, whether multiple APs are collocated within a single point or they are installed in proximity in separate locations, it may be that the user would be serviced with better communication conditions from a different AP than the one currently being used or considered.

The problem then is to determine whether such an alternative AP is available and get the user to connect to that alternate AP. Such a problem is solved by a range of available procedures known collectively as "handoff".

A different problem occurs when a user is equipped with a dual technology terminal, e.g. cellular and Wireless LAN, cellular and wireline Internet access, etc, and the connection needs to be exchanged from an access point using one technology to an access point using another technology. In this case, the logic usually associated with handoff does not apply; rather, a different approach is required in order to make optimal use of the available communication resources.

Multiple technologies have been proposed to provide network connectivity within a small, confined area. Best known within this group are the 802.11 Frequency Hopping and Direct Sequence Wireless LAN (WLAN) standards and Bluetooth. The standards for these technologies treat the network as stand alone. When a member or potential member of such a network cannot obtain satisfactory data rate from the network Access Point, be it because of deteriorating communication conditions or network loading, one of several negative outcomes may occur from the user standpoint: he may be put on hold, deactivated/dropped from the network or supplied with an unacceptably low data rate. Existing solutions do not support searching for or transferring the user to another network operating in the area, i.e. there is no equivalent to the cellular handoff in which the mobile user is transferred to another Access Point that can satisfy its communication needs.

Furthermore, no standards have been proposed to control the transfer between technologies providing services to these confined areas and technologies associated with wide areas, primarily cellular; or between technologies covering wide areas through wireless and wired connectivity.

It is also necessary to consider authentication for remote connections, for example for authenticating remote transactions or for ensuring that the correct user is billed for remotely provided services, and interfacing is not complete between networks unless one network can be used to provide authentication to users connecting over channels, typically of other networks, which are not secure or over which a user cannot be positively identified.

Currently there are numerous circumstances in which transactions are carried out without the physical proximity of the transacting parties. Such circumstances include ATM transactions, credit card and other transactions made by telephone, and transactions made over the Internet. Generally, the identity of the purchasing party is not established to a high degree in such transactions. The transactions are carried out over unsecured and/or non-authenticatable connections and using communication techniques that are insecure and/or non-authenticatable, allowing users to be impersonated and credit card numbers to be stolen.

Currently, arrangements for electronic payment rely very heavily on credit cards, which make it difficult to levy small charges, such as time charges for use of a network, or small charges for downloading of data items.

Currently there are numerous circumstances in which transactions are carried out without the physical proximity of the transacting parties. Such circumstances include ATM transactions, credit card and other transactions made by telephone, and transactions made over the Internet. Generally, the identity of the purchasing party is not established to a high degree in such transactions. The transactions are carried out over unsecured and/or non-authenticatable connections and using communication techniques that are insecure and/or non-authenticatable, allowing users to be impersonated and credit card numbers to be stolen.

Currently, arrangements for electronic payment rely very heavily on credit cards, which make it difficult to levy small charges, such as time charges for use of a network, or small charges for downloading of data items:

SUMMARY OF THE INVENTION

According to a first aspect of the present invention there is thus an interface device for interfacing between a PLMN network and a non-PLMN network, said PLMN network being configured to recognize cellular base stations as nodes thereof through which to mediate connections to cellular mobile devices, said non-PLMN networks each comprising a plurality of access points for mediating connections to network compatible mobile devices, said network compatible mobile devices not being required to be cellular devices, said interface device being configured as a node of said PLMN network to appear to said PLMN network as a base station thereof and comprising functionality to make non-cellular devices connecting to said non-PLMN network and attempting to access said PLMN network therethrough appear as cellular devices to said PLMN network.

The device preferably comprises a circuit-switched interface for telephony and a packet interface for data and control.

Preferably, said PLMN network is a GSM network having an A interface or a Gb interface and wherein said circuit-switched interface is operable to use said A interface and said packet interface is operable to use said Gb interface.

Preferably, said PLMN network is a UMTS network having an IuCS interface and an IuPS interface and wherein said circuit switch interface is operable to use said IuCS interface and said packet interface is operable to use said IuPS interface.

The device preferably comprises a simulated cellular identity gateway associated with a security layer of said non-PLMN network and operable to determine that a connecting device has been authenticated by said non-PLMN network, and to respond to a PLMN network authentication query to indicate that said authentication has been successful.

Preferably, said simulated cellular identity gateway is a simulated SIM gateway and said PLMN network is a GSM network.

Preferably, said simulated cellular identity gateway is a simulated ESN gateway and said PLMN network is a CDMA network.

Preferably, said non-PLMN security layer is one of a group comprising SSL, Ipsec, TLS, SRP, and SSH, and wherein an authentication of said one of said group is required to permit said simulated SIM gateway to provide said authentication response to said PLMN network.

Preferably, the security layer is configurable to set a desired security level, for example by setting a key length.

The device preferably comprises a vocoder for receiving voice signals from said non-PLMN network for vocoding, and receiving vocoded voice signals from said PLMN network for decoding.

The device preferably comprises a vocoder for receiving partly vocoded signals from said non-PLMN network for vocoding, and receiving vocoded voice signals from said PLMN network for part decoding.

Preferably, the device is configured to appear to said PLMN network as both a serving GPRS support node (SGSN) for packet data and as a base station for circuit switched data.

Preferably, functionality is provided to authenticate a device connecting to said non-PLMN network.

The device preferably comprises functionality to register a device connecting to said non-PLMN network.

The device preferably comprises functionality to update the location of a device connecting to said non-PLMN network.

The device preferably comprises support functionality for allowing a device connecting to said non-PLMN network to generate service requests.

The device preferably comprises functionality to provide said PLMN network with connection control data formatted for said PLMN network to be able to integrate corresponding activity into a consolidated bill.

The device is preferably configured to operate together with a connection management unit of said non-PLMN network, thereby to obtain from said non-PLMN network details of connecting parties and quantity of data exchanged.

The device preferably comprises functionality to format said details obtained into a PLMN compatible format.

The device preferably comprises a cellular identity module associated therewith for providing PLMN security functionality, thereby to allow access via said wireless LAN to a PLMN network.

Preferably, cellular identity module is mounted on said access card.

Preferably, said cellular identity module is reversibly mounted on said access card.

Preferably, said cellular identity module is a SIM.

The device preferably comprises both a SIM carrier and a SIM reader.

Preferably, said cellular identity module is a virtual cellular identity module.

Preferably, said virtual cellular identity module is a virtual module comprising SIM functionality.

The device preferably comprises functionality to exchange authentication signals with a LAN gateway, thereby to achieve network authorization.

Preferably, said authentication signals are formatted to be transferable between said LAN gateway and said PLMN network, thereby to obtain PLMN authorization.

According to a second aspect of the present invention there is provided a method of accessing a PLMN network via a non-PLMN network using a non-PLMN device, comprising:

providing said non-PLMN device with an access card suitable for said non_PLMN network, providing said access card with a cellular identification module, providing said non-PLMN network with gateway functionality to relay cellular identification signals between said non-PLMN device and said PLMN network.

According to a third aspect of the present invention there is provided a method of accessing a PLMN network via a non-PLMN network using a non-PLMN device, comprising:

providing said non-PLMN network with a secure authentication unit for authentication of said non-PLMN device, providing said non-PLMN network with gateway functionality, associated with said secure authentication unit, to operate said authentication unit and to relay cellular identification signals to said PLMN network in response to authentication of said non-PLMN device.

According to a fourth aspect of the present invention there is provided a method of operating a secure gateway between a PLMN network and a non-PLMN network such that a non-PLMN device is authenticatable for a PLMN connection, the method comprising:

authenticating said non-PLMN network via a first authentication protocol, and exchanging signals with said PLMN network via a cellular authentication protocol, comprising indicating device authentication following authentication via said first protocol.

According to a fifth aspect of the present invention there is provided a method of operating a secure gateway between a PLMN network and a non PLMN network, such that a non-PLMN device is authenticatable for a PLMN connection, the method comprising:

exchanging signals with said PLMN network via a cellular authentication protocol thereby to authorize said non-PLMN network to connect to said device.

According to a sixth aspect of the present invention there is provided a handoff manager for managing handoff of a mobile unit communicating using an identifiable session between a first mobile network access point and a second mobile network access point, wherein said first access point belongs to a first network, and said second access point belongs to a second network, said manager being commonly accessible to each network and comprising a mobile unit matcher for performing matching between mobile units having disconnected from one network and mobile units having connected to other networks, and a session maintainer associated with said mobile unit matcher for transferring sessions between units thus matched, thereby to handoff between networks.

The handoff manager preferably comprises a unit at a single location.

The handoff manager preferably comprises distributed functionality located at a plurality of intra-network or inter-network nodes.

Preferably, one of said networks is a PLMN network.

Preferably, one of said networks is a wireless LAN network.

Preferably, one of said networks is a wireless LAN network.

The handoff manager preferably comprises a session active management unit for determining from a currently used network when connection quality threshold is not being met, for instructing said mobile unit to search for surrounding networks and determine connection parameters thereof, to identify from said parameters a best network and to instruct said mobile unit to connect to said best network.

Preferably, said session active management unit is associated with said mobile unit matcher, thereby to use said instruction to assist with said matching.

Preferably, said session active management unit is operable to determine whether said instructed match has succeeded and, in the absence of a successful connection, is operable to instruct said mobile unit to connect to a next best network.

Preferably, said session active management unit is operable to continue to instruct said mobile unit to connect to a next best unit until a successful connection is indicated.

The handoff manager preferably comprises a session passive management unit for determining from said mobile unit when connection quality threshold is not being met, for instructing said mobile unit to search for surrounding networks and determine connection parameters thereof, to identify from said parameters a best network and to instruct said mobile unit to connect to said best network.

The handoff manager is preferably operable to instruct said mobile unit to disconnect from a first network and subsequently to connect to a best network.

The handoff manager is preferably operable to instruct said mobile unit to connect to a best network and subsequently to disconnect from a current network.

The handoff manager is preferably operable to reduce a connection quality level at a current network, thereby to force said mobile unit to disconnect therefrom and find another network.

The handoff manager is preferably operable, following a selection of to a best network for reconnection, to reduce a connection quality at a current network, and to send an instruction to said mobile unit to connect to said selected best network.

The handoff manager is preferably operable to provide to said mobile unit identification of potentially available networks.

The handoff manager is preferably operable to provide to said mobile unit network parameters of a potentially available network.

Preferably, said parameters include any one of a group comprising: preferred access channels for a respective PLMN network, identity of proxy IP's for Internet access which are capable of supporting a better distributed SCC architecture, loading conditions of said potentially available networks, general availability parameters of said potentially available networks, network access numbers for Internet access, and information on expected loading conditions of said potentially available network.

Preferably, said first mobile network and said second mobile network are respectively wireless LANs of a single hotspot.

Preferably, said first and said second networks are overlapping networks and a mobile unit for handoff is located at a point of overlap between said networks.

Preferably, said first and said second networks respectively use a same network protocol.

Preferably, said first and said second networks respectively use a different network protocol.

Preferably, said first and said second networks are non-overlapping.

Preferably, said first network and said second network are respectively of different Hot Spots.

Preferably, said different hotspots have a region of overlap and where a mobile device for handoff is located in said region of overlap.

Preferably, said hotspots utilize a single communication protocol.

Preferably, said hotspots utilize respectively different communication protocols.

Preferably, said first network and said second network are respectively PLMN networks.

Preferably, said first PLMN and said second PLMN network utilize a single communication protocol.

Preferably, said first and said second PLMN network utilize respectively different communication protocols.

Preferably, said first and said second communication network have a region of overlap and wherein a mobile device for handoff is located in said region of overlap.

Preferably, said first network is a wireless local network and said second network is a PLMN network.

Preferably, said wireless local network is located within a region of coverage of said PLMN network.

The handoff manager preferably comprises a priority unit for setting said wireless local network as a higher priority than said PLMN network such that a mobile unit is automatically handed off to said wireless local network when in range thereof.

According to a seventh aspect of the present invention there is provided a method of handoff of a mobile device, communicating in a communication session, said handoff being between access points of a first and a second wireless network respectively, the method comprising:

providing a control point at a location common to both said networks, at said control point determining identities of mobile devices whose connections have been terminated and obtaining data of respective sessions thereof, at said control point determining identities of new connections formed with mobile devices, at said control point matching said identities, thereby to match an existing session with a mobile device that has terminated its connection at a first access point and has reconnected at a second access point.

According to an eighth aspect of the present invention there is provided an authentication apparatus comprising:

a communicator for communicating with an authenticatable mobile device, a verifier associated with said authenticatable mobile device to verify that the communication is with an intended one of authenticatable devices, and an associator for associating the verification with an activity request via a non authenticatable device, thereby to authenticate the activity request of the non-authenticatable device.

Preferably, said authenticable device is a GSM device and said authenticatable link is a GSM link.

Preferably, said authenticatable device is a CDMA device and said authenticatable link is a CDMA link.

Preferably, said authenticatable device is a PDC device and said authenticatable link is a PDC link.

Preferably, said authenticatable device is an EDGE device and said authenticatable link is an EDGE link.

Preferably, said authenticatable device is a WCDMA device and said authenticatable link is a WCDMA link.

Preferably, said authenticatable device is a GPRS device and said authenticatable link is a GPRS link.

Preferably, said authenticatable device is an Iridium device and said authenticatable link is an Iridium link.

Preferably, said secure link involves a subscriber identity module located at said secure mobile device.

Preferably, said authenticatable link is a secure link utilizing a subscriber identity module located at said authenticatable device.

Preferably, said authenticatable device is a mobile telephone.

Preferably, said communication comprises an electronic data communication.

Preferably, said electronic data communication comprises electronic messaging.

Preferably, said electronic messaging comprises SMS messaging.

Preferably, said electronic messaging comprises WAP.

Preferably, said electronic messaging comprises email.

Preferably, said electronic messaging comprises EMS.

Preferably, said electronic messaging comprises MMS.

Preferably, said communicator comprises functionality to initiate said communication by sending an initial message to said authenticatable device and functionality to receive a reply to said initial message from said authenticatable device, therewith to authorize said activity request.

Preferably, said communicator comprises functionality to receive an initializing communication from either one of said authenticatable device and said non-authenticatable device, and functionality to send a reply to said initial message, therewith to authorize said activity request.

Preferably, said communicator comprises functionality to receive an initializing communication from an external device and functionality to establish a link between said authenticatable device and said non-authenticatable device, therewith to authorize said activity request.

Preferably, said communicator involves functionality to receive a message from said authenticatable device and functionality to complete said communication by sending a response thereto to said secure authenticatable device, thereby to authorize said activity request.

Preferably, said communicator comprises functionality to insert an identifier into said reply for a requesting party to enter via said non-authenticatable device, and wherein said verifier further comprises functionality to determine whether said identifier have been received via said non-authenticatable device.

Preferably, said communicator is operable to use an automatic voice for communicating with said authenticatable device.

Preferably, said authenticatable device is associated with a payment account, said apparatus further comprising functionality to charge said requested activity to said payment account.

Preferably, said requested activity is an Internet browsing activity or a point of sale activity.

Preferably, said requested activity is access to a network.

Preferably, the apparatus is operable to connect to said non-authenticable device via Bluetooth access points.

Preferably, the apparatus is operable to connect to said non-authenticatable device via at least one WLAN access point.

Preferably, the apparatus is connectable to said non-authenticatable device via a TCP/IP link.

Preferably, said communicator is operable to obtain a telephone number for communicating with said authenticatable device, from said non-authenticatable device.

Preferably, said communicator is operable to obtain identification data, from said non-authenticable device, for forming said association.

Preferably, said non-authenticatable device is any one of a group comprising a credit card, a smart card, an infra-red device, a Bluetooth device, a PDA, a mobile computer, a fixed computer, and a network of computers.

Preferably, the apparatus comprises a counter for timing said communication to fail said authorization if said communication is not completed by a predetermined time limit.

Preferably, the apparatus comprises a log-in functionality for logging in the non-authenticatable device.

Preferably, said associator is connected to an authenticator for indicating that said activity request is approved.

Preferably, said authentication communicator is operable to communicate said authentication to an external gateway associated with said non-authenticatable device.

Preferably, said authentication communicator is operable to communicate said authentication to a server associated with said requested activity.

Preferably, said authentication communicator is operable to communicate said authentication by applying a change to a routing table on a router.

According to a ninth aspect of the present invention there is provided a personal transaction card compatible with ATM machines, comprising, in ATM readable format, an ATM routing number and a mobile telephone number, said mobile telephone number being associated with an owner of said personal transaction card.

Preferably, said numbers are stored on a magnetic strip.

Preferably, said numbers are stored in an internal integrated circuit.

According to a tenth aspect of the present invention there is provided an authentication method comprising:

communicating via a secure link with an authenticatable device, verifying that the communication is with an intended one of authenticatable devices, and associating the verification with an activity request via a non-authenticatable device, thereby to authenticate the activity request of the non-authenticatable device.

Preferably, said authenticatable device is a GSM device and said authenticatable link is a GSM link.

Preferably, said authenticatable device is a CDMA device and said authenticatable link is a CDMA link.

Preferably, said authenticatable device is a PDC device and said authenticatable link is a PDC link.

Preferably, said authenticatable device is an edge device and said authenticatable link is an edge link.

Preferably, said authenticatable device is a WCDMA device and said authenticatable link is a WCDMA link.

Preferably, said authenticatable device is a GPRS device and said authenticatable link is a GPRS link.

Preferably, said authenticatable device is an Iridium device and said authenticatable link is Iridium link.

Preferably, said authenticatable link comprises a secure link involving a subscriber identity module located at said authenticatable device.

Preferably, said secure link involves a subscriber identity module located at said authenticatable device.

Preferably, said authenticatable device is a mobile telephone.

Preferably, said communication comprises electronic data communication.

Preferably, said electronic data communication comprises electronic messaging or SMS messaging.

Preferably, the method comprises initiating said communication by sending an initial message to said authenticatable device and functionality to receive a reply to said initial message from said authenticatable device, therewith to authorize said activity request.

Preferably, said communicating involves receiving a message from said authenticatable device and completing said communication by sending a response thereto to said authenticatable device, thereby to authorize said activity request.

Preferably, the method comprises inserting a password into said reply for a requesting party to enter via said non-authenticatable device, and determining whether said password has been received via said non-authenticatable device.

Preferably, the method comprises using an automatic voice for communicating with said authenticatable device.

Preferably, said authenticatable device is associated with a payment account, said method further comprising charging said requested activity to said payment account.

Preferably, said requested activity is one of a group comprising an Internet browsing activity, a point of sale activity and accessing a network.

Preferably, the method comprises using one of infra-red and bluetooth.

The non-authenticatable device may be a TCP/IP link.

Preferably, the method comprises obtaining a telephone number for communicating with said authenticatable device, from said non-authenticatable device.

Preferably, said non-authenticatable device is any one of a group comprising a credit card, a smart card, an infra-red device, a Bluetooth device, a PDA, a mobile computer, a fixed computer, and a network of computers.

Preferably, the method comprises timing said communication to fail said authorization if said communication is not completed by a predetermined time limit.

Preferably, the method comprises a logging in procedure for logging in the non-authenticatable device.

Preferably, the method comprises outputting an indication that said activity request is approved.

Preferably, said indication is output to an external gateway associated with said non-authenticatable device.

Preferably, said indication is output to a server associated with said requested activity.

Preferably, said indication is output by applying a change to a routing table on a router.

The above provides authentication of SIM-based and SIM-less non-telephony devices. SIM-less devices may be authenticated either by using simulated SIM gateway (SSG), or by using a virtual SIM. The virtual SIM can be initialized after a verifier verifies that the communication is with an intended authenticable device. An associator then associates the activity request from an unauthenticated device, equipped with a virtual SIM with the initial verification in other words with the virtual SIM initialization.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings

DESCRIPTION OF THE PREFERRED EMBODIMENTS

Figure 2:
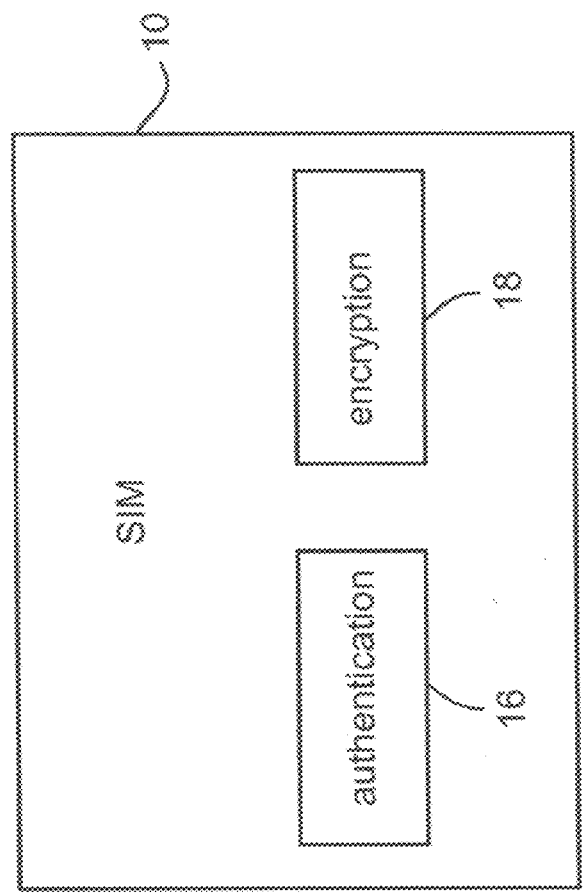
FIG. 2 is a simplified block diagram showing functional operation of a SIM.

The present embodiments provide connectivity for a non-PLMN network to interface to a PLMN network. The inventions described hereunder provide interfaces between the non-PLMN network and the PLMN network that make the PLMN perceive units accessing through the non-PLMN network appear as if they were accessing the PLMN network directly, same as those units that access the PLMN through the radio access network of the PLMN. Therefore, the PLMN network perceives non-PLMN network servicing the supported access devices as simply a part of the PLMN network.

The present embodiments comprise a set of components, that interact together as a system that enables its users to access the various resources from a non-PLMN or a PLMN, be authenticated by and charged by the PLMN system, without having a device that is capable of physically interfacing with the PLMN (e.g. a cellular phone). Some of the components described here are installed on the device that is accessing the PLMN or the non-PLMN network, and some within gateways between the non-PLMN and PLMN networks. Some of the embodiments use a token that proves the identity of the cellular user, as issued by the cellular operator (e.g. IMSI and Ki within a GSM SIM, or MIN and ESN within a CDMA device)—others do not make use of such a token. The embodiments do not require any modification to the PLMN infrastructure; they require addition of new entities that enable seamless access between the non-PLMN and PLMN.

A system that allows access from non-PLMN to PLMN must be able to execute at least the following two actions:

1. Authenticate the user, i.e. prove to the PLMN that the user requesting access to its resources or other resources to be billed to the PLMN account, is an authorized user of the PLMN. In some cases this authentication includes, beyond proof of identify, approval of privileges to access specific services. The PLMN must not be able to distinguish between accesses originating from a non-PLMN and between accesses through the PLMN own access network, whether a radio or other physical communication infrastructure. This must be done since the PLMN must be assured that the access request is really associated with a valid account for the specific requested services.

2. Enable transfer of user traffic between non-PLMN and PLMN. The PLMN must not distinguish between traffic originating from or destined to a non-PLMN and traffic to and from users within the PLMN own access network.

All the embodiments contribute to the authentication and traffic security of the access device accessing the non-PLMN, where the service is billable to a PLMN account associated with this access device at the time of the access.

Two embodiments describe entities that are responsible for making the PLMN perceive the access as if it were done through standard cellular nodes; the characterized entities are thus designated simulated cellular nodes. These nodes are connected to both a non-PLMN and a PLMN; they may reside within the PLMN infrastructure in the same way as the nodes they are emulating. The VBSC (Virtual Base Station Controller) appears to the PLMN as a BSS; in this case the emulated node is a BSC. The VSGSN+ appears to the PLMN as a cellular switching node, i.e. an SGSN for packet switch data or an MSC for circuit switch data. The VBSC and the VSGSN+ are able to execute the above two functionalities. They participate in the authentication of the non-PLMN access device to the PLMN network; and they are able to forward traffic from the non-PLMN network to the PLMN network.

In two of the embodiments—Access device with SIM, and Mixed network authentication, the authentication relies on a token that was provided to the user by the PLMN operator (same identity parameters the PLMN operator provides to its subscribers accessing the PLMN own access network, for example those contained within a SIM for a GSM PLMN or typically stored directly in a cellular phone). In two other embodiments—SSG (Simulated SIM gateway) and Virtual SIM, the token is replace by a virtual token, which is a software package that simulates the token. In the first embodiment, the virtual token is installed in the gateway (either VBSC or VSGSN+), in the former embodiment the software packet is installed in the non-PLMN access device.

The system supports several alternative methods of authentication. The simulated cellular nodes (VBSC or VSGSN+) play an essential role in each one of the authentication methods. We classify the authentication methods (and respectively the embodiments) to the following classes 1. PLMN like authentication of the end user access device—in these authentication methods, the end user access device contains a SIM: the following contain embodiments where the SIM is a real SIM and embodiments where the SIM is virtual (i.e. SW SIM for GSM and stored cellular identity for non-GSM networks). A physical SIM can be installed in the device, it can be installed on the access card, on a special dedicated card, or on another card integrated with some other peripheral (e.g. flush disk). In these methods the simulated cellular nodes (either the VBSC or the VSGSN+) get the cellular authentication information from the end user access device, and verify it against the authentication data it has stored in its data base, or against authentication data it retrieves from the PLMN infrastructure. Mixed Network Authentication is one way to associate or initialize the simulated cellular node data base with verified and authenticated authentication data 2. Non-PLMN Authentication of Access Device, PLMN Authentication by Simulator Gateway (that resides within the entity simulating the PLMN infrastructure node, e.g. a cellular node)—A Simulated SIM Gateway (SSG) receives the PLMN authentication data and makes the cellular network think that the device has a real physical token/cellular identity and responds like any cellular phone. The Gateway actually authenticates the device using a different authentication protocol, typically Internet style. The non-PLMN Gateway takes the identity of a node with the privileges the cellular network provides to such a node.

3. Authentication involving the user PLMN device, e.g. cellular phone-linking a non-authenticatable non-PLMN access device with an authenticatable PLMN access device, e.g. cellular device, by means of association between the two access devices. Mixed network authentication allows the user to access the non-PLMN based on its being an authenticated subscriber of the PLMN. It is assumed that there is a VBSC or VSGSN+ to provide access from non-PLMN to PLMN. For this authentication there are three cases:

i. PLMN provides a one time access code every time the user requests access to the non-PLMN. This solution requires simultaneous availability of communication to both networks as well as manual intervention of the user ii. Automated one time access code. This is a solution where the non-PLMN device has a client that automates the procedure, which may be extended even to automated transfer of the access code from the PLMN device (cellular phone) to the client in the non-PLMN access device iii. Initialization of a Virtual SIM. In this scheme, a one-time association between the PLMN device and the non-PLMN device is used to initialize the non-PLMN device either with a Virtual SIM or with authentication data for another authentication scheme (possibly used by the SSG). Then the user may be authenticated by and access the PLMN through the non-PLMN without being within the coverage of the PLMN.

One aspect of the present embodiments provides a virtual SIM gateway that can be used to interface between a non-PLMN network and a PLMN network. The gateway performs authentication adequate for its communication link with the access device, such as typical Internet Protocol environment authentication over the non-PLMN network; after it is satisfied that it has authenticated a connecting device, then it authenticates itself on behalf of the access device to the PLMN network as if there is a SIM on a device (including the equivalent cellular identity in those networks that do not use SIM). Alternatively, these two stages may be integrated, with interim stages of one authentication dependent on interim stages of the other authentication. For example, the gateway may translate requests, queries and responses from one link into the other. If traffic is forwarded to the PLMN, then the gateway encrypts it in a way that makes it look as though it originated in the device with the SIM (or the equivalent cellular identity). A further variation of this embodiment applies a SIM to the non-SIM device, preferably by incorporating the SIM into the connection card of the device, so that there are provided various types of WLAN and other connection cards incorporating SIMs.

When it is preferred not to incorporate a SIM into the access device, then another scheme employing a different authentication option exists: to equip the connecting device with a virtual SIM. The virtual SIM can be stored within other access device resources with its algorithms implemented by a processor within the access device, i.e. a software implementation with no special hardware. The virtual SIM can be initialized in several ways. Specifically, Mixed Network Authentication, which is described herein below, can be used to authenticate the initialization of the virtual SIM installed on the remote connecting device. A device equipped with a virtual SIM is authenticated by either a VBSC or a VSGSN, as described in detail below, which preferably resides between the non-PLMN network and the PLMN network, and is able to create pseudo-triplets (rand, sres, $k_c$) for virtual SIMs or their equivalent (MIN, ESN) in other networks, or other authentication data e.g. username and password that may be authenticated by the Simulated SIM Gateway and provide to the network the same or equivalent data the emulated node would exchange with the PLMN receive if a subscriber would be accessing through the PLMN access network and the emulated node. However, if this method is used, then the PLMN does not directly authenticate the user (i.e. does not verify that it has the SIM or equivalent cellular identity in his possession), but rather it relies on the gateway. The gateway may then proceed to provide charging information to the PLMN.

It is pointed out that when a virtual SIM is used in the access device then the simulated PLMN gateway preferably has functionality to authenticate a virtual SIM.

Another aspect of the present embodiments provides a virtual base station controller which provides interface functionality so that the non-PLMN network appears, to the PLMN network, as a cellular basestation controller. The concept may be extended to even emulate a cellular base station, so the PLMN network appears as one or more cellular base stations. In essence what is provided is a proxy server type arrangement. An extension to the virtual base station controller allows peer to peer connections within the non-PLMN network, peer to server connections within the non-PLMN network and connections leading out of the network to be managed together from the PLMN network.

Another aspect of the present invention provides for the cellular network to approve the access through the association of a non-cellular device connecting via a different route, to the cellular telephone.

The concept of allowing the devices associated with the cellular devices to connect via the local network to the cellular network is extended in a similar way to networks with cellular telephones equipped with cellular identification modules or the like other than SIMs.

Another aspect of the present invention provides methods for maintaining seamless connectivity for the mobile user independent of the different communication networks it may be accessing and whether it is moving from one connection type to another.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Simulated SIM Gateway

Figure 1:
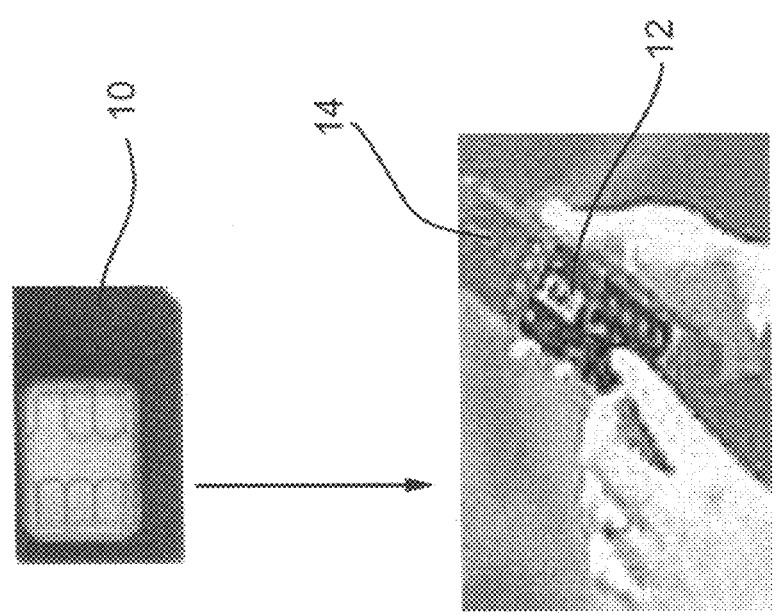
FIG. 1 is a simplified representation of a SIM.

Reference is now made to FIG. 1, which is a simplified diagram showing a typical SIM for application to a cellular telephony device. The SIM 10 is a small module which is inserted into a SIM card carrier and reader 12 within cellular telephony device 14. The SIM provides the telephony device with its identity, and allows it to connect securely to the cellular telephone network.

Reference is now made to FIG. 2, which is a simplified block diagram showing the principle subsystems within SIM 10. The SIM 10 comprises an authentication subsystem 16 for carrying out secure identification to assure the network that it is the legitimate carrier of the telephone number, and an encryption subsystem 18, which encrypts voice and data communication from the cellular device and which decrypts incoming voice and data communication from the network, using an algorithm known as A5. Of course it will be appreciated that other encryption algorithms or for that matter entirely different encryption schemes may be used. Encryption and decryption are carried out using a key which is supplied at authentication by the network. The exact forms of authentication and encryption that are used are network dependent. In authentication a random number RAND is sent by the network to the SIM, where it is used as the input to a one-way function A3. The SIM sends back the function output, which the base station compares with SRES, a previous attempt, made by the system, to apply RAND to A3. If the response matches SRES then the connecting device is authenticated.

Figure 3:
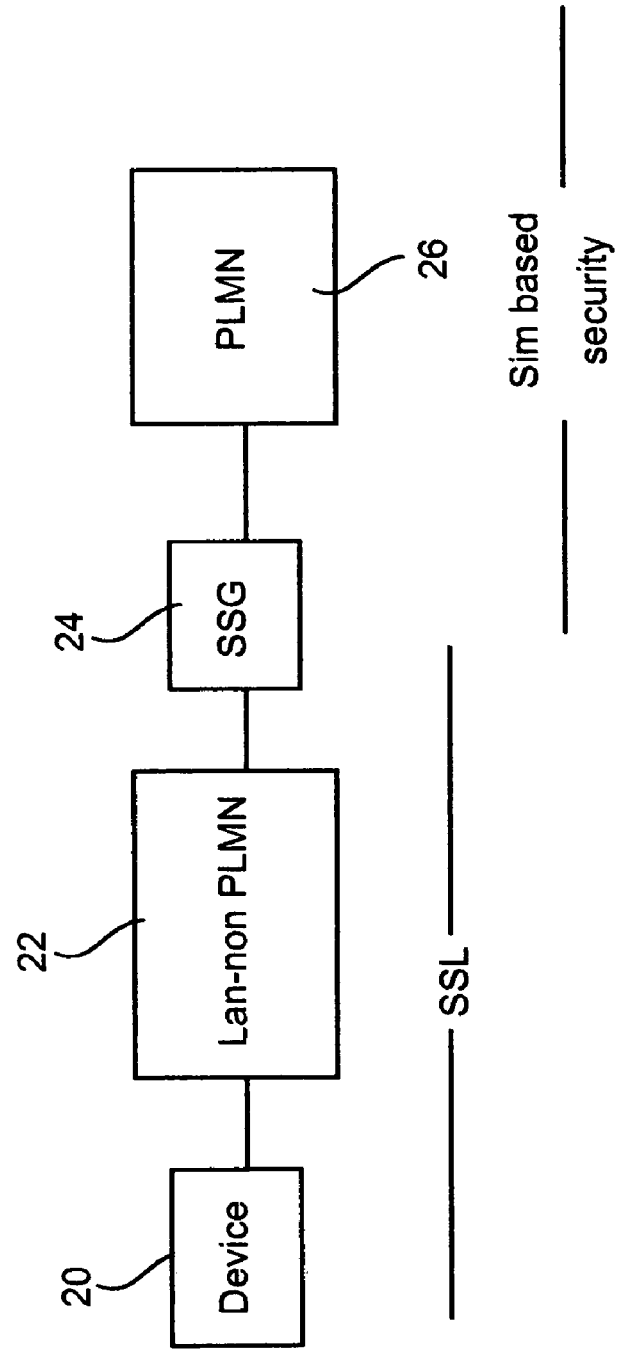
FIG. 3 is a simplified schematic diagram showing a client device connecting to a non-PLMN network and from there to a PLMN network via a virtual SIM gateway according to a first embodiment of the present invention.

Reference is now made to FIG. 3, which is a schematic diagram showing a remote device connecting to a cellular or PLMN network via a local network. Device 20, which need not be a cellular device and may not have a SIM, nevertheless has processing power that allows it to identify itself, albeit in ways incompatible with the requirements of the PLMN networks. Such a device is referred to herein as a non-PLMN device. Device 20 connects to non-PLMN network 22, which may typically be a LAN network having wireless access points. The LAN typically uses TCP-IP as a communication protocol. The LAN is connected via a Simulated SIM Gateway 24 to the PLMN or cellular network 26. The Simulated SIM gateway 24 provides a bridge between TCP-IP authentication and encryption protocols and the PLMN protocols and thus allows device 20 to be securely recognized by the PLMN network even though it does not have a SIM.

As shown in FIG. 3, the connection between the device 20 and the gateway 24 is secured using any standard TCP/IP security protocol, e.g. secure socket link (SSL), TLS, Ipsec, that is any secure encryption and authentication technology typical to the IP network. As will be explained in more detail below, The security technology is used for the device 20 to identify itself unambiguously to the gateway. Alternatively, other secure protocols, eg IPSec may be used for this purpose. The term SSL as used herein refers to other protocols e.g. IPsec that may also be used for this purpose; that is to say the term SSL as used in this explanation refers collectively to any security protocol that is being used to protect the data transferred between the device and the gateway, including those that operate at lower layers and do not use a socket. The gateway, having determined the identity of the connecting device, then carries out a SIM compatible identification procedure with the PLMN network, in which the gateway indicates to the PLMN that it has authenticated the connecting device. The authorization procedures are considered in greater detail below with respect to FIG. 5.

Figure 4A:
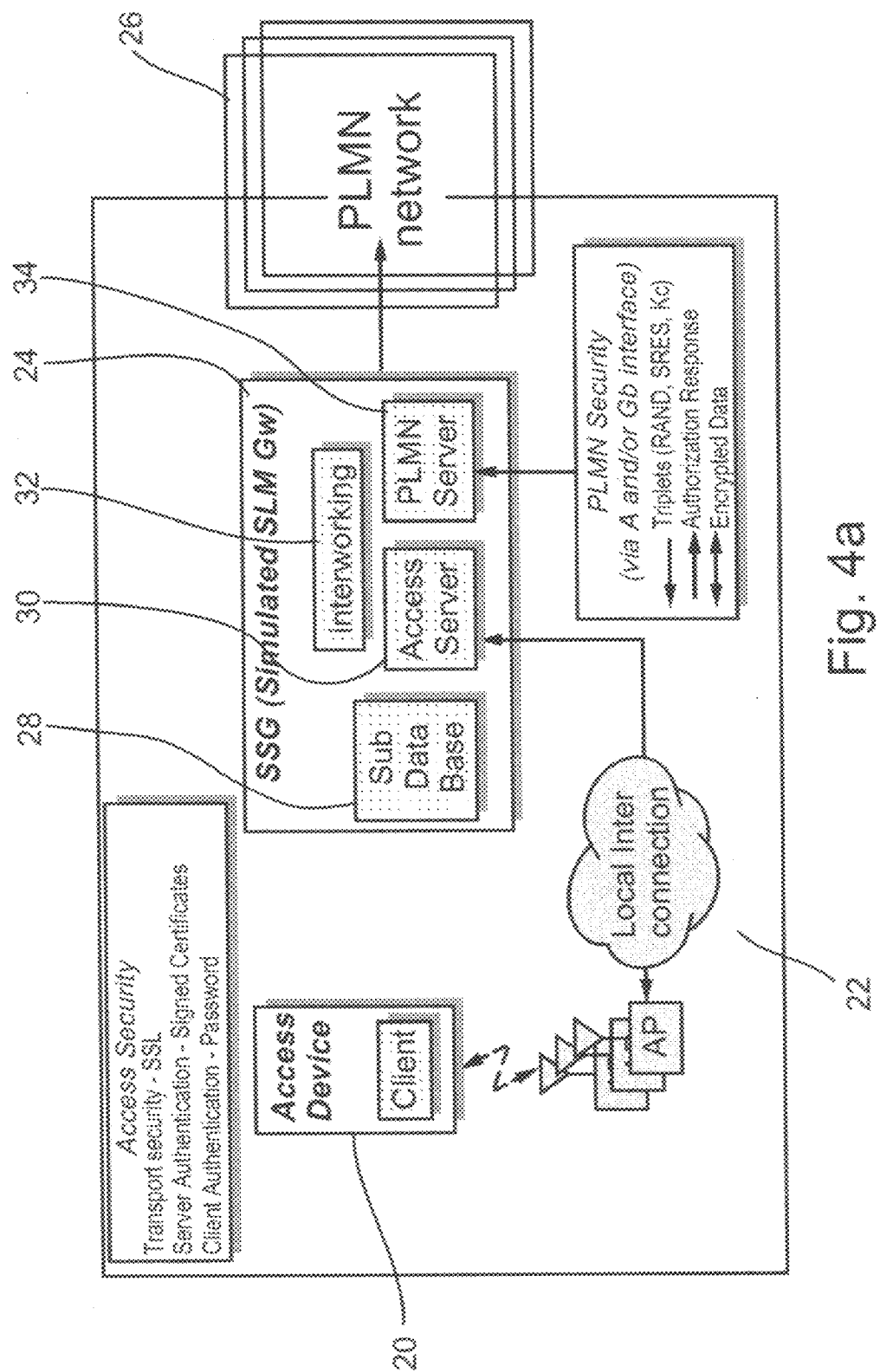
FIG. 4A is a simplified block diagram showing the embodiment of FIG. 3 in greater detail including sub-systems of a simulated SIM gateway.

Reference is now made to FIG. 4A, which is a simplified diagram showing in greater detail the embodiment of FIG. 3, and in particular showing internal subsystems of the gateway 24. Parts that are the same as those in previous figures are given the same reference numerals and are not referred to again except as necessary for an understanding of the present embodiment. The simulated SIM gateway 24 comprises a database subsystem 28, an access subsystem 30, an interworking subsystem 32 and a PLMN subsystem 34. The various subsystems may be implemented over a plurality of servers or the entire gateway may be implemented on a single server, depending on the scale of the operation required. The gateway is preferably located in a secure place so as to guard against attempts to break physically into the system. As will be explained below, however, the gateway does not store any information that would compromise SIM security.

The access subsystem 28 generally comprises standard LAN security, typically to establish an SSL socket to the connecting device 20. The access subsystem identifies the device and informs the PLMN subsystem 34. The PLMN subsystem 34 communicates to the PLMN network 26 that a connection is required. The gateway is configured to look like a standard cellular base station, or for that matter a standard SGSN, a standard base station controller or a standard MSC to the PLMN network which sends standard SIM identification data to the PLMN subsystem. The subsystem does not pass on any of the identification data to the device as the device does not have a SIM. Instead, it simply checks that the SSL or other TCP/IP-based authentication protocol was successful and sends a standard SIM acknowledgement to the PLMN network.

If traffic forwarding from the end user access device to the PLMN is required then the PLMN subsystem 34 may also carry out encryption of outgoing data and voice and decryption of incoming data and voice as necessary to provide compatibility with the PLMN network.

The internetworking subsystem provides a bridge between the IP based access subsystem and the cellular protocols of the PLMN system being used.

The database subsystem contains data of the users of the LAN so that individual users can be authenticated and given access to the appropriate services.

Figure 4B:
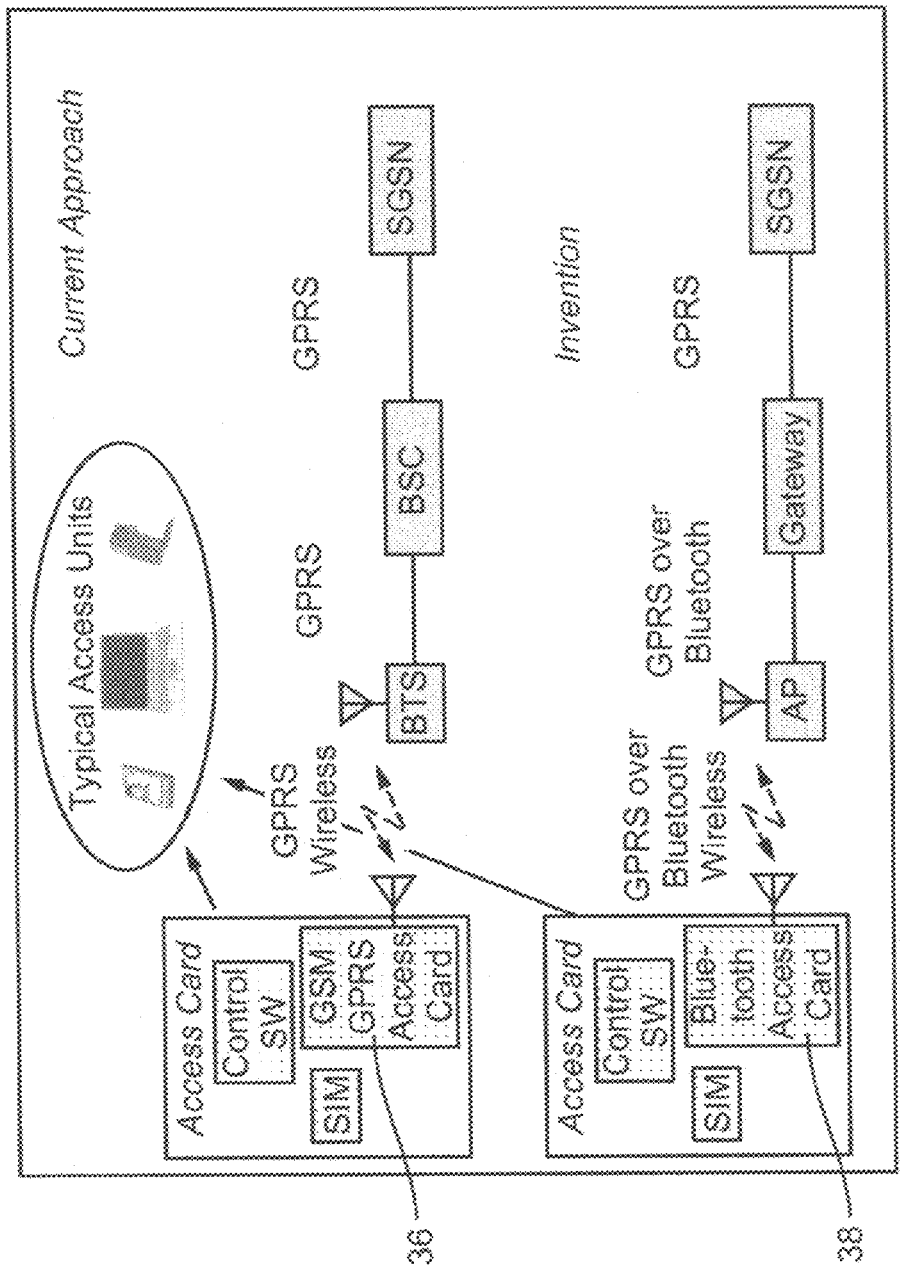
FIG. 4B is a simplified comparative diagram showing an alternative solution to providing PLMN service over a non-PLMN network, the service compared to the prior art.

Reference is now made to FIG. 4B, which is a simplified comparative diagram showing an alternative embodiment for allowing non-PLMN devices access to a PLMN network. As discussed above, the non-PLMN devices are required by the PLMN network to do the following;

1) Subscriber Authentication—The PLMN sends a random number (RAND) to the access unit. To be authenticated the access unit must respond with the correct number (SRES). The access device determines SRES by inputting the RAND to the SIM, where the secret A3 algorithm processes it and the SRES is the output. The SRES is sent back toward the PLMN where it is compared to the expected value, and. In devices using an alternate cellular identity scheme, the access unit provides MIN and ESN in a first access, TMSI and ESN later on, in order to be similarly authenticated by the PLMN.

2) Data or voice encryption—Digital bearer information (voice or data) sent from the access device to the PLMN is encrypted to prevent eavesdropping. In the example of GSM networks, the SIM encrypts the data stream using the A5 algorithm and an internally generated encryption key that is derived from RAND. Different algorithms for the same purpose are defined for CDMA and other networks.

Both of the above-mentioned requirements may be performed by providing access to a SIM (or equivalent cellular identity data) from the non-PLMN device, and this may be accomplished by incorporating the SIM into the user terminal. The SIM may be incorporated into the device itself, into a separate access card or module or a SIM carrier and reader may be part of the network access card. For non-SIM based cellular networks, the cellular identity data may be stored in the user terminal, in a special smart card or in the access card. Access cards in use by non-PLMN devices use a wide variety of access technologies including Bluetooth, Wireless LAN (802.11X) and wired 10/100 Based Ethernet.

The format for these cards includes standard PCMCIA, CompactFlash and other formats.

For PDAs and Laptop computers the access card may often be built in. More likely though it may be provided with an add on card, for example a CompactFlash (or PCMCIA) add on card. A prototype that has been built comprises a Bluetooth Card in CompactFlash format. The card is modified to include a SIM carrier and the Bluetooth driver software is modified to include the SIM reader and control.

The SIM carrier and reader may likewise be added to Wireless LAN cards such as 802.11b in either CompactFlash or PCMCIA format. A prototype has also been constructed of an 802.11b card in a PCMCIA format.

FIG. 4 is based on the GSM/GPRS network. The upper portion of the figure shows the current standard approach where GPRS is used throughout. The SIM card and control software is normally mounted on the GPRS Access Card. The GPRS Access card is installed in the User Device, which may typically be a PDA, Laptop or Mobile phone.

The principle of the solution is shown in FIG. 4B. In FIG. 4B, a comparison is shown between the top half of the drawing in which standard GPRS is used, and SIM access is provided via a GPRS access card 36, and the bottom half of the drawing, in which an intermediate section of a non_PLMN network intercedes, and SIM access is provided via a Bluetooth access card 38.

In the lower part of the figure, the GPRS Access card 36 is replaced by a Bluetooth access card 38. The control software is installed on this same card. The Bluetooth Access card is installed in the User Device and communicates over the Bluetooth network. GPRS messaging is transported over Bluetooth and at the edge of the network, Bluetooth transport is replaced by standard GPRS transport as shown in the figure.

The advantages of the above solution, as opposed to that of FIG. 4A, are that the above SIM is included in an access card device. Specialization is restricted to a special card, which is to say that the solution can be implemented simply on the basis of providing SIMs in the non-PLMN devices and substantially no additional functionality has to be provided to any of the networks involved. The subscriber is provided with access to full network services. All access and encryption uses standard and completely unmodified PLMN techniques. The carrier is protected from fraud because he is relying on his own security system. The access network operator is likewise protected from fraud by the same tried and tested PLMN system.

Figure 4C:
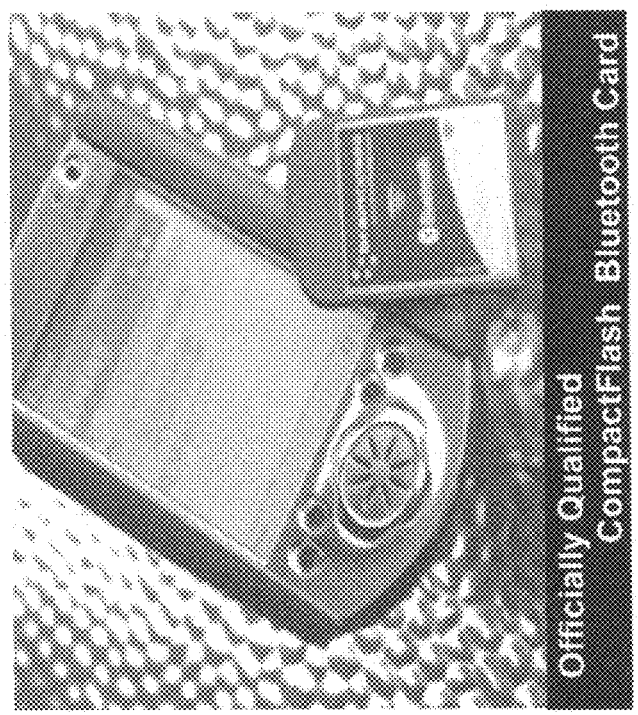
FIG. 4C shows a Bluetooth card.

FIG. 4C shows an exemplary Bluetooth access card, suitable for use as Bluetooth access card 38.

Figure 5:
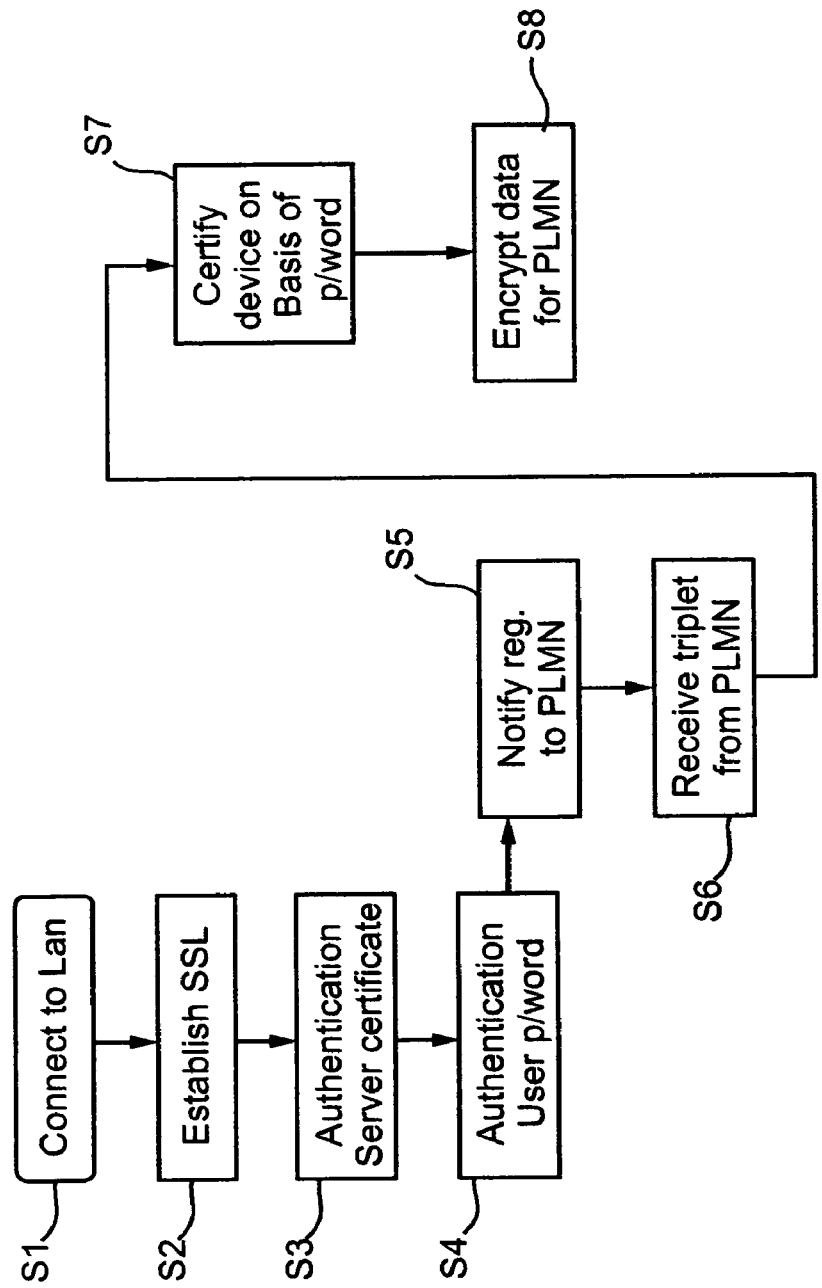
FIG. 5 is a simplified flow chart showing a process of connecting a non-SIM device via a non-PLMN network to a PLMN network via a virtual SIM gateway, according to an embodiment of the present invention.

Reference is now made to FIG. 5, which is a simplified flow chart of the process of obtaining access to the cellular or PLMN network by a non SIM device connecting via a LAN. The diagram refers to the embodiment of FIG. 4A. By contrast the device of FIG. 4B connects in a completely standard manner. According to FIG. 5 the device connects to the LAN in an initial step S1 and then an SSL socket is established in a subsequent step S2. The connection to the LAN is preferably carried out using a standard web browser, which is perfectly capable of supporting an SSL socket or other TCP/IP authentication protocol. The socket is standard and may typically use 64, 128 bit keys or other agreed upon key string to encrypt communications, thereby rendering the communication safe from eavesdropping. The socket, once established, is used in a two-stage authentication operation, including a first stage S3, in which the server authenticates itself to the connecting client. Server authentication is generally achieved using a system of signed certificates, for example the X.509 standard server certificate, to reassure the connecting device that it is communicating with a recognized and if need be traceable server. Once the server has authenticated itself to the device then the user is generally asked, stage S4, to provide a user name and password. This is preferably carried out using a standard dialog box. The username and password are compared with the server database and the server can then determine the connection privileges that the connecting device is entitled to.

If stages 3 and 4 are negotiated successfully between the gateway and the device then the gateway notifies the PLMN that a connection is required, -stage S5. The PLMN responds in stage S6 by providing a SIM security triplet, a random number RAND, an expected response SRES from the SIM to the random triplet and a encryption key Kc. In the normal case of a SIM device, RAND is sent to the SIM, where it is used as the input to a one-way function. The SIM sends back the function output, which the base station compares with SRES. If the response matches SRES then the connecting device is authenticated. However, in the present case the connecting device is not a SIM device. Instead the PLMN subsystem 34, in stage S7, simply checks that the connecting device was successfully authenticated in stages 3 and 4 and then sends out an authorization response to the PLMN. The gateway takes on responsibility for encryption of data and voice in the subsequent communication using the key Kc, in stage S8. Voice is preferably always decrypted from the SSL at the gateway and may be subsequently re-encrypted using the A5 algorithm and the Kc key, according to the requirements of the PLMN network.

Advantages of the above-described embodiments accrue to the subscriber, to the LAN operator and to the PLMN or cellular operator. The subscriber attains all of the security supplied by a standard PLMN but can use a low cost device to connect or simply a device that happens to be conveniently available at the time, without needing any special hardware accessories. For the LAN operator he is able to provide a full set of connectivity services based on his own TCP/IP authentication technology. Finally, for the PLMN operator the embodiments provide a means by which the subscriber connecting through the LAN can be provided with a full set of services, assured that responsibility will be accepted by the LAN operator.

Although the above examples have been described with GSM in mind, using a standard A or Gb interface, the embodiments are applicable in addition to GPRS, EDGE, WBCDMA, UMTS, 3G, CDMAone, CDMA2000, 3GPP, 3GPP2, PDC and other PLM standards. The above list is not exhaustive and it is contemplated that additional protocols will be added in the course of time to the PLMN landscape.

The non-PLMN network may typically be a wired LAN, Bluetooth, 802.11(x) wireless LAN or the like.

Although the above has been described in respect of SIMs and GSM, the same solutions apply to any system for cellular identity and/or security, and particularly including MIN and ESN in CDMA networks.

EXAMPLES

An example of the above would be a PDA using an 802.11 access card connecting to an 802.11 LAN, through which it is connected to the GSM or GPRS cellular network. According to the above embodiments, such a connection may be achieved without providing the PDA with a GSM compatible SIM.

Virtual SIM

Reference is now made to FIG. 4C, which is a simplified comparative diagram showing an alternative embodiment for allowing non-PLMN devices access to a PLMN network. The approach is suitable when connection to the PLMN is only required for authentication and accounting purposes, but no user traffic is exchanged between the access device and the PLMN. As explained above, in this approach, the end user access device is equipped with a virtual SIM. The simulated cellular node (either VBSC or VSGSN+) has an authentication database, where all the authentication information of subscribers with Virtual SIM (or other means simulating authentication tokens for cellular identities) is stored. The virtual SIM can be initialized or used with information where at least part of it is only valid for one access or access attempt, in several ways. Specifically, Mixed Network Authentication, which is described hereinbelow, can be used to authenticate the initialization of the virtual SIM installed on the remote connecting device, and to associate the cellular identity with the authentication data stored in the simulated cellular node's database. A device equipped with a virtual SIM is authenticated by either a VBSC or a VSGSN, as described in detail below, which preferably resides between the non-PLMN network, and the PLMN network, and is able to create pseudo-triplets (rand, sres, $k_c$) for virtual SIMs or their equivalent (MIN, ESN) in other networks. However, if this method is used, then the PLMN does not directly authenticate the user (i.e. does not verify that he has the SIM or equivalent cellular identity in his possession), but rather relies on the gateway. The gateway may then proceed to provide accounting information to the PLMN, or the accounting may depend on the non-PLMN, or both.

The virtual SIM approach can be used for access devices when there is preference that they not include SIMs or other hardware based identifiers (smart card or equivalent), for non-PLMN to PLMN connectivity; or they may be used for non-PLMN to PLMN connectivity where the PLMN does not support integrated SIM based authentication—e.g. CDMA.

In this approach, a virtual (usually software) SIM is installed on the remote device. The remote device does not have a SIM. The SSG is replaced with a designated gateway that issues pseudo-triplets to the remote device. The gateway and the remote device share the virtual SIM secret key (which is stored in the simulated cellular node authentication database). The gateway uses it to generate the triplet (RAND, SRES, KC), and to issue GSM-like challenges to the remote device (i.e. RAND). The triplet can be generated by the same algorithm used by the GSM authentication protocol (i.e. A3 and A8), but is can also be generated by other algorithms (e.g. HMAC-SHA-1 or HMAC-MD5). The requirement being that the same algorithms will be used by the virtual SIM and the simulated cellular node (VBSC or VSGSN+). The remote device in its turn uses the virtual SIM to respond to the challenge, and sends SRES to the simulated cellular node (through the non-PLNM network). When the authentication process is completed successfully, then the end user access device and the simulated cellular node share a key (Kc), which is not known to others, just like in the GSM system. The end user access device and the simulated cellular node can use this key to encrypt traffic flowing between them. However this key cannot be used to encrypt traffic destined to the PLNM network, since the PLNM network doesn't have this key.

SIM or USIM can be implemented in this method. Unlike SIM—a software SIM can be cloned, so the authentication protocols that use virtual SIM include cloning detection mechanisms.

Virtual Base Station Controller (VBSC)

Figure 6:
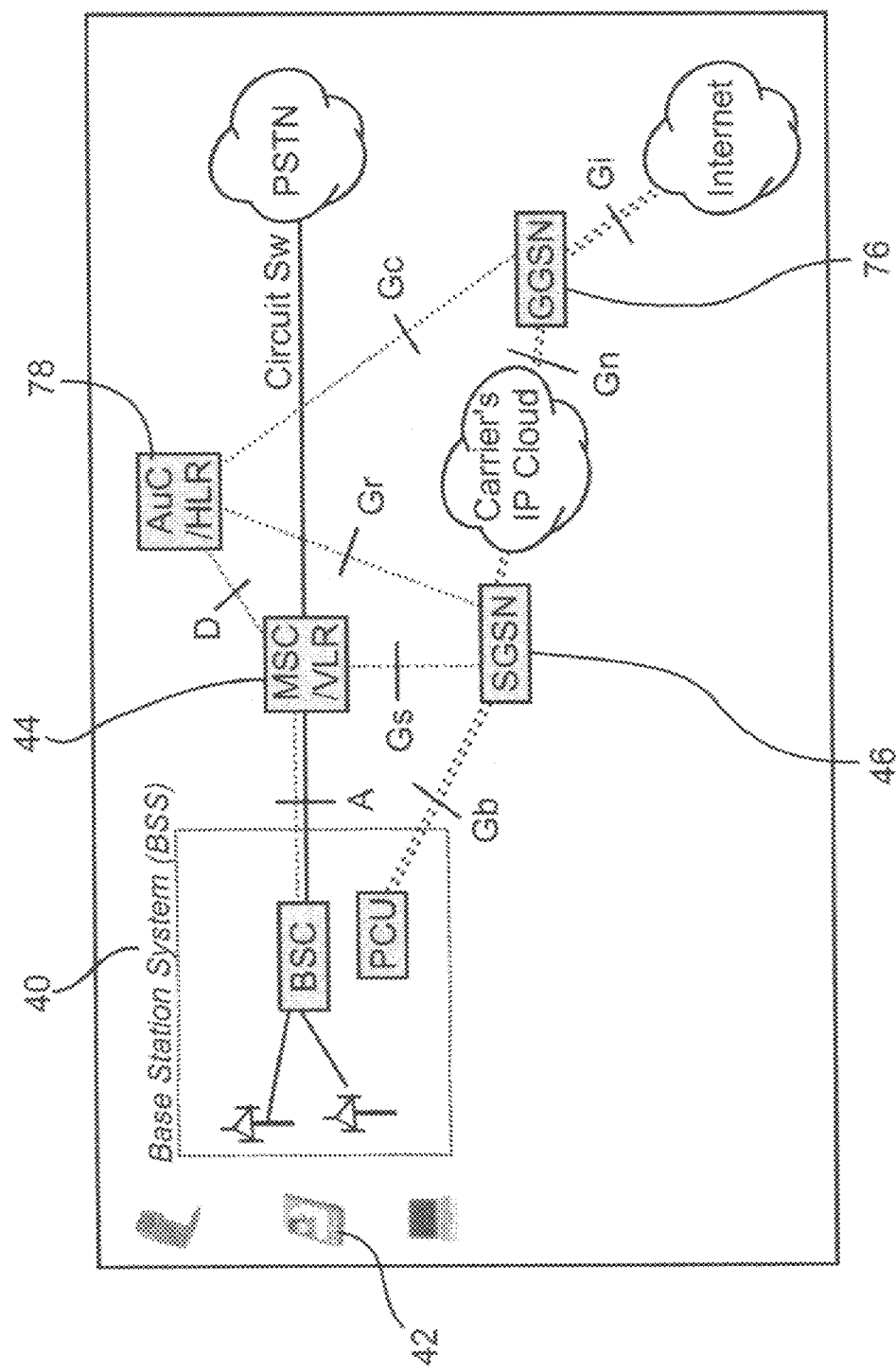
FIG. 6 is a schematic diagram showing a typical PLMN network architecture.

Reference is now made to FIG. 6, which is a simplified block diagram of a standard GSM network arrangement. A base station system (BSS) 40 supports remotely located mobile devices 42. It is connected via an MSC 44 to a circuit switched network, in this case the PSTN, and is connected via an SGSN 46 to a packet switched network, such as the Internet. The key point to observe is that the base station BSS interfaces to the MSC via the A interface for Circuit Switched connections and via the Gb interface for packet connections. These interfaces may be used, as will be described in detail below, by the VBSC so as to appear to the PLMN as any other BSS in the GPS network.

Figure 7:
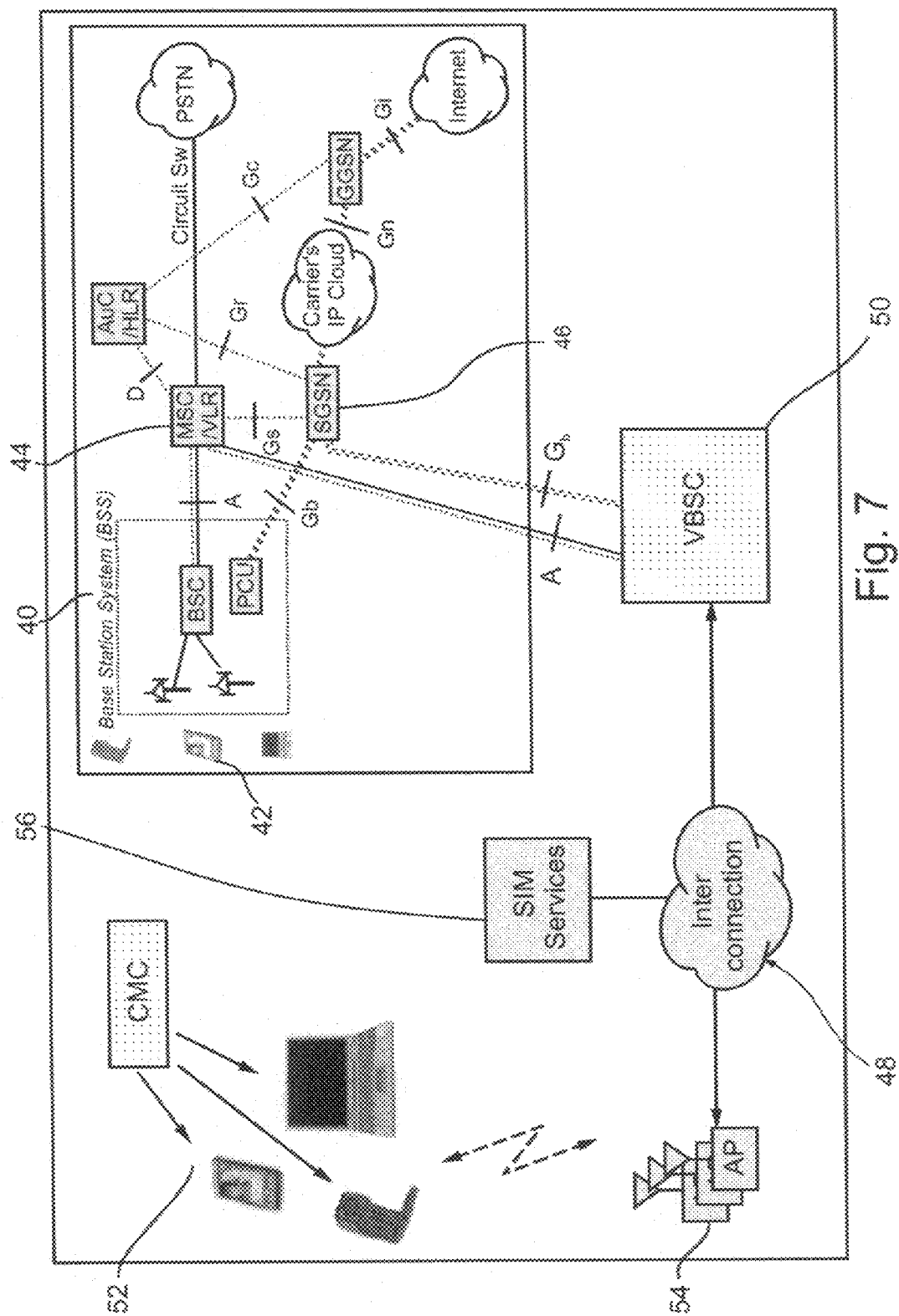
FIG. 7 is a schematic diagram showing the use of a virtual base station controller as an interface to the PLMN network, according to an embodiment of the present invention.

Reference is now made to FIG. 7, which is a simplified block diagram showing a non-PLMN network 48, interfaced by a virtual base station controller VBSC 50 to the GSM network of FIG. 6. Parts that are the same as those in previous figures are given the same reference numerals and are not referred to again except as necessary for an understanding of the present embodiment. The non-PLMN network 48 connects remote devices 52 via a series of access points 54 and has its own network servers in the way of any typical network. A SIM server 56 is shown providing a simulated SIM gateway, or a virtual SIM server authentication, of the kind described above.

As with the standard base station of FIG. 6, the VBSC 50 uses the A interface for reaching circuit switched networks such as the PSTN and the Gb network for reaching packet switched networks. The VBSC (Virtual Base Station Controller), is functionally a Proxy Gateway between the non-PLMN Access Network (Bluetooth, 802.11, etc) and the PLMN. The VBSC connects to the PLMN over the A and Gb interfaces. These are the interfaces that the PLMN uses to communicate to a BSC and thus the VBSC appears to the PLMN as a BSC.

The VBSC 62 communicates with an access device 52, for example a PDA, or laptop using the non-PLMN network. The communication is made to a client application installed on the access device or on a network server, and is carried out using a communication tunnel based on TCP/IP or any other suitable standard protocol. Communication may be required by the VBSC to the SIM Server discussed above for authentication and encryption services. The end user access device might have a virtual SIM installed in it, and the SIM server can be a either a virtual SIM verifier, or it can be a simulated SIM gateway, as discussed above.

The VBSC preferably also communicates with a packet data or circuit switched software client on the access device. The client is used by the subscriber to obtain the specific services that are requested such as Corporate VPN, Internet access, Access to Servers within the Cellular Network or Voice interconnection.

The access device client application is typically a downloadable software only application, particularly when the access device is a PDA or Laptop computer.

The VBSC 50 serves as an interface between the accessing, non-PLMN, network and the PLMN and preferably supports a wide range of functions that may be communicated over the A and Gb interfaces respectively. The VBSC initiates and responds to messages to and from the PLMN, and interacts with elements within the access network to perform these functions. Discussion of selected functions follows below.

Figure 8:
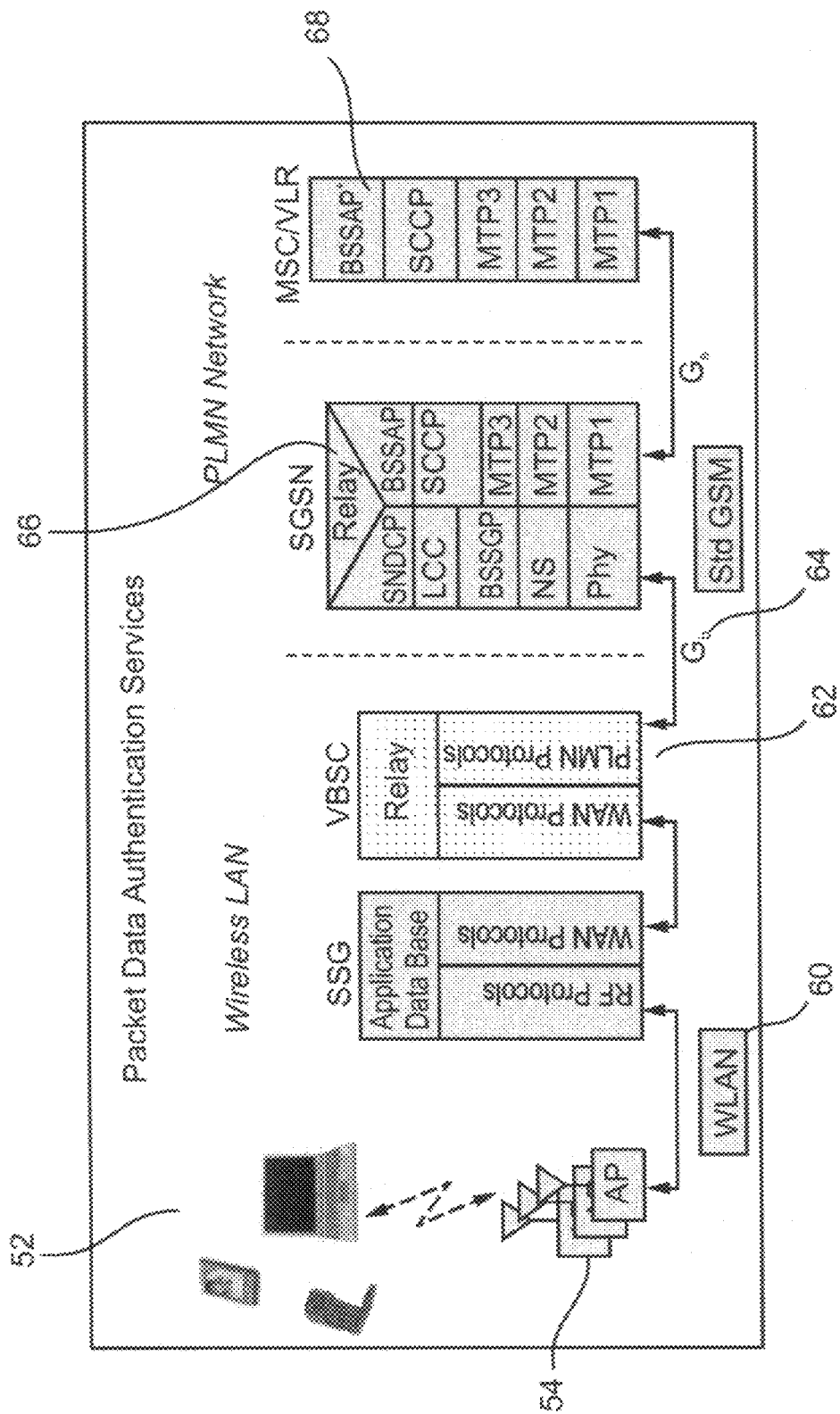
FIG. 8 is a schematic diagram showing protocol layers and packet data authentication between a wireless LAN and a PLMN network according to a preferred embodiment of the present invention.
Figure 9:
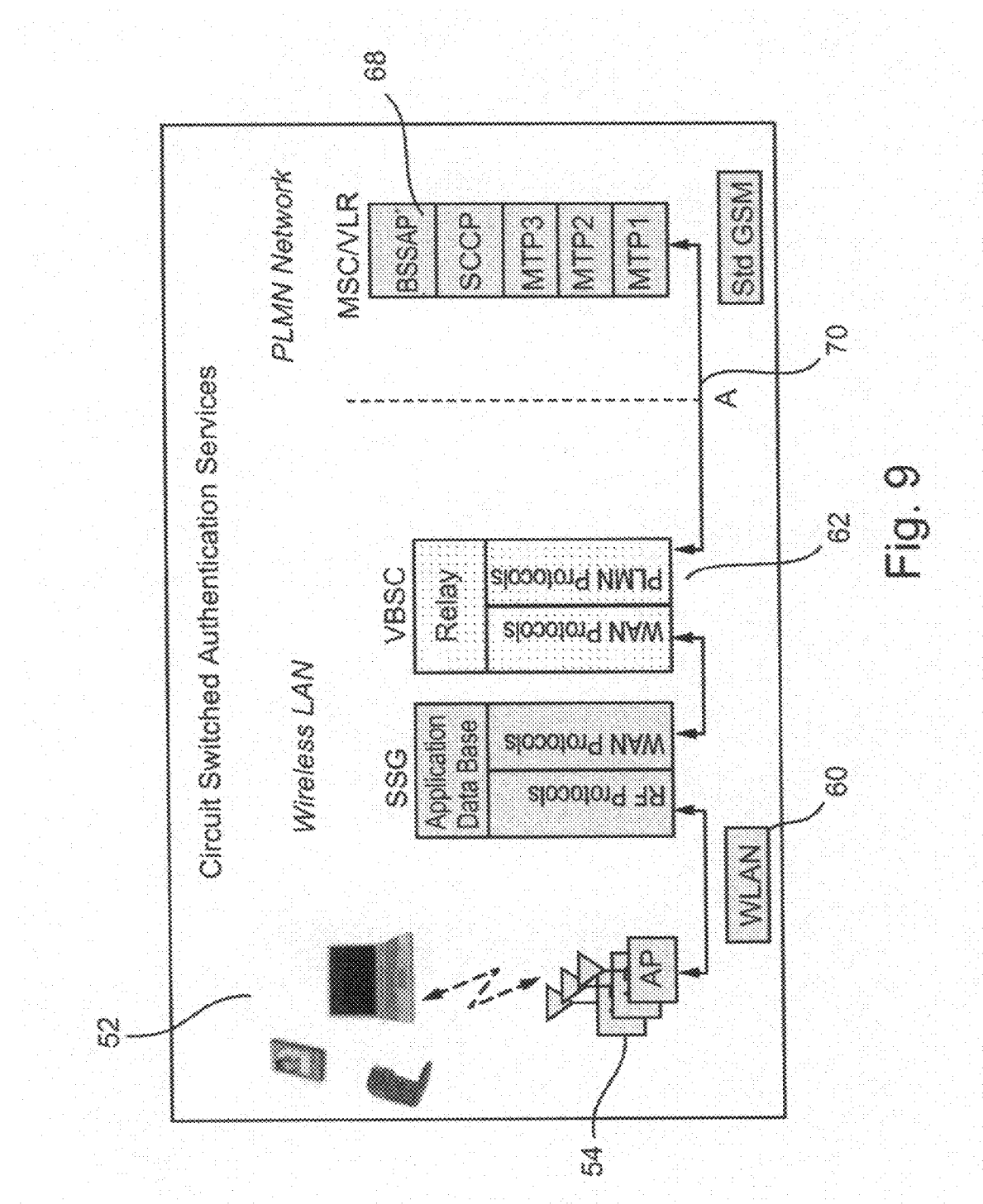
FIG. 9 is a schematic diagram showing protocol layers and circuit switched data authentication between a LAN and a PLMN network according to a preferred embodiment of the present invention.

Reference is now made to FIGS. 8 and 9, which are respectively figures that show a simplified signaling plane for SIM services to the Gb interface, and a simplified signaling plane for SIM services to the A interface. The correct interfacing of security features between the PLMN and the non-PLMN network is a part of making the interface look like a PLMN base station (BTS) or base station subsystem (BSS). FIG. 8 shows a series of mobile devices 52 connected via access points 54 to a wireless LAN network 60. The wireless LAN uses its own protocols, RF-based protocols including MAC for the client to LAN connections and other network protocols for the client to VBSC connection and within the network. VBSC 62 acts as a relay between the network protocol signaling and the PLMN signaling. Obtaining the correct signaling content requires either that the mobile components have internal SIMs or that a simulated SIM gateway of the kind discussed above is used.

The Gb interface 64 is used to transfer the signal between the VBSC and serving GPRS support node SGSN 66, from which standard access is obtained to the cellular infrastructure: authentication with the HLR over Gr, data tunneling to GGSN over Gn, accounting data to CGF over Ga, etc. A Gs interface 68 is used to transfer data with a mobile switching center MSC. It is noted that the VSGSN+ preferably always has a packet data interface towards the mobile interface; however towards the network it may use packet or circuit. That is to say, specifically the VSGSN enables the non PLMN Access Network to appear as both a SGSN for packet data and BSC for circuit switched data. Note that FIG. 8 only addresses the cellular protocol, therefore the Internet connection that may be used as the transport therefor.

The SGSN 66 preferably serves as a relay between the Gb and Gs interfaces. It is noted that the MSC is concerned only with circuit switched data. Its equivalent for packet switched data is the SGSN.

FIG. 9 shows the authentication plane for circuit switched data. Parts that are the same as those in previous figures are given the same reference numerals and are not referred to again except as necessary for an understanding of the present embodiment. FIG. 9 is identical to FIG. 8 except that the SGSN stage is omitted and the A protocol 70 is used to communicate directly between the VBSC 62 and the MSC 68.

Figure 10:
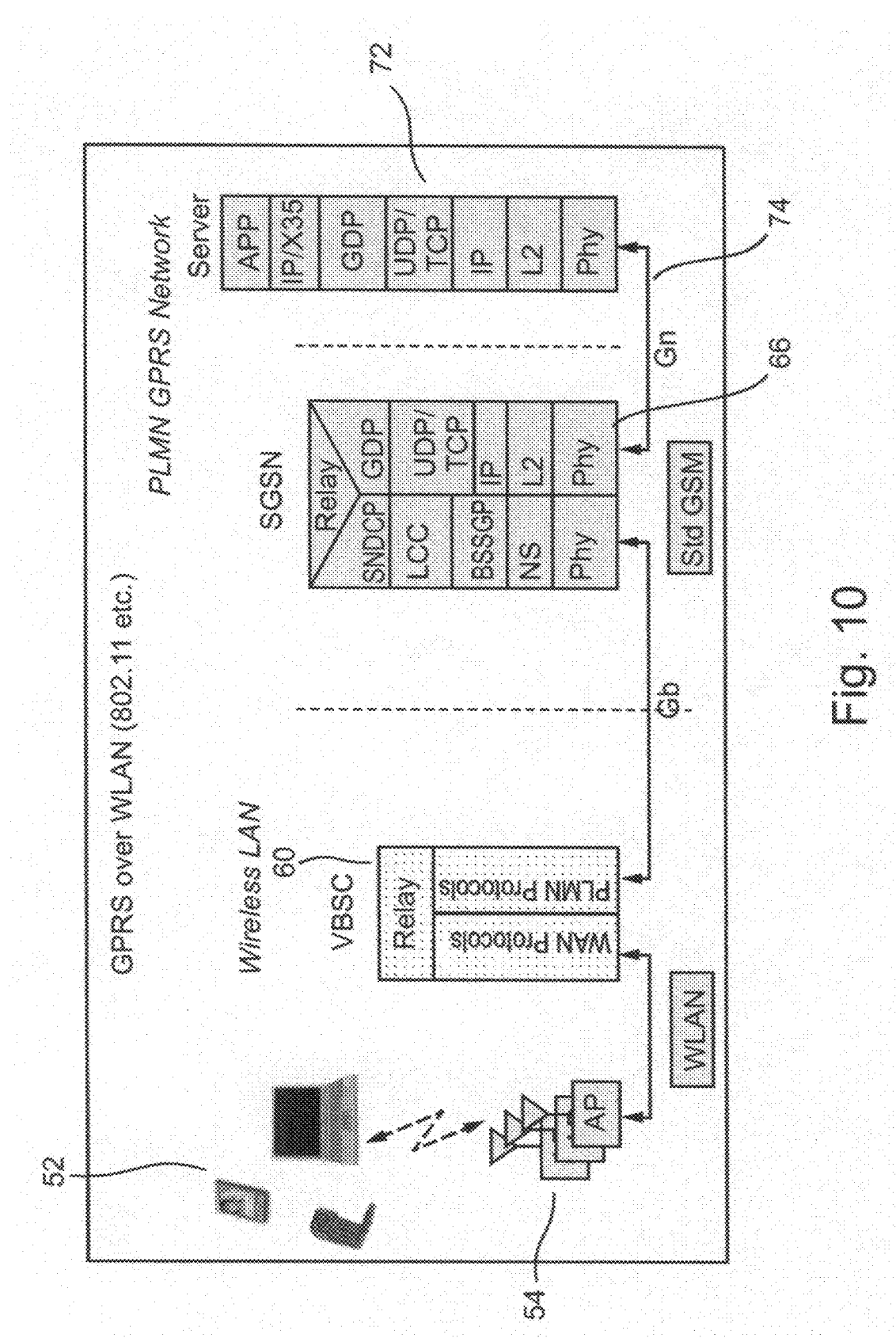
FIG. 10 is a schematic diagram showing protocol layers involved in connections between GPRS and a wireless LAN according to a preferred embodiment of the present invention.

Reference is now made to FIG. 10, which is a simplified diagram showing a communication protocol plane for packet switched bearer services. Parts that are the same as those in previous figures are given the same reference numerals and are not referred to again except as necessary for an understanding of the present embodiment. A GPRS network server 72 is connected via the Gn interface 74 to the SGSN 66. For each element of the figure, the different available protocol layers are shown.

A data access client runs GPRS applications, typically including such things as WAP browsers. The communication path that is used is the same as in FIG. 8 above. Although not shown, applications can obtain access outside the PLMN GPRS network via the gateway GPRS support node GGSN 76 shown in FIG. 6.

The data access client, as downloaded to the access device, may typically be assembled from standard GPRS software protocol elements, and may communicate via the TCP/IP tunnel to the VBSC. At the VBSC the transport layer is preferably replaced with BSSGP (BSS GPRS Protocol) to achieve compatibility with the SGSN. Also at the VBSC the Radio Link Control layer message is preferably supported as required by the BSSGP.

Figure 11:
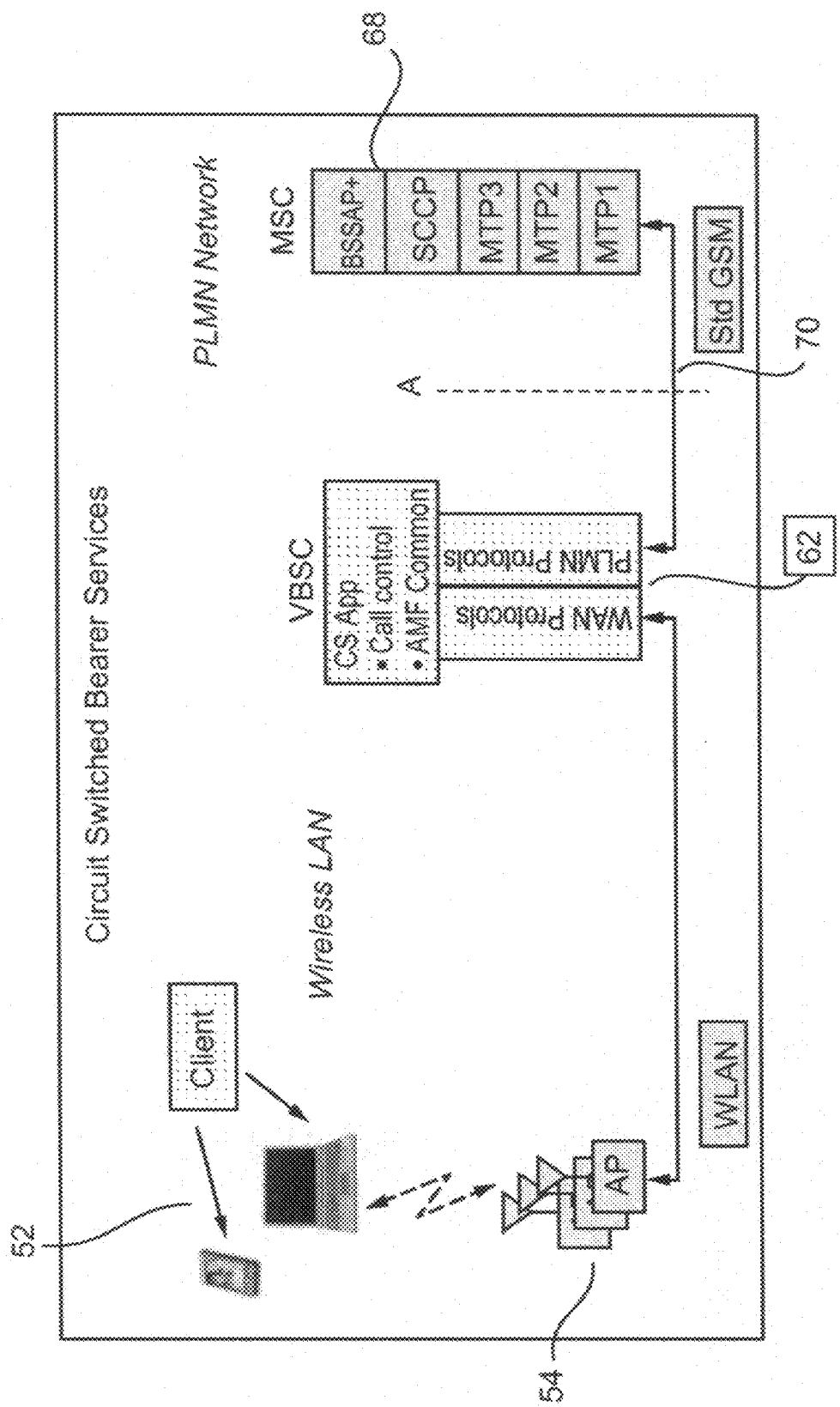
FIG. 11 is a schematic diagram showing protocol layers involved in the provision of circuit switched bearer services over PLMN and wireless networks, according to a preferred embodiment of the present invention.

Reference is now made to FIG. 11 which is a simplified protocol block diagram showing the protocols involved at different elements in providing circuit switched services. The communication path is substantially that shown in FIG. 7 and parts that are the same as those in previous figures are given the same reference numerals and are not referred to again except as necessary for an understanding of the present embodiment.

As mentioned above, after the access device has been authenticated it may be used for Packet Data connections or Circuit Switched connections. FIG. 11 illustrates the connection path for circuit switched services, with specific discussion of voice. As the skilled person will appreciate, fax and HS data are handled in an analogous manner.

For voice access the connecting device 52 preferably comprises a telephone keypad and display and supporting audio servers. If the device 54 is itself a telephone unit, such as a Bluetooth cordless telephone, then these features are inherent in the device and the client need only supply access to the data tunnel.

If the device is a standard PDA or Laptop, then the client preferably includes a soft telephone keypad and display and preferably also includes audio support. Such features are standard today in IP telephone clients.

Speech is preferably vocoded with AMR (Adaptive Multi-Rate), the currently adopted standard in GSM PLMN. Such vocoding may be carried out either in the client or at the VBSC, each possibility having advantages and disadvantages as follows:

1. Vocoder in the Mobile

AMR vocoding in the access device has the advantage of lowering the LAN voice bandwidth, at the expense of significant processing demands on the access device to perform the vocoding and a time delay associated with re-frame synchronizing of the AMR packets at the VBSC. The Wireless LAN transport channel may generally be expected to cause the time delay that leads to the need for resynchronizing. Packets passing through the channel may experience fragmentation, but due to the vocoding, only when the full frame has been received and reconstructed can the VBSC send it to the MSC over the A interface.

2. Vocoder at the VBSC

An alternate technique is to use at the client a so-called lighter weight vocoding technique of the type already in use for Voice over IP. At the VBSC the lighter weight coding is then preferably transcoded into AMR.

In the case in which the wireless LAN is Bluetooth based, vocoding may be dispensed with altogether at the client. This is because the Bluetooth Wireless LAN protocol supports a circuit switched channel that has been specifically designed for voice. It supports both 32 Kbps ADPCM and 64 Kbps PCM. If the Bluetooth voice channel is used, then the only vocoding that is required is at the VBSC.

A disadvantage with the schemes that place the Vocoder at the VBSC is that the Wireless LAN ends up carrying a significantly higher rate voice channel. This results in a loss of channel capacity, especially since this capacity must be guaranteed to maintain its real time characteristics.

As shown in the above figures, the VBSC 62 is installed at the LAN. It may however alternatively be installed alongside PLMN facilities, typically the carrier switching center. The advantage of the former method is that a VBSC failure may affect just one LAN. The latter case allows a single VBSC to serve numerous LANs, with consequent savings in cost, but a higher level of reliability is advised.

The VBSC provides a protocol bridge between the LAN and the cellular network, allowing the two to work together as an integrated whole. Thus, carriers can use non-PLMN networks (Bluetooth, 802.11b, etc) to offer subscribers 3G services that are not otherwise available, whether for reasons of available bandwidth or because the receiving devices do not have the sophistication to receive them. Thus for example most mobile telephones cannot accept any but the simplest images, whereas even the most elementary PDA, which can connect to the LAN network, can accept relatively sophisticated images. Subscribers may be offered a higher speed, richer experience from the non-PLMN networks themselves whilst at the same time having full access to standard voice and data services. Subscribers may additionally be provided with consolidated billing and service profiles with the standard PLMN network Carriers obtain a lower cost access network that allows them to lower price to their subscribers. Subscribers may be offered communications privacy over the network, in an integrated security mechanism such as the SIM gateway. Likewise simultaneous Voice and Data communication is provided.

Virtual VSGSN Plus

In order for the interface between the non-PLMN and the PLM networks to be effective and to allow the non-PLMN part of the network to provide its own contribution to the user's experience, a feature known as virtual SGSN Plus (VSGSN+) is provided to support Peer to Peer, Peer to Local Server and Peer to Off Network communications while interconnected with a PLMN network as if were an integral part of that network. Specifically the VSGSN enables the non PLMN Access Network to appear as both a serving GPRS support node (SGSN) for packet data and BSC for circuit switched data.

A standard serving GPRS support node (SGSN) is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with the SGSN. The Plus in the name refers to the function that supports Circuit Switched Communication, which is not normally part of GPRS and thus not supported by a standard SGSN.

In order to provide for such integrated activity, the interface is required to provide inter alia the following services:

Authenticate and register the subscriber,

Update the location of the subscriber (to support inbound messages/calls),

Support subscriber generated service requests,

Integrate activity into a consolidated bill, and

Provide a range of other supporting functions.

The Virtual Base Station Controller (VBSC), as described above, enables the above services, but does not in itself enable Peer-to-Peer, Peer to Server and Peer to Off Network communication. The VSGSN+ incorporates all of the VBSC functions with the addition of supporting Peer to Peer, Peer to Sever and Peer to Off Network connections.

Returning now to FIG. 6 and a key point to observe is that the BSS 40 interfaces to the MSC via the A interface for Circuit Switched connections. The SGSN 46 interfaces to the MSC/VLR 44 via the Gs, the AuC/HLR 78 via the Gr and the rest of the network elements via the Gn interface. These interfaces are used by the VSGSN+ so that it appears to the PLMN as both a standard BSS and a standard SGSN that would normally constitute part of the PLMN network.

Figure 12:
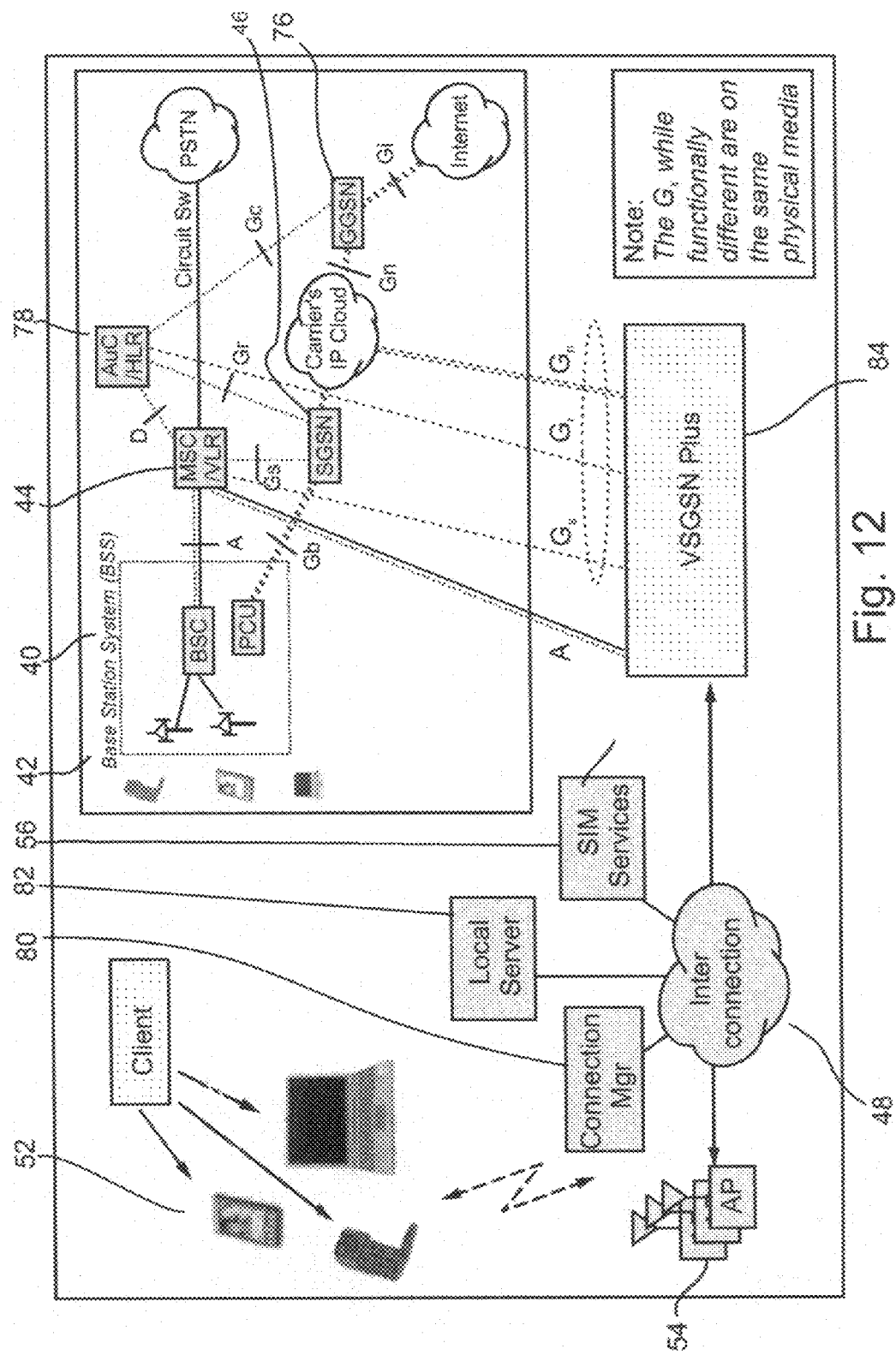
FIG. 12 is a simplified schematic diagram showing a virtual SGSN+ used as an interface between a wireless LAN and a PLMN network according to a preferred embodiment of the present invention.

Reference is now made to FIG. 12, which is a simplified block diagram showing an overview of the VSGSN+ and how it fits into the network environment. Parts that are the same as those in previous figures are given the same reference numerals and are not referred to again except as necessary for an understanding of the present embodiment. A wireless LAN 48 has a SIM server 56 as before but additionally has a connection manager 80 and a local server 82, which latter carries media rich data specific to the LAN. The network is connected to a VSGSN+ unit 84 which interfaces between the LAN and the PLMN network in much the same way as the VBSC of previous figures.

The VSGSN+ 84 interconnects with the PLMN as if it were a standard SGSN; it may use an auxiliary A interface. The Gs and Gr and Ga interfaces are used to communicate to the MSC/VLR 44 and HLR 78 and CGF (not shown in picture) for such general PLMN network functions as Authentication, Registration, Service Profiles and traffic measurement including accounting, for example over the Ga interface to the CGF. By contrast, bearer data traffic flows over the Gn interface, to and from the carrier's IP cloud. While the different Gx interfaces are functionally different, they are physically located on the same transport media. Circuit switched voice control, and the respective bearer signal, is communicated, again through the VSGSN+, but via the A interface.

The non PLMN local network is equipped with Connection Manager 80, as mentioned above, to establish Peer-to-Peer and Peer-to-Local Server as well as peer-to-off network Servers. The Connection Manager 80 achieves these connections by supplying the VSGSN with the identification of the connected parties and the amount of data moved between the parties. The information is used by the VSGSN to format a Call Detail Record input. The format is one that the PLMN expects from a standard SGSN, and the Call Detail Record is required by the PLMN in order to perform its call management functions.

The VSGSN+ initiates and responds to messages from the PLMN, and interacts with elements within the access network to perform these functions.

Figure 13:
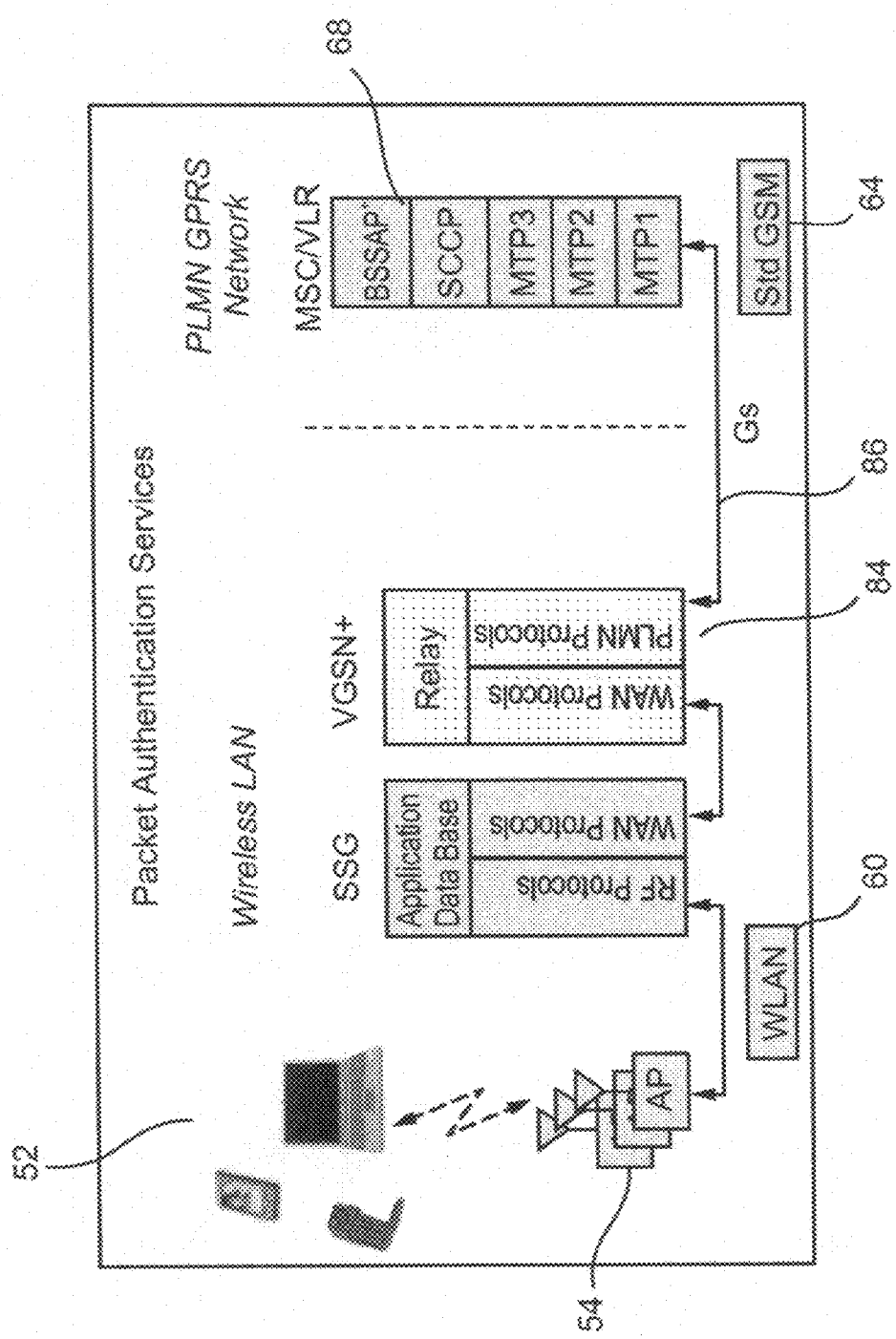
FIG. 13 is a schematic diagram showing protocol layers and packet data authentication between a wireless LAN and a PLMN network according to a preferred embodiment of the present invention.

Reference is now made to FIG. 13, which is a simplified block diagram showing the protocols available at different parts of the LAN PLMN interface, particularly for use in authentication. The figure is the same as FIG. 8 except that the Gb interface is replaced by the Gs interface 86. The VBSC 62 is replaced by the VSGSN+ 84, which operates similarly as a bridge between the LAN protocols and the PLMN network protocols. More particularly, the figure shows the protocols involved when the VSGSN+ 84 interfaces between the PLMN's MSC/VLR 68 and the LAN SSG for registration. FIG. 13 concentrates on the packet switched side, i.e. data transmission. For voice etc. the interaction with the MSC over the A interface is similar.

Figure 14:
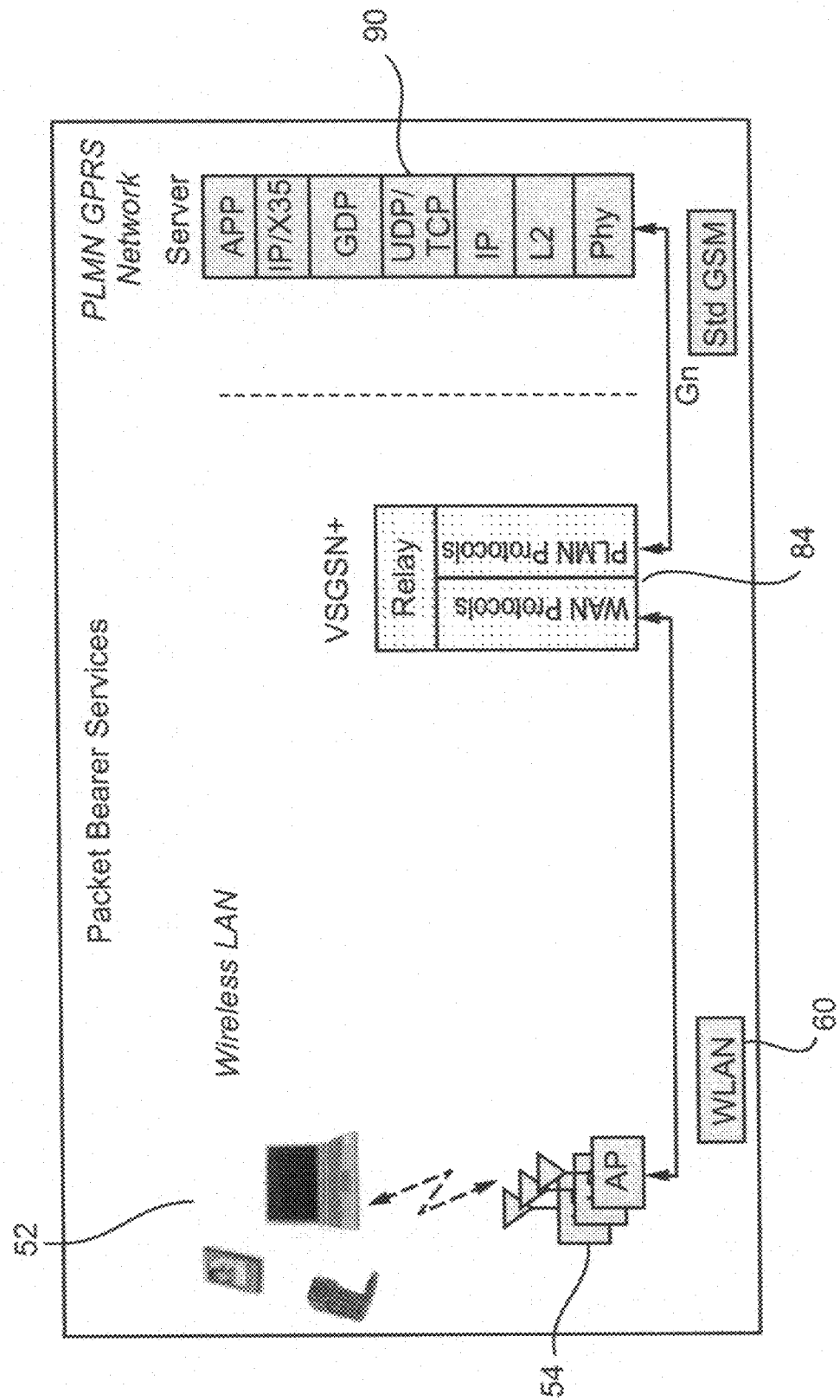
FIG. 14 is a schematic diagram showing protocol layers for the provision of packet bearer services between a wireless LAN and a PLMN network according to a preferred embodiment of the present invention.

Reference is now made to FIG. 14 which is a simplified diagram showing the network and protocol environment of a data bearer PLMN server 90. The VSGSN+ interfaces between the LAN and the PLMN as for FIG. 12 above.

In addition to direct Internet connection, if available, the access client 52 runs standard GPRS applications, which may typically include access to services on the cellular IP network for special email, video streaming, etc. Communication is via the data and protocol path shown in FIG. 14. Although not shown, applications can obtain access outside the PLMN GPRS network via the GGSN.

The data access client can be assembled from standard GPRS software protocol elements and may communicate over TCP/IP to the VSGSN+.

Figure 15:
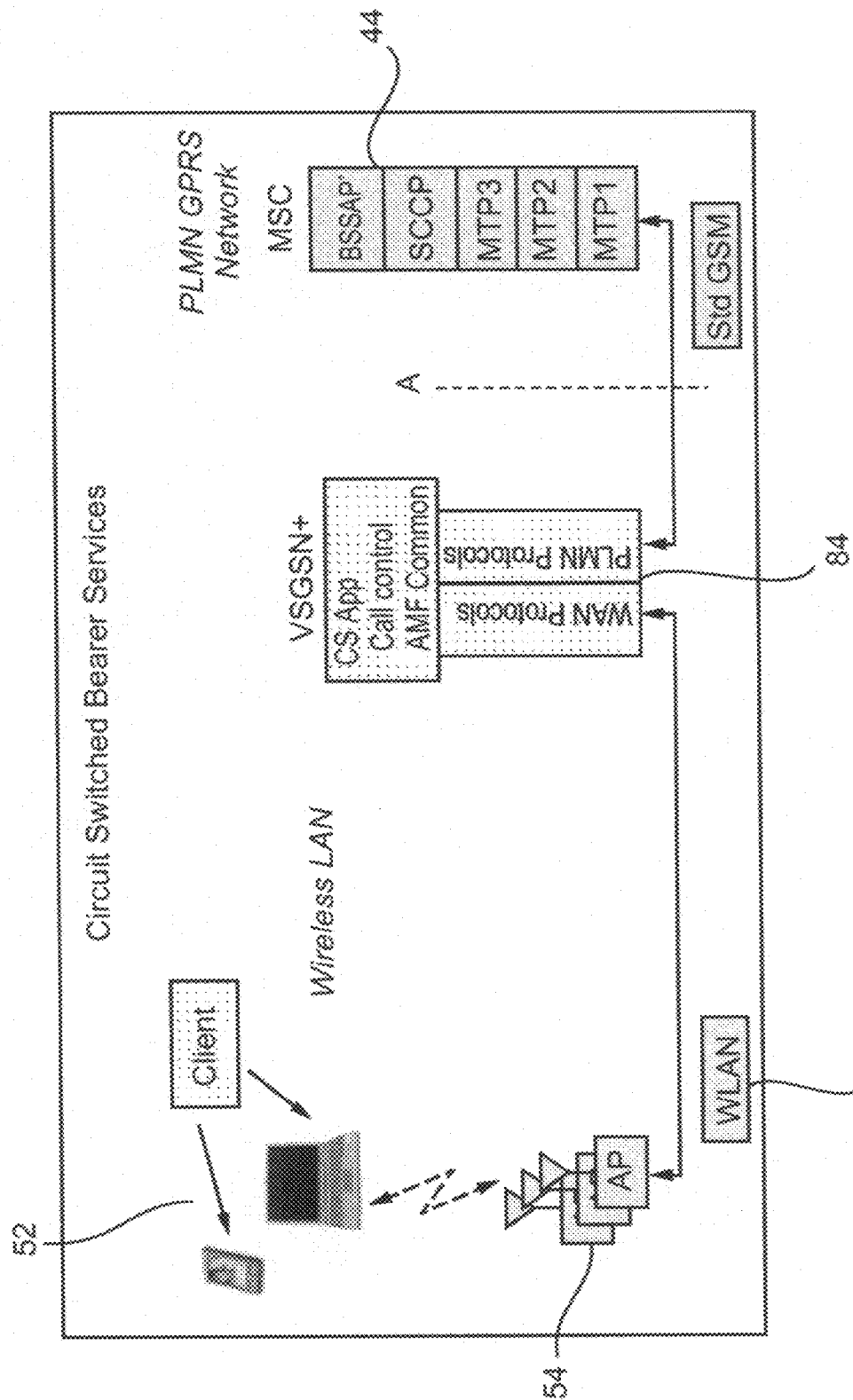
FIG. 15 is schematic diagram showing protocol layers for the provision of circuit switched bearer services between a wireless LAN and a PLMN network according to a preferred embodiment of the present invention.

Reference is now made to FIG. 15, which is a simplified diagram showing the circuit switched bearer services protocol and network environment. Again the VSGSN+ acts as an interface between the LAN 60 and the PLMN, this time connecting to the MSC 44 via the A interface. Issues of voice compression and vocoding are the same as described in respect of the VBSC above.

Figure 16:
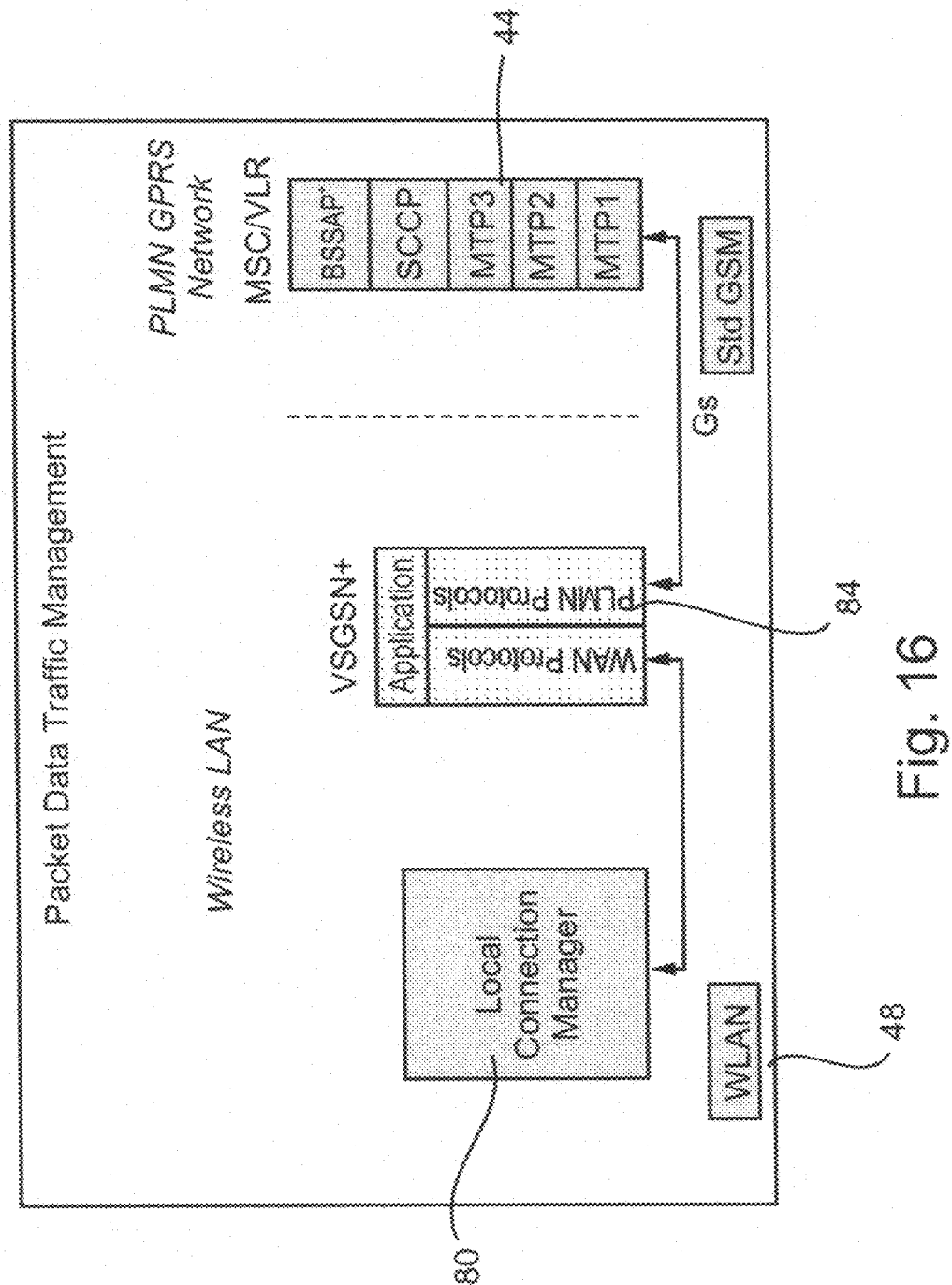
FIG. 16 is a schematic diagram showing protocol layers for the provision of packet data traffic management between a wireless LAN and a PLMN, according to a preferred embodiment of the present invention.

Reference is now made to FIG. 16, which is a simplified schematic diagram showing the network protocol environment and illustrating packet data traffic management. As discussed above, the VSGSN+ 84 is intended to support non-PLMN Access Networks that can provide connection types including Peer-to-Peer, Peer to Server and Peer to Off Network. All of these connection types are preferably established and managed by the Connection Manager 80. The VSGSN+ obtains traffic management information from the connection manager node and formats it into message sets that are compatible with the PLMN format. As a minimum, Call Detail Records (CDRs), which have been mentioned above, are generated in this manner.

FIG. 16, shows the message flow for Packet Data services. Circuit Switched communication is handled in an analogous manner with the A interface replacing the Gs interface.

As for the VBSC above, the VSGSN+ can be installed at the Wireless LAN location or at the carrier-switching center. A trade off between cost and reliability applies as above. If a centralized VSGSN+ is used it should preferably have a high level of availability.

In the case where multiple non-PLMN Access Networks are in close geographical proximity, a centralized VSGSN+ will most likely be the preferred approach.

In addition to the advantages described above in respect of the VBSC, the VSGSN+ provides support for Peer to Peer, Peer to Server and Peer to Off Network communications, without loss of visibility or control by the PLMN.

VSGSN+ Summary

The VSGSN+ carries out the following tasks:

(1) authentication of the mobile using the appropriate means for the mobile in question, whether it has a SIM or not, using standard or proprietary means, which in some cases may require VSGSN+ to interface the HLR; this is what Gr is for; and (2) impersonation of a standard mobile towards the network, going through the A or Gs interface if it is to connect to the MSC for circuit switched data, using Gb if it is to connect to a standard SGSN for packet data, even using Gn if it takes the role of SGSN and connects directly to a GGSN (the Gn interface, which is really a tunnel carrying whatever data the mobile is exchanging).

It is noted that the VBSC is a particular case of the more general one of the VSGSN+.

Handoff

The handoff aspect of the present invention adds the concept of handoff to the control of communication in multiple wireless networks not presently having this capability. Effective handoff allows the user to obtain all of the benefits of a wireless LAN when he is within range but still to be mobile, in that the connection is retained when he moves out of range, either by connecting to another wireless LAN or by connecting directly to the PLMN network if he has a suitable client.

In order to provide an overall solution, five different general cases are considered as follows, with subcases for each:

1. Intra Hot Spot handoff
   a) Between overlapping Wireless Networks (WNs) operating with the same technology
   b) Between non-overlapping WNs operating with the same technology
   c) Between overlapping WNs operating with different technology
2. Inter Hot Spot handoff
   a) Between overlapping Hot Spots operating with the same or different technologies
   b) Between non-overlapping Hot Spots operating with the same or different technologies
3. Inter wireless wide area network (PLMN) handoff
   a) Between overlapping PLMNs operating with different technology
   b) Between non-overlapping PLMNs operating with different technology
4. Handoff between wireless local and wide area networks
   a) Handoff from local to wide area network
   b) Handoff from wide to local area network
5. Expansion of the handoff concept for connection and reconnection to the WWAN (cellular, GPRS) network through a wireline network e.g. Internet Conceptually, the following cases are covered by the handoff aspect of the present invention:

1. Handoff may be commanded by a Network Controller entity or initiated by the User unit
2. The network maintains a strong session logic that takes into account handoff and temporary drops in communication. The session may be continued after communication is established on the new network. The system is able to determine that the user has dropped from one network and joined another one and is then able to resume the session that was interrupted. Alternatively, the user unit informs the network that it is resuming an interrupted session
3. Hard handoff or soft handoff may be supported. In the case of soft handoff there is no interruption, and connection with the new network is established while communication is still in effect with the original network
4. Hand off may be dealt with by the AP communication protocol (the medium access control or MAC). This may require modification of the existing protocols. If this option is not available, system logic may support controls outside the MAC to initiate communication with another AP and then re-establish the session. Although neither AP knows that a handoff has occurred, the AP that has been supporting communication up till now preferably reacts as if the user has dropped off the network. At the same time the AP to which communication has been transferred preferably reacts as if a new user (and new session) has accessed its network.
5. The logic preferably supports all or a subset of a system including:

Multiple Hot Spots; each Hot Spot may comprise one or several APs. Hot Spots may operate using the same or different local area technologies or connection protocols, e.g. 802.11b, Bluetooth, etc. and one or more wide area technologies or communication protocols e.g. GPRS, CDMA2000, Reflex 6. The logic preferably determines a priority order of search to determine when handoff is required between APs of the same technology;
APs of different technology;
Local area and wide area technology; and
Different wide area technologies.

The mobile unit preferably connects through a logic entity designated the Service Controller that is responsible for the maintenance of the mobile communication sessions. These sessions are independent communication entities between the mobile and another party or service, defined as the remote or far end of the session (the mobile being defined as the near end). The Service Controller may support services that from the remote end may seem to be circuit switched or packet switched, voice/data/voice over data, real and non real time. The purpose of the handoff is thus to ensure the continuity of these sessions when the mobile changes its access channel.

The session is defined within any protocol, standard or non-standard, that is common to the mobile unit and to the Service Controller, including but not limited to IP-based protocols. The session is implemented as a layer above the communication between the mobile unit and the access channel it is presently using, be it a wireless Wide Area Network (WWAN), a Wireless Local Area Network (WLAN), Internet, intranets, PSTN, etc. Thus the networks addressed within the present embodiments include among others PLMNs (including GPRS, EDGE and CDMA cellular data), the various 802.11 WLANs, Bluetooth, ISDN, X.25, Frame Relay, etc.

Multiple types of handoff are discussed below. For the purpose of clarification of the concepts, each definition addresses a specific case, e.g. handoff between WLAN and WWAN. It is stressed upfront that in practice a complex handoff logic, including one or more of the methods defined above, may be operated within the same mobile unit and activated as the need arises. For example, a mobile losing communication within a WLAN may be trying to perform handoff to another Wireless Network within the same WLAN Hot Spot as well as looking for a possible handoff to a WWAN, so when more than one course of action is feasible, the mobile, its Service Controller or even the Hot Spot Controller is able to select for use the handoff with the highest priority or benefit.

Continuity of service is ensured for multiple cased of networks that are not integrally equipped with handoff or handoff capabilities. This continuity is implemented by performing handoff at a layer above the communication of the networks. Details of the implementation vary according to the type of wireless networks supported by the handoff.

Figure 17:
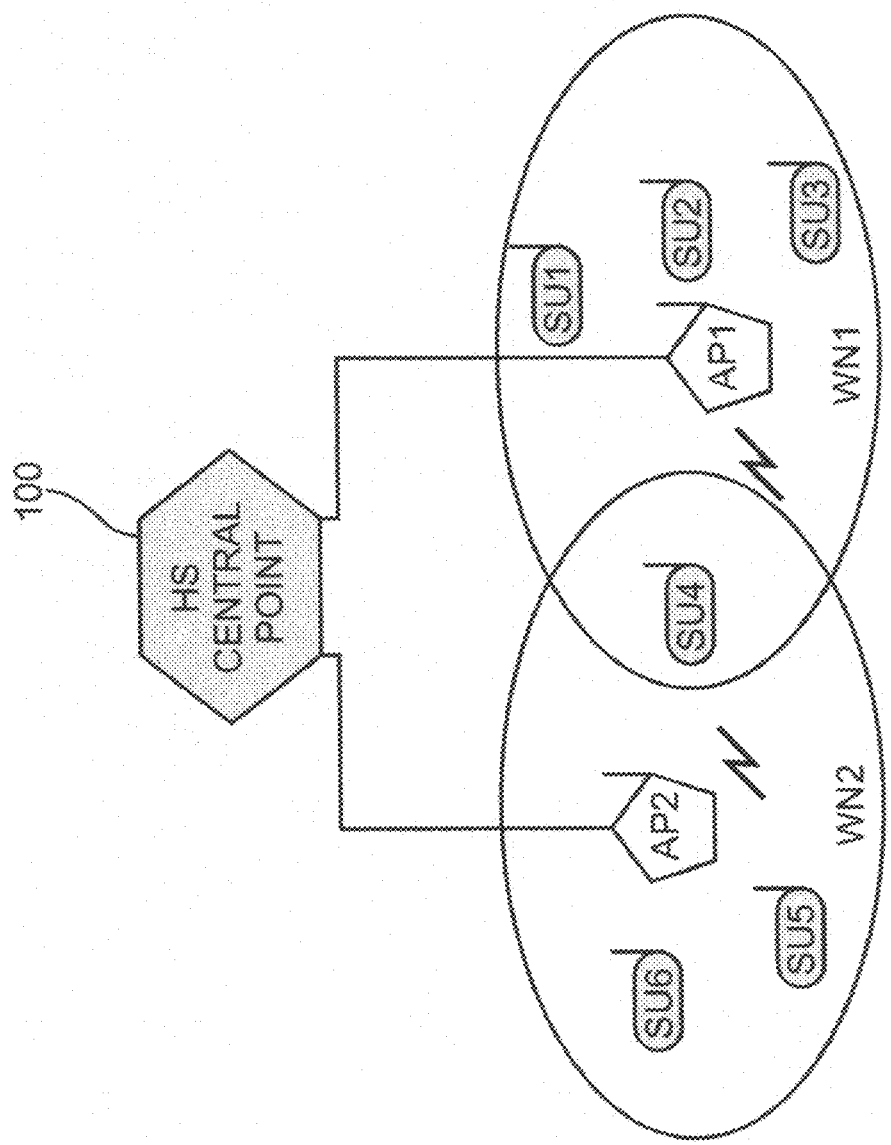
FIG. 17 is a schematic diagram showing two wireless networks that cover common area and are jointly connected to a hot spot central point that can be used to co-ordinate handovers between the network in accordance with a preferred embodiment of the present invention.

Reference is now made to FIG. 17, which is a simplified schematic diagram showing two local wireless networks WN1 and WN2 overlapping in their coverage area, and both being controlled from the same Hot Spot Central Point 100. The first Wireless Network, WN1, comprises an Access Point AP1 which controls four subscriber units SU1-SU4. The second wireless network WN2 has an Access Point AP2 which controls two subscriber units SU5-SU6.

Mobile subscriber (MS) unit SU4 is currently being served by AP1, i.e. it is part of WN1. When communication conditions within WN1 become unacceptable, either because of degraded signal reception at SU4 or AP1 (e.g. due to mobility and interference) or if the load within WN1 happens to be too high, a handoff process is carried out in which SU4 becomes part of WN2 and the same session SU4 that was being conducted through WN1 continues now via WN2.

Figure 18:
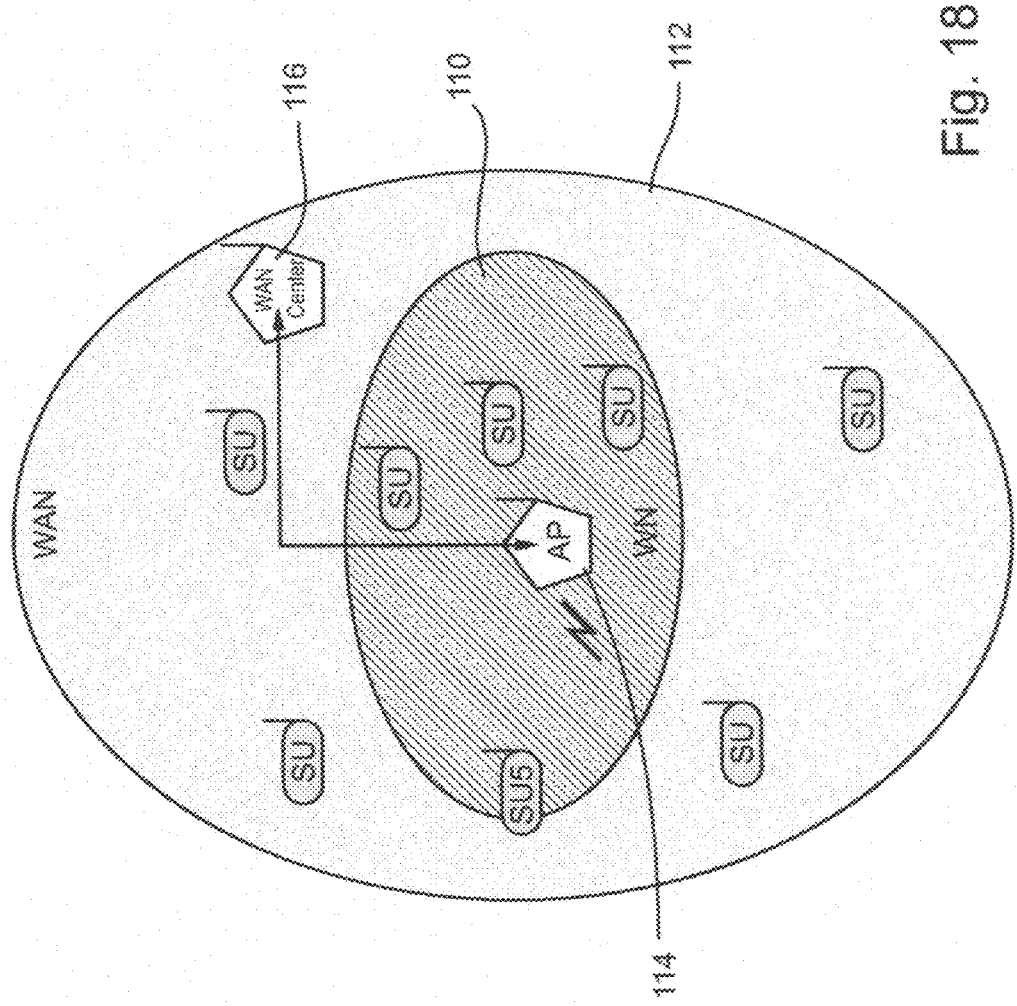
FIG. 18 is a schematic diagram showing a wireless LAN lying inside coverage area of a cellular or PLMN network in accordance with a preferred embodiment of the present invention.

Reference is now made to FIG. 18, which is a simplified schematic diagram showing a local wireless network 110 operating within the coverage area of a wide area network 112. The local Wireless Network 110 comprises an access point (AP) 114 from which it is assumed to be controlled, although, in the alternative, it may be controlled from a Hot Spot Central Point as depicted in FIG. 17. The Wide Area Network 112 is controlled from a WAN Center 116. Several subscriber units SU operate within each network. A specific subscriber unit SU5 is transitioning between the two network, i.e. it has been operating within the WAN 112 and transfers to the WN 110 or vice versa.

Several solutions are proposed for the implementation of this handoff while maintaining the sessions of the wireless subscribers operating within the networks. The solutions are intended to support a wide range of mobile and network capabilities.

It is pointed out that the solutions hereindescribed, whether they address hard or soft handoff, may be implemented on a time division basis, supporting sharing of resources to reduce cost of hardware and thereby to minimize interference typical of the implementation of more than one radio within a single mobile unit.

Solution 1—Intra Hot Spot Handoff Between Overlapping Wireless Networks—same Technology 1. Brute Force Switching of Wireless Network Communication with Continuity at the Session Level.

Figure 19:
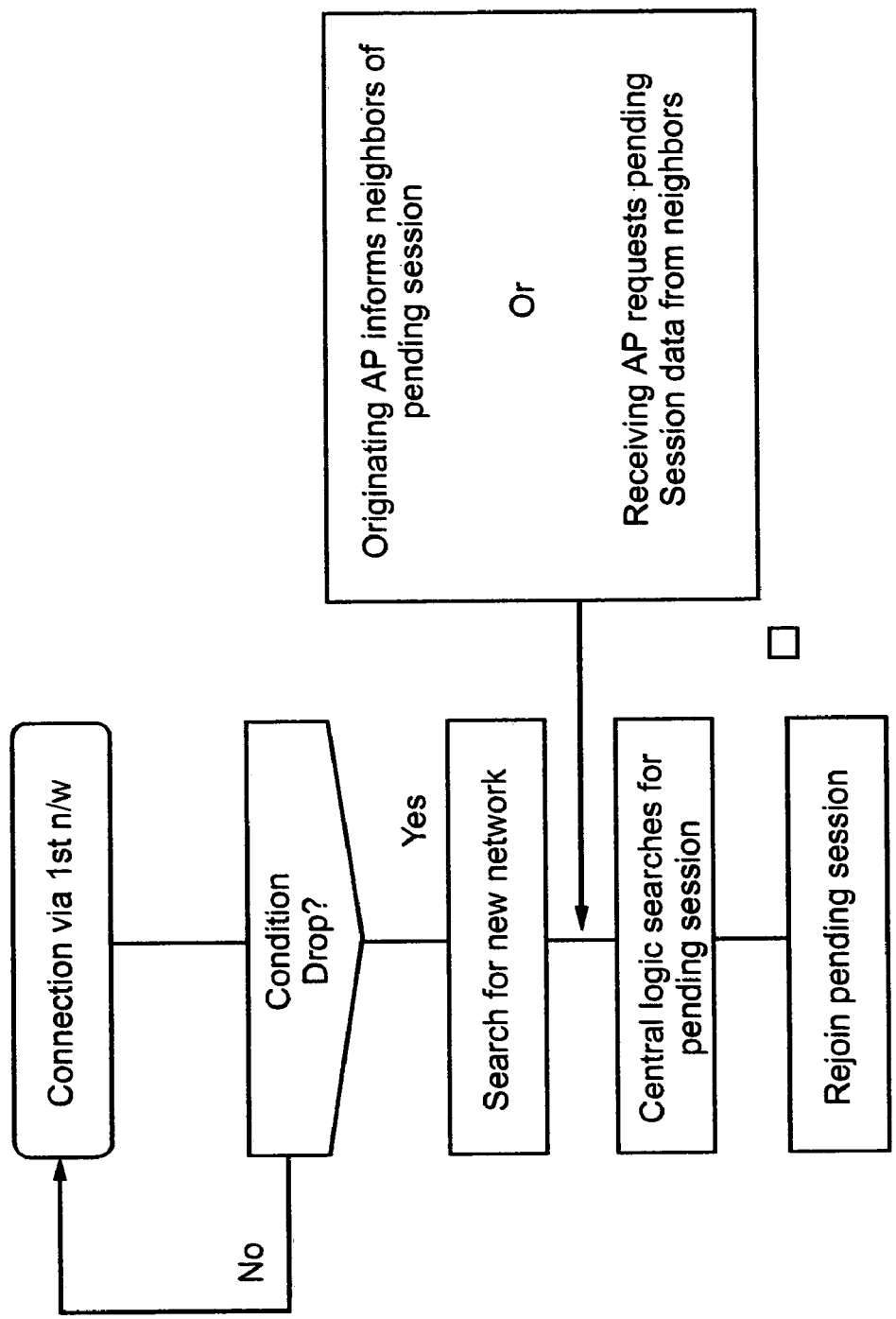
FIG. 19 is a generalized flow diagram showing an overall scheme for handoff between two networks in accordance with a preferred embodiment of the present invention.

Reference is now made to FIG. 19, which is a simplified flow chart showing the handoff between interlapping wireless networks which use the same technology. When either network or mobile identify communication conditions are unacceptable, the respective party drops the communication. The user device may just drop and switch to another wireless network, or the AP may comprise a stopping service which actively drops the user. In both cases, the MS attempts to join another network, in this case WN2. Once communication is re-established, the Central Point logic determines that there is a pending (waiting or interrupted) session with the user device and the pending session is automatically re-joined. When implementing distributed Central Point logic (CP logic within the AP), the AP controlling the accepting wireless network is informed of the pending session of this MS by either one of push or pull logic. In the push case the AP of the previous serving wireless network takes the initiative of informing the AP of the receiving wireless network (and potentially other neighbor wireless networks) of the pending session; the pull case means the AP of the receiving wireless network requests information on the pending sessions of the MS that joined the new network.

2. Hard Network Controlled Handoff with No Local Wireless Mobile Assistance

Figure 20:
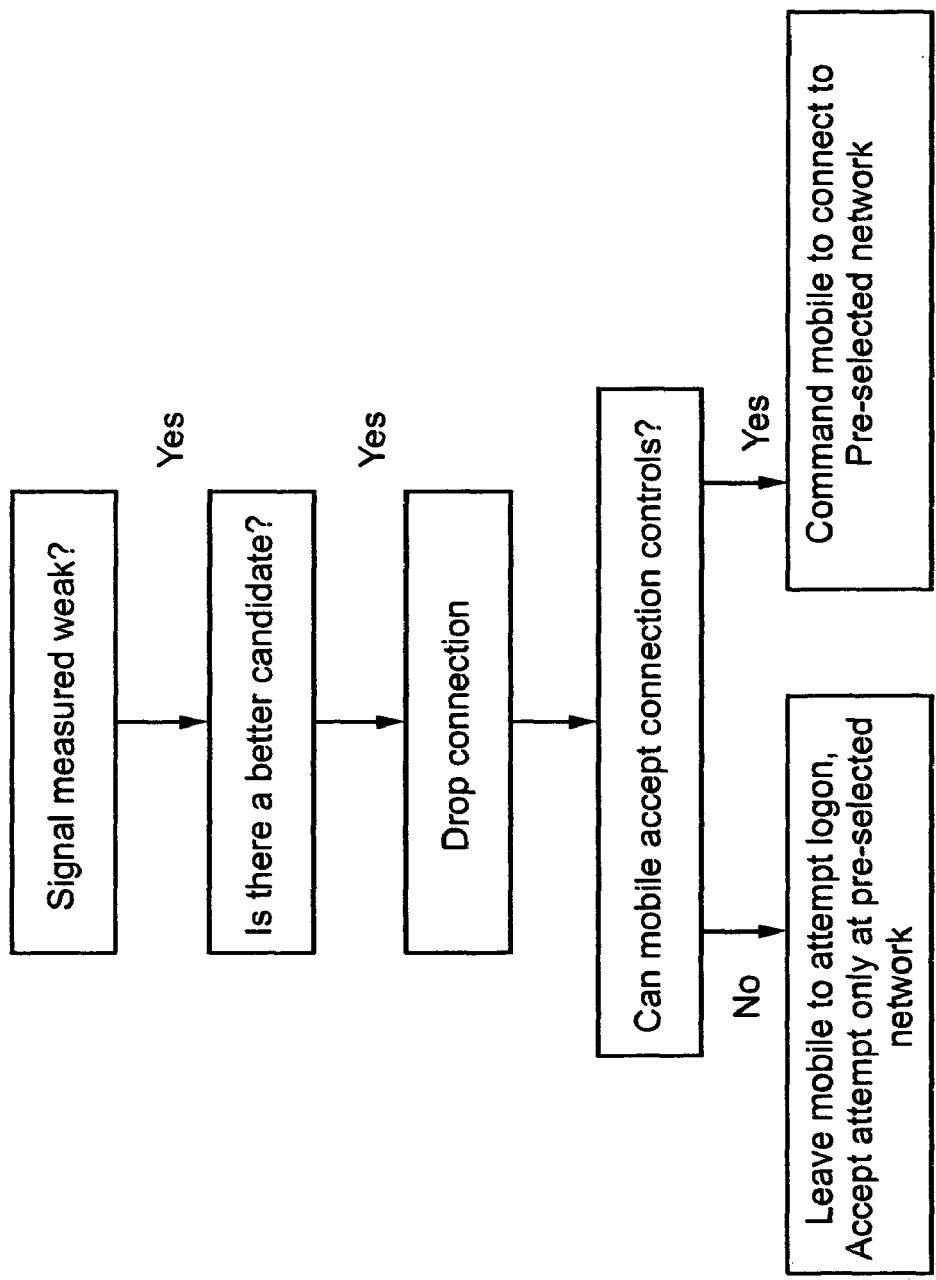
FIG. 20 is a generalized flow diagram illustrating handoff from the point of view of the mobile unit in accordance with a preferred embodiment of the present invention.

Reference is now made to FIG. 20, which is a simplified flow chart showing how handoff is carried out without assistance from the mobile devices. In this implementation, secondary receivers within neighbor wireless networks measure reception from the user that may require to be handed off. The secondary receiver may be a separate receiver or may simply comprise some time slots allocated for this purpose within the regular AP receiver work plan.

The decision to hand off the mobile from one WN to another is now determined by the CP, in case of the centralized logic, or by the servicing AP and the APs of the candidate receiving WNs. If this logic determines one of the candidate receiving WNs may provide improved communication service, per its measured mobile to AP communication characteristics and its loading conditions (either one or both), the handoff takes place.

The mobile is handed off from the servicing WN to the receiving WN in one of two ways:

a) If the mobile is capable of accepting wireless network selection controls, it is commanded to hand off to the selected (receiving) WN, including if possible transfer of the WN communication parameters to speed up the hand off process;

b) If the mobile is not capable of accepting wireless network selection controls, it is dropped off the servicing WN by refusing service; then the mobile tries to log onto another WN, and only the selected (receiving) WN accepts its attempts to join the network 3. Mobile Assisted Hard Network Controlled Handoff In this implementation, the local wireless mobile searches additional channels to measure and determine communication conditions of other networks and sends this information to the AP. The network architecture may be either centralized or distributed, the AP accordingly either maintaining the information locally or sending it to the CP.

The local wireless mobile searches additional channels when any one of the following conditions are met:

a) The mobile is programmed to perform the search at regular intervals and the end of the interval is reached. The search interval may be pre-programmed or controlled through AP transmissions.

b) The mobile is commanded by the AP to search additional channels. This will typically occur when the AP determines a handoff may be required.

c) The mobile is commanded by the CP or distributed CP logic to search additional channels. This search may be required to support analysis of current Hot Spot communication conditions, and allowing reallocation of WNs if necessary or for testing purposes.

The CP (or distributed CP logic within the AP) then determines which is the best WN the mobile may be handed off to. This decision is based on the reported communication conditions, the loading conditions of the WNs and the services required by the mobile. The AP controlling the WN is then notified.

The mobile is handed off from the servicing WN to the receiving WN in one of the two ways discussed with reference to FIG. 20:

a) If the mobile is capable of accepting wireless network selection controls, it is commanded to hand off to the selected (receiving) WN, including if possible transfer of the WN communication parameters to speed up the hand off process;

b) If the mobile is not capable of accepting wireless network selection controls, it is dropped off the servicing WN by refusing service; then the mobile tries to log onto another WN, and only the selected (receiving) WN accepts its attempts to join the network 4. Mobile Controlled Hard Handoff.

In this implementation, the local wireless mobile searches additional channels when (i) the quality of service it is getting is not satisfactory, or (ii) when it receives a command to hand-off to a better channel in a different WN.

The mobile then performs the search and measurement of all wireless networks it can receive and determines which is the best one to switch to. The criteria to determine best WN to switch to may include measuring of communication characteristics as well as network loading.

The mobile then drops off the WN that has been servicing it. The option is retained for the mobile to send a notification before dropping off the WN in order to speed up the handoff process.

After dropping off from the current servicing WN, the mobile attempts to join the WN it has selected for handoff. The system may identify that the mobile has been handed off from its current servicing WN to a new one and ensures that it resumes its session or sessions through the new WN.

Although in the preferred embodiment of the handoff method no network assistance is required, the option is retained to implement the handoff as described with network assistance. Network assistance may be provided for any of the following:

(i) identification of acceptable neighbor WNs i.e. provision of their communication parameters, for example to prevent attempts to log into WNs that belong to other systems;

(ii) information on loading conditions or other availability parameters of neighbor WNs; and (iii) information on expected loading conditions of the servicing WN.

5. Network Commanded, Mobile Controlled Hard Handoff

Figure 21:
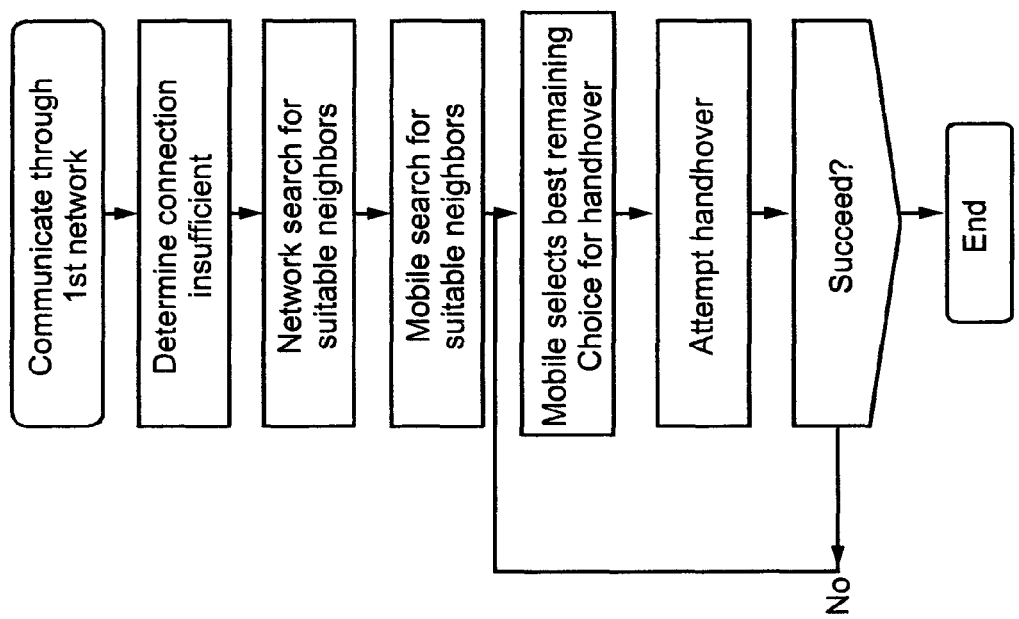
FIG. 21 is a generalized flow diagram showing an alternative embodiment of a handoff procedure in accordance with a preferred embodiment of the present invention.

Reference is now made to FIG. 21, which is a simplified flow chart showing a method for implementation when the network control, either residing in the CP or in the AP, determines that the servicing WN cannot support the mobile service communication conditions. Network control may or may not determine potential neighbor networks that have the capability to support service; if this capability is determined, network control (through the AP communications) sends information on the communication parameters of available WNs to the local wireless mobile.

The mobile then searches for other WNs that may support its service requirements. In the preferred embodiment of this method, the mobile unit time multiplexes its search of neighboring networks with its communication within the service WN, thus minimizing the handoff service impact. When this is not feasible, an optional embodiment is retained wherein the mobile drops servicing network access and searches for neighbor WNs. In both embodiments the mobile may use data previously provided by the network or engage in a blind search.

Based on this search, the mobile determines which WN it will hand off to and attempts to access this WN.

If the mobile does not succeed in accessing the selected WN, the mobile attempts to access the next best WN according to its search results, and so on.

After access is successfully completed, network control recognizes that this is a resumption of a previous session or sessions ensuring continuity of the session.

6. Soft Handoff

Four of the previous five methods described above with hard handoff may also be implemented using "soft" handoff. The term "soft" handoff as used herein refers to maintaining seamless continuity of communication when transitioning from one WN to another, with no impact whatsoever on the sessions active within the local wireless mobile including those that depend on time bounded continuity of communication.

Soft handoff as supported by the present embodiments may be implemented by establishing communication between the mobile unit and the second AP before dropping it from the presently serving AP. As an alternative it may be achieved by switching WNs fast enough so there is no discontinuity in session communication.

Soft handoff may for example be achieved if the secondary AP uses a slot designated for outward transmission in which it in fact listens to the present mobile unit. In the reverse case in which the mobile unit is taking the initiative, the mobile may use slots designated for it to transmit to listen to an active neighbor system.

Several methods are discussed hereinbelow to implement soft handoff within a WN.

a) Soft Network Controlled Handoff with No Local Wireless Mobile Assistance

In this implementation, secondary receivers within neighbor wireless networks measure reception from the user that may require to be handed off. The secondary receiver may be a separate receiver or some time slots allocated for this purpose within the regular AP receiver work plan.

Network control provides accurate parameters of the new serving AP to the mobile and handoff controls to the new serving WN so there is no interruption in service.

b) Mobile Assisted Soft Network Controlled Handoff

In this implementation, the local wireless mobile searches additional channels to measure and determines communication conditions of other networks and sends this information to the AP, which depending on the centralized or distributed architecture maintains the information locally or sends it to the CP.

The HS network control (centralized or distributed) now selects the new serving WN based on the information provided by the mobile and the operational status of its WNs.

Network control provides accurate parameters of the new serving AP to the mobile and handoff controls to the new serving WN.

In order to ensure uninterrupted communication, the mobile now establishes communication within the new serving WN without disconnecting its old WN communication. Once communication is established, the mobile drops off the WN that has been servicing it. A variation allows the mobile to send a notification before dropping off the WN.

c) Mobile Controlled Soft Handoff

In this implementation, the local wireless mobile searches additional channels when (i) the quality of service it is getting is not satisfactory, or (ii) when it receives a command to hand-off to a better channel in a different WN.

The mobile then performs the search and measurement of all wireless networks it can receive and determines which is the best one to switch to. The criteria to determine best WN to switch to may include measured communication characteristics as well as network loading (either/or).

The mobile then notifies Network Control as to which WN it selected for the handoff and waits either for an acknowledgment or a time out to expire, upon which it establishes communication with the new WN without disconnecting from the present WN. After communication is established, the mobile drops off the WN that has been servicing it. The option is retained for the mobile to send a notification before dropping off the WN.

d) Network Commanded, Mobile Controlled Soft Handoff

This method is implemented when Network Control, either residing in the CP or in the AP, determines that the servicing WN cannot support the mobile service communication conditions. Network control may or may not determine potential neighbor networks that have the capability to support service; if this capability is determined, network control (through the AP communications) sends information on the communication parameters of available WNs to the local wireless mobile.

Once the mobile is in possession of the potential WNs, the process continues as in the previous case (mobile controlled soft handoff)

Figure 22:
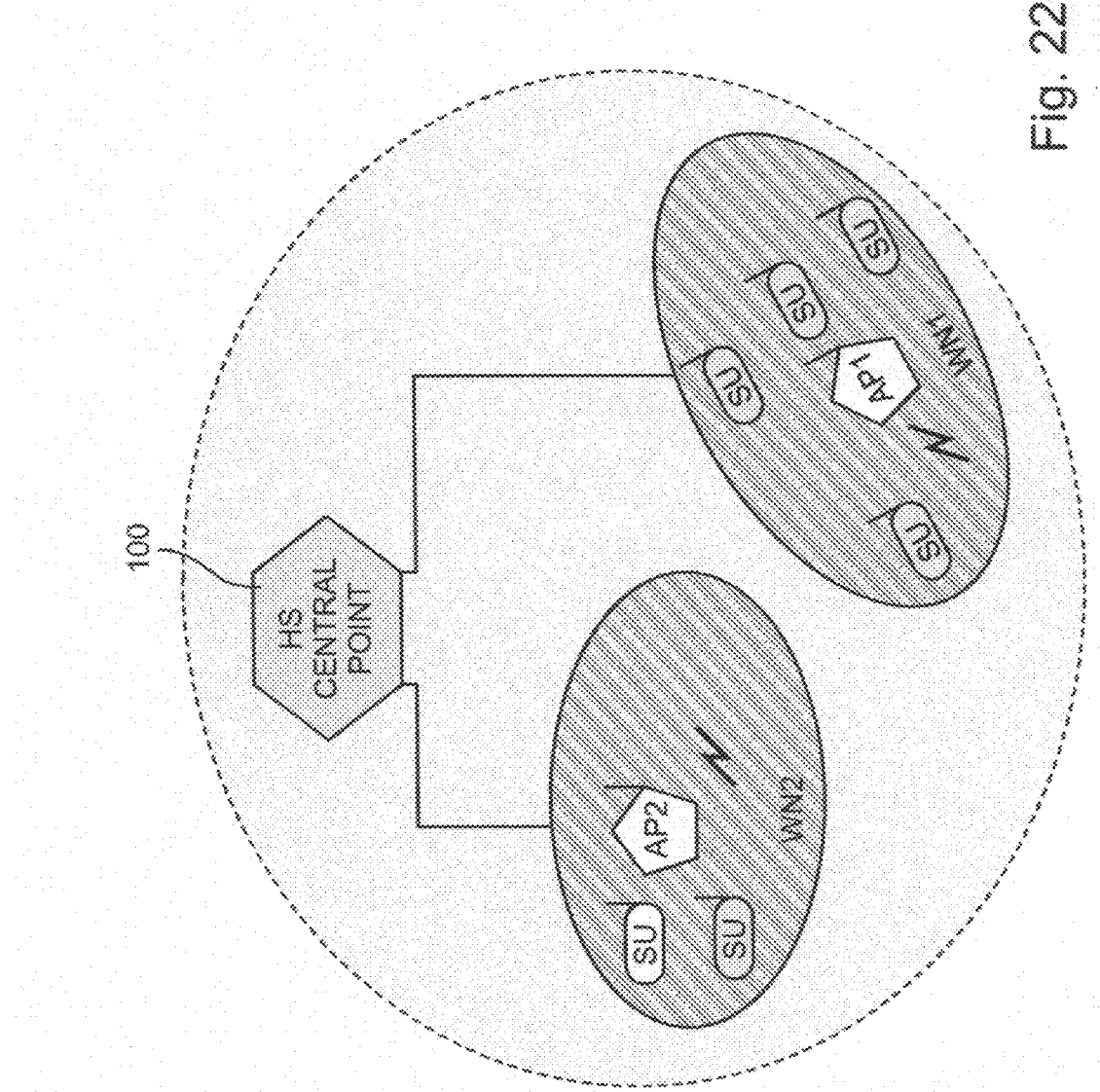
FIG. 22 is a simplified schematic diagram illustrating two non-overlapping WLANs having a common central point.

Intra Hot Spot handoff between non-overlapping WNs operating with the same technologyReference is now made to FIG. 22 which is a simplified schematic diagram depicting two non-overlapping WNs within the same Hot Spot, and connected to a single central point 100. The Hot Spot may include additional WNs. When a unit drops off the communication of a WN, and at the same time the communication conditions do not allow it to establish communication with another WN, it is assumed that the user is not within coverage area of the Hot Spot. It could be that the Hot Spot is in fact covering the unit but is not presently capable of supporting it, however this case is preferably handled in the same way as if the unit is not within the coverage area. In this latter case the unit is preferably not treated as if it has dropped off the network. Rather, for the duration of a time out that may be constant or configurable, the logical communication of the unit may be held off or frozen. The time out may be defined differently for circuit switched communication and for packet communication, or for voice and data. Upon expiration of the time out, the communication with the unit mayl be assumed to be lost.

If, while the communication continues, the unit accesses another WN, the Hot Spot control preferably immediately treats it as in the first handoff case defined above (brute force switching of wireless network communication with continuity at the session level).

Intra Hot Spot Handoff Between WNs Operating with Different Technology

A further embodiment is also described by FIG. 22, the difference being that in this case the WNs are operating with different technologies, e.g. 802.11b WLAN (Wi-Fi) and Bluetooth respectively. Since different technologies are involved, it makes no difference whether the WNs are overlapping or not; the assumption is that the unit hands off communication from one WN before establishing communication within the other WN.

Preferably, handoff is carried out in much the same way as between overlapping WNs operating with the same technology and as described in detail above.

As before, the unit is not treated as if it has dropped off from the network. Rather, for the duration of a time out that is either constant or configurable, the logical communication of the unit is held off or frozen, that is the session is held pending. The time out may be defined differently for circuit switched communication and for packet communication, or for voice and data. Upon expiration of the time out, the communication with the unit is assumed to be lost.

The communication is by definition lost and a new communication is re-established. The Hot Spot controller, or any connection logic above it, checks the pending session of the user unit establishing communication. If the Hot Spot connection logic succeeds in associating the mobile unit with a communication (one or more sessions) that is being held, the Hot Spot control immediately treats it as in the handoff case defined above for brute force switching of wireless network communication with continuity at the session level, and the session or sessions are re-established within a short time without data loss.

Figure 23:
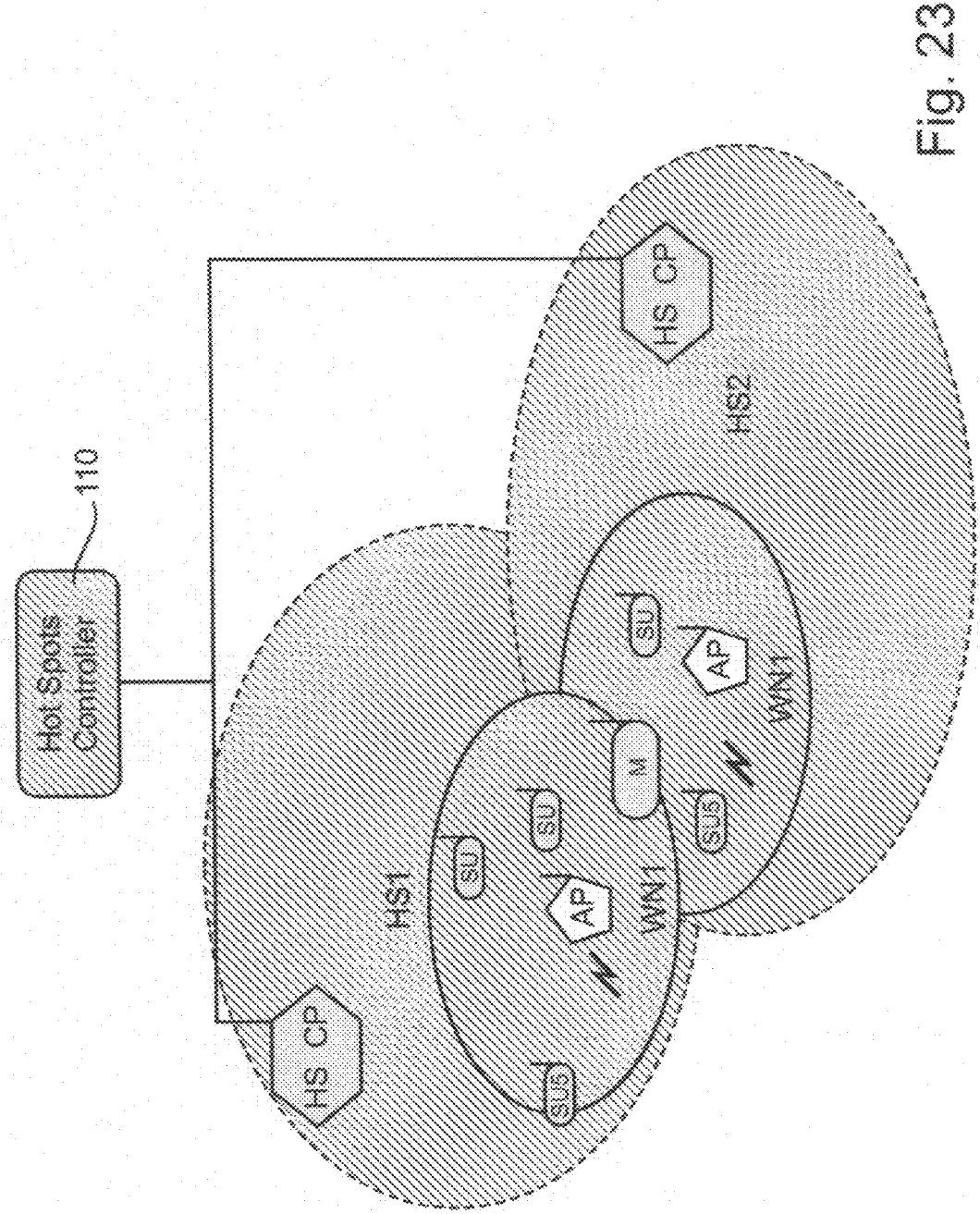
FIG. 23 is a simplified schematic diagram illustrating two overlapping WLANs each being part of a different hotspot and having a common central point beyond the realm of the hotspots.
Figure 24:
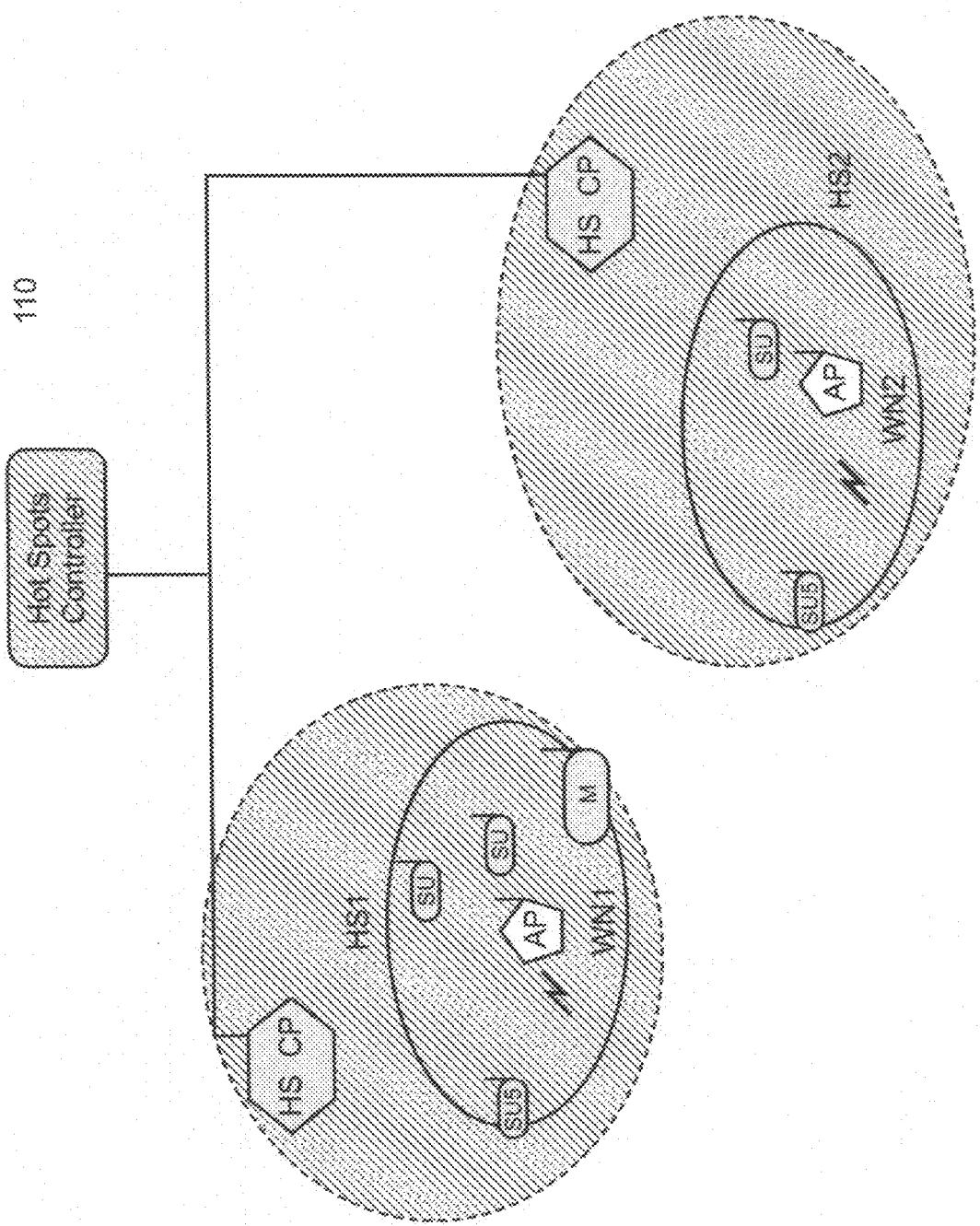
FIG. 24 is a variation of the scenario of FIG. 23 in which the hotspots do not overlap.

Intra Hot Spot Handoff Between Overlapping Hot Spots Operating with Same or Different Technologies The hand-off embodiments defined above may be expanded to include scenarios in which the mobile unit, rather than accessing a new WN controlled by the same Hot Spot, accesses a WN belonging to a different Hot Spot, as depicted in FIG. 23 for overlapping WNs and FIG. 24 for non-overlapping WNs.

In the case of FIG. 24 (overlapping WNs), handoff is treated in much the same way as that described for handoff between WNs in the same Hot Spot. All handoff techniques mentioned thereinabove apply to this case as well for both hard and soft handoff.

Intra Hot Spot Handoff Between Non-Overlapping Hot Spots Operating with Same or Different Technologies An embodiment is provided for the scenario of intra hot spot handoff in which the hotspots are non-overlapping. Such a scenario is illustrated in FIG. 24 which shows a hot spot controller 110 and two non-overlapping hot spots HS1 and HS2. Inside each hot spot is a wireless LAN, respectively WN1 and WN2. The hot spots may use the same or different technologies. The embodiment operates in a similar manner to the case of non-overlapping WNs within the same Hot Spot, as discussed above in respect of FIG. 23, and is characterized by a temporary loss of communication when the unit is out of coverage of any WN.

The solutions discussed above may also be applied to the scenario of FIG. 24. The Hot Spot controller 110, which is any entity controlling both Hot Spots, or at least exchanging information between the Hot Spots, ensures that the mobile unit sessions remain frozen, that is to say pending, but not lost. Alternatively, the Hot Spot that last serviced the mobile unit maintains the sessions in a frozen state. Maintaining the session open may be performed by not providing indications that the communication with the mobile is lost. Other parts within the system may ensure that as long as no such information is provided, and at least for the duration of the required timeout, the sessions may actually be maintained in this frozen state.

Referring now to FIG. 24, it is assumed that the mobile M was last serviced within wireless network WN1, which is located within Hot Spot 1. After the mobile M loses communication or service within WN1, then when it subsequently comes within the coverage of WN2 in Hot Spot 2 it establishes communication within this wireless network. The information regarding this communication establishment is sent to the Hot Spot Controller 110, whether the controller is implemented as centralized or distributed processing. A search is then performed to determine whether there are frozen sessions for the mobile M. If a frozen session is found, it is re-established ensuring no loss in communication. The optional communication techniques supporting this handoff process are the same as for the case of the handoff between WNs of the same Hot Spots.

The present embodiment thus ensures that the transfer between WNs of the same Hot Spot or between different Hot Spots maintains the same seamless properties.

Figure 25:
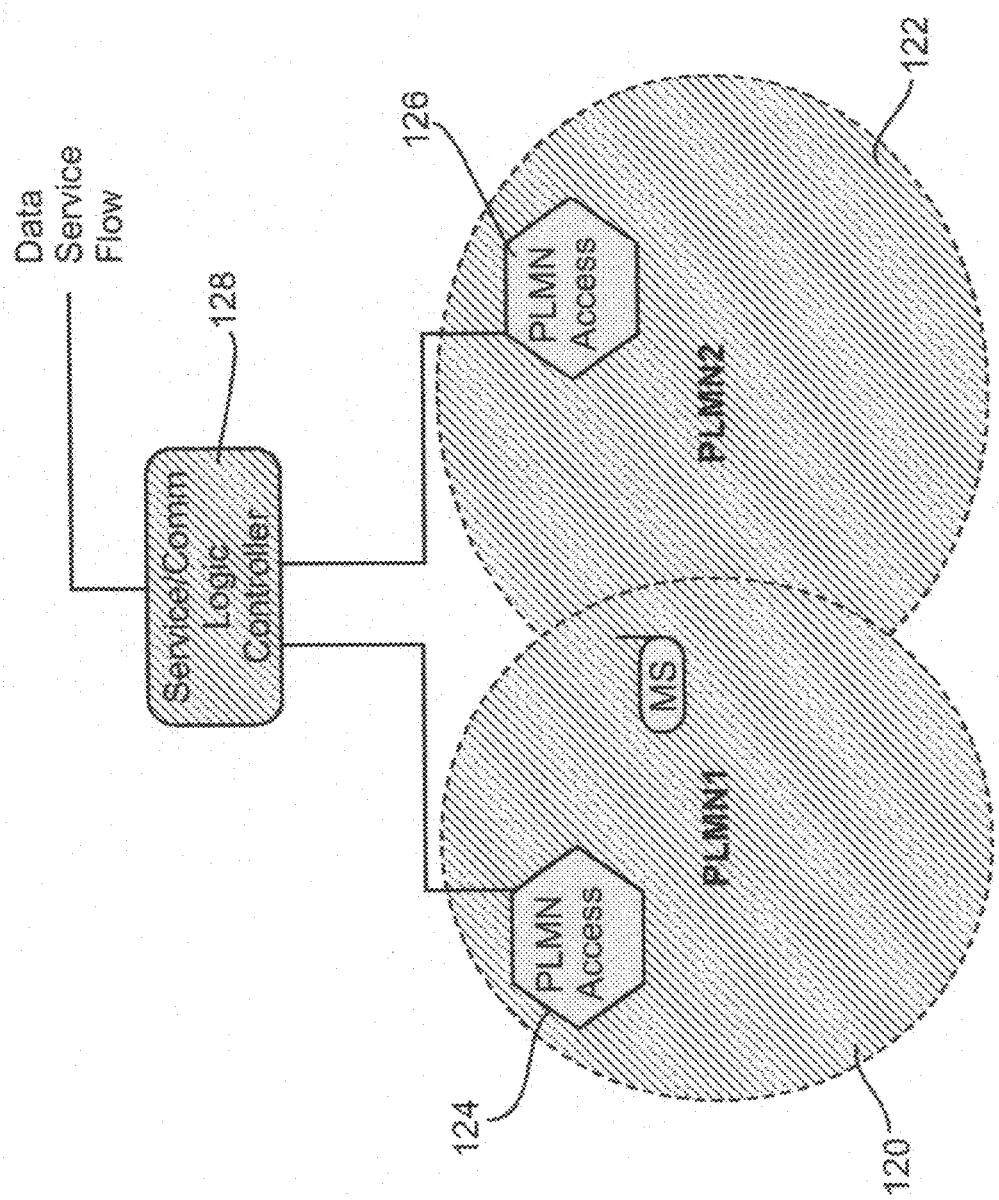
FIG. 25 illustrates two overlapping PLMN networks.

Inter-PLMN Handoff Between Overlapping PLMNs Operating with Different Technology Reference is now made to FIG. 25, which is a simplified schematic diagram illustrating handoff between overlapping PLMNs, which is to say two cellular networks. Two PLMNs, PLMN1, 120 and PLMN2, 122, overlap. Each has a an access point 124 and 126 respectively, and the access points lead eventually to a common logic controller 128.

An embodiment which is now to be described with reference to FIG. 25 addresses a way of improvement in providing service to a mobile unit that is capable of reception from two PLMNs covering the area where it is presently located. That is either that the two PLMNs use the same technology or the mobile unit is capable of connecting using two technologies.

The mobile M, using data communication (including voice over IP VoIP) is currently being serviced by PLMN1, 120. The quality of service becomes unacceptable, and the mobile is instructed to search, or searches on its own, for an alternative service. The result of the search indicates it may be serviced by PLMN2, 122.

In accordance with the present embodiment, the mobile unit is preferably serviced by Service Controller 128. The Service Controller is typically operated by a different service than the PLMNs, although in some cases it may actually belong to one of the PLMN carriers.

As explained below, embodiments are provided both for immediate continuity of service if the mobile, which is possible provided that the mobile unit is equipped to maintain simultaneous communication with both PLMNs, and for the simpler case where the mobile drops communication with PLMN1 and subsequently establishes communication with PLMN2.

When the service provided to the mobile within PLMN1 becomes unacceptable, whether due to poor communication conditions, loading or any other conditions within PLMN1, the unit searches for an alternative service. The Service Controller freezes the mobile ongoing sessions to a maximum duration of a pre-set time out that may be constant or configurable. The logical communication of the unit is thus retained or frozen while physical communication is not operational or is being re-established. The time out may be defined differently for voice and different types of data. Upon expiration of the time out, the communication with the unit is assumed to be lost.

The following optional techniques are proposed for the handoff between PLMNs:

1. Brute Force Switching of Wireless Network Communication with Continuity at the Session Level.

When PLMN, Service Controller or mobile unit identify communication conditions as being unacceptable, the respective party drops the communication. Communication drop by the Service Controller is preferably either by sending a control signal to the mobile unit or by disrupting the session flow to the point at which it causes the mobile unit to determine that communication must be switched. The mobile unit may then just drop communication and look for another PLMN to switch to, or the PLMN1 stopping service effectively drops the mobile unit. In both cases, the mobile unit finds that another PLMN is active in the area and attempts to join its network, in this case PLMN2. Once communication is re-established, the Service Controller identifies that there are one or more pending sessions with the reconnecting mobile unit and the session (or sessions) thus identified is automatically re-joined.

An alternative embodiment utilizes Service Control logic residing within the PLMN. In this case, the PLMN accepting the mobile finds out by contacting PLMNs operating within the area whether the mobile has been serviced lately and there are pending (frozen) sessions; alternatively, a PLMN maintaining an open session may inform neighbor PLMNs.

2. Mobile Assisted Hard Network Controlled Handoff

In a further embodiment, the mobile searches for and identifies the operation of another acceptable PLMN before dropping the PLMN where it is presently connected or active. The mobile then sends this information to the Service Controller or to another entity controlling the logic of its physical communication. This entity then instructs the mobile to switch to the new PLMN if it is determined to be acceptable per defined logical criteria (business relationship, loading conditions, mobile subscription contract, etc.)

The local wireless mobile unit searches for coverage by another PLMN when any one of the following conditions are met:

a) The mobile unit is programmed to perform the search regularly. The search interval may be pre-programmed or controlled through Service Controller or Communication Logic controller commands.

b) The mobile is commanded by the Service Controller or Communication Logic Controller to search additional channels. This may typically occur when the latter determines that a handoff may be required.

The Service Logic (or equivalent communication control logic) may then determine whether the mobile unit is in condition to actually be handed off to another PLMN. Such a decision is based on the reported communication conditions, the loading conditions of the candidate PLMN and the services required by the mobile. The PLMN may be notified if such a handoff is deemed worthwhile.

The mobile is preferably handed over from the servicing WN to the receiving WN in one of two ways as follows:

a) If the mobile is capable of accepting wireless network selection controls, it is commanded to hand over to the selected (receiving) PLMN. Such a handoff preferably includes transfer of the PLMN communication parameters to speed up the hand over process;

b) If the mobile is not capable of accepting wireless network selection controls, it is dropped off the servicing PLMN as a result of the network refusing it service. The mobile then tries to log onto another PLMN, and only the selected network accepts it.

3. Mobile Controlled Hard Handoff

In a further embodiment, the local wireless mobile searches for alternative PLMN coverage when (i) the quality of service it is getting is deemed not to be satisfactory, or (ii) when it receives from the Service Controller 128 or similar communication control logic a command to handover to a better communication service.

The mobile then performs the search and measurement of all PLMNs it can detect and determines which is the best one to switch to. Possible criteria for determining which is the best PLMN to switch to may include measured communication characteristics or any other relevant parameters that may be provided by the particular PLMN.

The mobile drops away from the PLMN that is currently servicing it. In a preferred embodiment the mobile unit sends a notification before dropping off the PLMN in order to speed up the handoff process.

After dropping off from the current servicing PLMN, the mobile unit attempts to join the PLMN that it has selected for handoff. The Service Controller 128 identifies that the mobile unit has been handed off from its previous servicing PLMN to a new one, typically by matching it to a pending session as before, and resumes its session or sessions through the new PLMN.

In one preferred embodiment of the above-described handoff method no network assistance is required. In an alternative embodiment, however, network assistance is used. Network assistance may be provided typically for any of the following:

(i) identification of acceptable neighbor PLMNs i.e. provision of their communication parameters, for example to prevent attempts to log into PLMNs known to be operational within the area but not acceptable because of other constraints;

(ii) information on loading conditions or other availability parameters of neighbor PLMNs; and (iii) information on expected loading conditions of the servicing PLMN.

4. Network Commanded, Mobile Controlled Hard Handoff

A further embodiment encompasses a hard handoff that is network commanded but controlled by the mobile unit. The embodiment is implemented when the session control, either residing in the Service Controller 128 or other communication control logic, determines that the servicing PLMN cannot support the mobile service communication conditions. Network control may or may not determine potential availability of neighboring networks that have the capability to support service. If such a capability is identified, then the network control preferably sends information regarding communication parameters of candidate PLMNs to the local wireless mobile unit.

The mobile then searches for other PLMNs that may support its service requirements. In the preferred embodiment of this method, the mobile unit time multiplexes its search of neighbor networks along with communication within the servicing PLMN, thus minimizing the handoff service impact. When handoff is not feasible, an option is for the mobile unit to drop servicing PLMN access and search instead for neighbor PLMNs. In both embodiments the mobile may use data previously provided by the Service Controller network or it may engage in a blind search.

Based on the search, the mobile determines whether it may perform handoff to another PLMN and attempts to access this PLMN.

If the mobile does not succeed in accessing the selected PLMN, the mobile attempts to access the next best PLMN as indicated by its search results, and so on.

After access has been successfully completed, the Service Controller recognizes that the connection is in fact a resumption of a previous session or sessions, and is thereby able to ensure continuity of the session.

5. Soft Handoff

Three of the previous four embodiments described above that use hard handoff may also be implemented using soft handoff. As mentioned above, the term "soft handoff" as used herein refers to maintaining seamless continuity of communication when transitioning from one PLMN to another, with no impact whatsoever on the sessions active within the local wireless mobile, including those that depend on time bounded continuity of communication. That is to say, there are time bounded communication limitations e.g. tcp and time bounded applications e.g. streaming. The point about soft handoff is that no sessions are frozen, therefore no degradation in service is perceived.

Soft handoff as supported by the present embodiments may be implemented by establishing mobile unit communication with the second PLMN before dropping communication with the current serving PLMN. Alternatively it may be achieved by switching PLMNs fast enough so there is no discontinuity in session communication. To support the latter conditions, the Service Controller 128 may advance data to the mobile unit. The advance data may be buffered to maintain the service during handoff. Mobile logic may also switch to a degraded mode that requires less data, extending the time supported by the buffer for continuous service as perceived by the user of the mobile unit.

The handoff may be soft if common service is available among both PLMN networks, at least in the direction of transition of the mobile, so that the candidate PLMN may use its own resources to listen to the mobile unit before the handoff actually occurs; or conversely, when the mobile is taking charge of the soft handoff, then the mobile unit is able to use its own resources to monitor the neighboring PLMN whilst still connected to the first PLMN.

Several methods are represented by the following embodiments to implement this soft handoff:

a) Soft Network Controlled Handoff with No Mobile Assistance

In this embodiment, secondary receivers within the neighbor (candidate) PLMN measure reception from the mobile after it has been notified by the Service Controller of that mobile that it may require to be handed over. The secondary receiver may be a dedicated receiver, may comprise temporarily available resources or simply some time slots allocated for this purpose within the PLMN work plan.

The Service Controller provides parameters of the new PLMN to the mobile unit so there is no interruption in service.

b) Mobile Assisted Soft PLMN Handoff

A further embodiment comprises a soft handoff from PLMN to another with assistance from the mobile unit. In this embodiment, the mobile searches additional channels to measure and determine communication conditions of other PLMNs and sends the information to the Service Controller or similar Communication Control logic.

The Service Controller or similar Communication Control logic, whether centralized or distributed, now selects the new serving PLMN, based on the information provided by the mobile unit and the operational status of the PLMNs. Preferably, the PLMNs provide such status information to the Service Controller/Communication Logic supporting the mobile.

The Service Controller then provides parameters of the new serving PLMN to the mobile. Additionally, the service controller provides handoff controls/indications to the new serving PLMN, if the latter is capable of accepting them.

In order to ensure uninterrupted communication, the mobile unit now establishes communication within the new serving PLMN without disconnecting its old PLMN communication. Once communication is established, the mobile drops off the old PLMN. In a variation, the mobile unit sends a notification before dropping off the PLMN.

c) Mobile Controlled Soft Handoff.

A further embodiment involves soft handoff from one PLMN to another under full control of the mobile unit, by contrast to the previous embodiment which was merely mobile assisted. In the embodiment, the mobile unit itself searches for channels of additional PLMNs when (i) the quality of service it is getting is not satisfactory and it cannot get better service within the present PLMN, or (ii) it receives a command to hand-off to another PLMN.

The mobile then performs the search and which involved making a measurement of all wireless networks it can receive. From the measurements it determines which is the best network to switch to. The criteria to determine the best PLMN to switch to may include measured communication characteristics as well as network loading, if broadcast or available from the Service Controller.

The mobile then notifies the Service Controller/Communication Logic 128 which PLMN it has selected for the handoff and waits either for an acknowledgment or a time out to expire, at which point it establishes communication with the new PLMN without disconnecting from the present PLMN. After communication is established, the mobile unit drops off the PLMN that has been servicing it. In a variation, the mobile sends a notification before dropping off the PLMN.

d) Network Commanded, Mobile Controlled Soft Handoff

A further embodiment encompasses a network commanded handoff which, once commanded by the network is fully implemented under control of the mobile unit. The method is implemented when the mobile Service Control/Communication Logic Controller determines that the servicing PLMN cannot support the mobile service communication conditions. Service Control may or may not determine potential neighbor PLMN networks that have the capability to support service. If a capability is determined, then the Service Control sends information on the communication parameters of available PLMN to the local wireless mobile.

Once the mobile is in possession of the candidate PLMNs, the process continues as in the previous mobile controlled soft handoff embodiment.

It is noted that the above PLMN concepts may be expanded to any type of wireless wide area network (WWAN). Such expansion is contemplated within the scope of the present invention.

Figure 26:
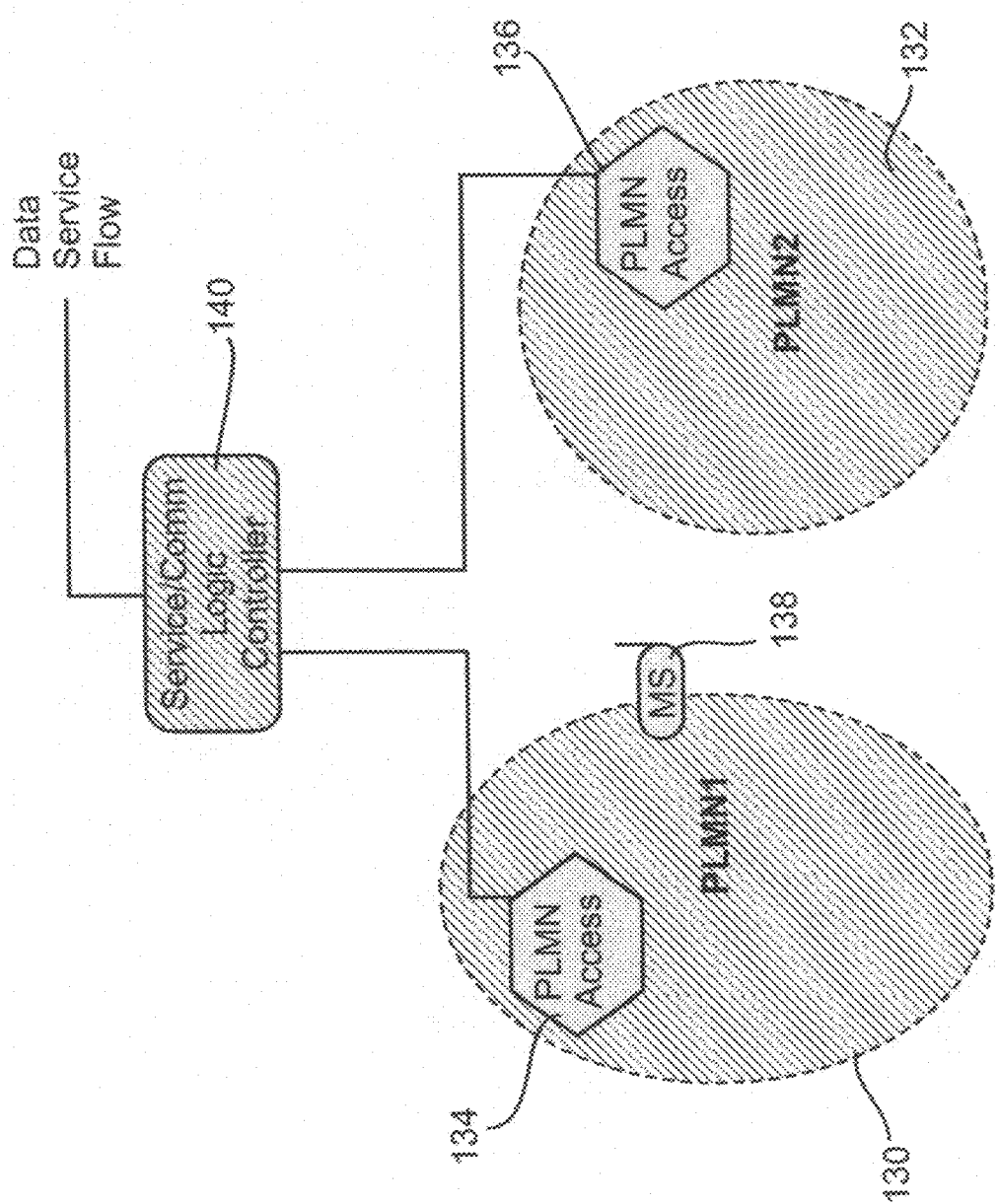
FIG. 26 illustrates two non-overlapping PLMN networks.

Inter-PLMN Handoff Between Non-overlapping PLMNs Operating with Different Technology Reference is now made to FIG. 26, which is a simplified schematic diagram illustrating two non-overlapping PLMN networks having a common service/communication logic controller. Two networks, PLMN1, 130 and PLMN2, 132 each have respective access points 134 and 136. A mobile unit 138 is at the edge of PLMN1 coverage, and PLMN2 has coverage within the vicinity but without any actual overlapping. For practical purposes it could be that the PLMNs have overlapping coverage within some area that does not include the present MS location, but this does not affect operation as far as mobile unit 138 is concerned. Logic controller 140 is located at a point accessible from both PLMN networks.

The embodiment for dealing with handoff in the case of FIG. 26 is a particular case of the overlapping PLMN handoff.

Once the mobile MS drops off its communication with a PLMN, in this example PLMN1, its sessions are held off (frozen) by the Service Controller 140. The Service Controller freezes the ongoing mobile sessions for up to a preselected maximum duration. Thus, logical communication of the mobile unit will be held off or frozen while the physical communication is not operational or is being re-established. The maximum duration may be defined differently for voice and different types of data. Upon expiration of the time out, the communication with the mobile unit 138 is assumed to be lost.

At the time communication with the current PLMN is lost, typically per logic in the mobile unit, it searches continuously or intermittently for an alternative PLMN service. When it comes into the coverage area of another PLMN, in this example PLMN2, it establishes communication with it.

The mobile communication is routed to its Service Controller 140. Depending on implementation details, this may be implemented automatically within the PLMN, however within the preferred embodiment the mobile unit provides the address of its Service Controller 140 after joining the PLMN network.

The handoff process is thus implemented in the present case at the session level, without involving the PLMN. When the mobile unit re-establishes communication with the Service Controller 140, the latter looks up any sessions that are still pending for the mobile, i.e. those sessions whose time out has not expired and were not disconnected by the party with which they were held. Those sessions are now allowed to continue, and there is preferably no loss of data in either direction.

It is pointed out that the session handoff is applicable to numerous data communication protocols; which may be IP-based or may use any other basis that is common between the mobile and its Service Controller. The only requirement is that the mobile be able to achieve communication with the Service Controller through the PLMN that it is presently communicating through.

Handoff Between Wireless Local and Wireless Wide Area Network

Further embodiments concern handoff between wireless LAN and WAN. More particularly, additional embodiments of this invention address handoff for service optimization for dual mode mobiles capable of accessing a wireless wide area network such as a PLMN (e.g GPRS) on the one hand and a Hot Spot a location supported by one or more wireless local network such as a 802.11 WLAN or a Bluetooth, the local network being serviced by one or more Access Points. These wide area and local area modes are referred to herein using the term "communication modes". The respective scenario is as illustrated in FIG. 18.

As before, the mobile unit connects through a logical entity designated Service Controller that is responsible for maintenance of the mobile communication sessions.

The purpose of the handoff in this case is to support the best communication for the mobile, per defined system service criteria subject to the limitations of the WWAN and the WLAN. Typical service system criteria are best quality of service and lowest cost, however other criteria may be implemented within the entities that control the communication flow: the mobile client, the Service Controller and the communication networks (the WWAN and the WLAN). As will be appreciated, since the hotspot is entirely within the purview of the WWAN the question of service quality falling below a threshold does not really apply.

Alternative embodiments consider a case in which a mobile unit has the capability to search for another communication mode and a case where again it has the ability to search in the other communication mode, but only by interrupting the present communication mode.

The logic used in the presently preferred embodiment operates simply by automatically associating a higher priority with the WLAN connection. This means that whenever Hot Spot connectivity and PLMN connectivity are available, the Hot Spot connection is preferred.

In the present embodiment, a mobile unit is connected to a PLMN when it detects the presence of a WLAN. As the WLAN service has priority the mobile unit attempts to connect to the WLAN. The methods by which the mobile unit verifies that the WLAN is valid for it and establishes communication with its Service Controller through the WLAN are as described above and are not repeated in the present connection.

During the course of a handoff, the mobile unit connects with the new network and establishes communication once again with the Service Controller. Alternatively, the Service Controller establishes communication with the mobile. The open cellular session is maintained as long as is necessary, and at least until the reconnecting mobile is identified or until a timeout is reached.

Maintaining the session in the case of a cellular data service means that the cellular data protocol is used and user data is actually tunneled through whatever access channels are being used, e.g. in the WLAN. This ensures that the cellular service is unaffected even though a non-cellular channel is being used for mobile access. In the case being considered, the access channel actually being used can in fact be any conceivable type of channel that the particular local LAN may be using. To further clarify this point, a subscriber of a GPRS network may access its cellular services through one of the gateways discussed hereinabove, by implementing an IP tunnel through its Service Controller. The Service Controller in this case may be implemented within the GPRS gateway or as a separate entity.

The mobile uses the WLAN access as long as its quality of service is acceptable, per criteria that are defined within the mobile client, the Service Controller or both.

When the mobile detects that its quality of service within the WLAN Hot Spot is unacceptable, or when so indicated by its Service Controller, it preferably starts searching for WWAN access. If communication is still available with the WLAN network, the mobile may notify its Service Controller of the need for handoff and its search for a different access route, including the WWAN access. A different embodiment has the Service Controller indicating to the mobile that it should hand off to the WWAN. This may be either as a general command or may specifically be a WWAN access which is expected to be operational within the area where the mobile is located. Handoff from the wireless local back to the wireless wide area network therefore takes place always, or almost always, when the mobile's WLAN connection is severely degraded or even lost and the mobile detects availability of the WWAN (e.g PLMN, GPRS). Generally that means that the mobile unit is simply moving out of range of the WLAN.

The various handoff methods that have been discussed above, can generally be applied to the present WLAN to WWAN case. Five different embodiments are discussed below:

1. Brute Force Switching of Wireless Network Communication with Continuity at the Session Level.

A first embodiment When Hot Spot Controller, Service Controller or mobile identify communication conditions are unacceptable, the respective party drops the communication. Communication drop by the Service Controller will be either by sending a handoff control signal to the mobile or by disrupting the session flow to the point at which it causes the mobile unit to determine that communication must be switched. The MS may then simply drop communication and look for a WWAN access to switch to, or may do it when it can no longer get service from the WLAN. In either case, if the MS finds a WWAN active in the area, it attempts to log on thereto. Once communication is re-established, the Service Controller identifies one or more pending sessions with the mobile unit and the identified session (or sessions) is automatically re-joined.

An alternative embodiment of the invention concerns a case in which Service Control logic resides within the WLAN Hot Spot. In this case, the Service Controller within the WWAN finds out by contacting the WLAN controller whether the mobile has been serviced lately and thereby that there are pending (frozen) sessions.

2. Mobile Assisted Hard Network Controlled Handoff

In this embodiment, the mobile searches for and identifies the operation of an acceptable WWAN before dropping the degrading service of the WLAN where it is still connected or active, albeit at an unacceptable quality of service. The mobile then sends the details of the identification it has made to the Service Controller or to another entity that controls the logic of the physical communication. The entity then instructs or enables the mobile to switch to the WWAN if it is determined to be acceptable per defined logical criteria (roaming agreements, loading conditions, mobile subscription contract, etc.)

The mobile is handed off from the servicing WLAN to the receiving WWAN in one of two ways:

a) If the mobile is capable of accepting wireless network selection controls, it is commanded to hand off to the WWAN. Preferably, if possible and required, transfer includes the WWAN communication parameters, thereby to speed up the hand off process;

b) If the mobile is not capable of accepting wireless network selection controls, it is simply dropped off the servicing WLAN by discontinuing service; at which point the mobile unit tries to log into the WWAN and reach its Service Control logic.

3. Mobile Controlled Hard Handoff.

In a further embodiment, the mobile unit searches for WWAN coverage when (i) the quality of service it is getting is not satisfactory, or (ii) when it receives from the Service Controller or similar communication control logic a command to hand-off to a better communication service.

The mobile then performs a search involving measurement of one or more WWANs it can detect and determines which is the best one to switch to. Preference is typically granted to its home service provider, but specific logic within the mobile client or controls from the Service Controller may modify this priority.

The mobile then drops off the WLAN that has been servicing it, if it has not already been disconnected. In a variation of the present embodiment, the mobile sends a notification before dropping off the WLAN in order to speed up the handoff process and improve system and session control.

After dropping off from the servicing WLAN the mobile unit attempts to join the WWAN selected for handoff. The Service Controller preferably determines that the mobile unit has been handed off from its previous servicing WLAN to the WWAN, identifies the corresponding sessions and allows the session or sessions to be resumed through the new connection.

Although in the preferred embodiment of this handoff method no network assistance is required, the an additional embodiment is provided which implements the handoff with network assistance. Network assistance may be provided for any of the following:

(i) identification of acceptable neighboring WWANs, i.e. provision of their communication parameters, for example to prevent attempts to log into WWANs known to be operational within the area but not acceptable due to other conditions;

(ii) information on service conditions or other availability parameters of neighboring WWANs, for example if their service in the area is known or anticipated to have problems; and (iii) information on expected availability of the servicing WLAN.

4. Network Commanded, Mobile Controlled Hard Handoff

A further embodiment relates to a network commanded handoff. Following the command, the handoff itself is controlled by the mobile unit. The method is implemented when the session control, either residing in the Service Controller or other communication control logic, determines that the servicing WLAN cannot support mobile service communication conditions. Network control may be used to determine potential availability of WWANs within the service area, but this is not essential. If such availability is determined, network control sends information regarding communication parameters of candidate WWANs to the mobile unit The mobile unit now searches for any WWANs that may support its service requirements. In the preferred embodiment of this method, the mobile unit time multiplexes its search of WWANs while still trying to maintain communication with the WLAN to provide its user with a predetermined level of service, thus minimizing the handoff service impact. When this is not feasible, a variation allows the mobile drop to drop the WLAN access and only search for WWAN service. In both embodiments the mobile may use data previously provided by the Service Controller network or engage in a blind search.

Based on the search, the mobile determines whether it is in a position to perform handoff to the WWAN, and, if so, it attempts to access the WWAN.

If the mobile does not succeed in accessing the first WWAN attempted, then it may attempt to access the next best WWAN in its search results, and so on.

After access is successfully completed, the Service Controller recognizes that this is a resumption of a previous session or sessions ensuring continuity of the session.

5. Soft Handoff

Three of the previous four embodiments described above in respect of hard handoff may also be implemented to provide soft handoff. As explained above, the term soft handoff as used herein refers to maintaining seamless continuity of communication when transitioning from the WLAN to the WWAN, with no impact whatsoever on the sessions active within the local wireless mobile including those that depend on time bounded continuity of communication. The difference is that no sessions are frozen, and therefore no degradation in service is perceived.

Soft handoff as supported by the present embodiments may be implemented, either by establishing mobile unit communication with the WWAN before dropping communication with the serving WLAN, or by joining the WWAN quickly enough upon dropping the WLAN so that there is no discontinuity in session communication. To support the latter conditions, the Service Controller may advance data to the mobile. The advanced data may be buffered to maintain service during handoff. Mobile logic may also switch to a degraded mode that requires less data, extending the time supported by the buffer for continuous service as perceived by the user of the mobile unit.

A variation of the soft handoff embodiments concerns the mobile unit being capable of joining the WWAN before dropping off the WLAN and effecting the handoff.

Soft handoff may be network controlled or mobile controlled.

a) Network Controlled Soft Handoff.

In the network controlled embodiment, the mobile unit searches per its own logic, or per instruction from the Service/Communication Control WWAN channels, to measure and determine their communication availability. Availability information is then passed on to the Service Controller or similar Communication Control logic, which, as discussed above may be centralized or distributed.

The Service Controller or similar Communication Control logic may now select the new serving WWAN based on the information provided by the mobile unit and the operational status of the WWANs. The latter may be implemented by the WWANs providing such status information to the Service Controller/Communication Logic supporting the mobile.

The Service Controller may provide parameters of the new serving WWAN to the mobile or handoff controls/indications to the selected WWAN.

In order to ensure uninterrupted communication, the mobile unit preferably establishes communication within the WWAN before disconnecting its WLAN connection. Once communication is established, the mobile drops away from the WLAN. In a variation, the mobile sends a notification before dropping off the WLAN.

b) Mobile Controlled Soft Handoff.

In the mobile controlled implementation, the mobile unit searches for channels of active WWANs when (i) there are indications that the quality of service may become not satisfactory, or (ii) it receives a command to hand-off to a WWAN. The latter may occur when the Service Controller receives advanced indications that the WLAN service is to be dropped.

The mobile then preferably performs a search involving measurement of all applicable wireless networks that it is currently able to receive and determines which is the best one to switch to. The criteria to determine which is the best WWAN to switch to may include measured communication characteristics as well as network loading, if broadcast or available from the Service Controller.

The mobile then notifies the Service Controller/Communication Logic which WWAN it has selected for the handoff and waits either for an acknowledgment or a time out to expire (minimum timeout may be zero), upon which it establishes communication with the WWAN without disconnecting from the WLAN. After communication is established, the mobile drops off the WLAN that has been servicing it. In a variation, the mobile sends a notification before dropping off the WLAN.

The handoff reverse process, from the WWAN to the WLAN, is similar. However, as mentioned above, in this case handoff is not necessarily triggered by drop in quality of service from the WWAN. The following distinctions are made:

The mobile is required to check periodically, per its defined logic, for availability of a WLAN. This is due to the partial WLAN coverage within the WWAN service area. Alternatively, a Hot Spot itself may include the means to detect local mobile transmission, automatically leading to the issuance of commands to the mobile unit to look for the WLAN.

Handoff from the WWAN to the WLAN seldom requires loss of WWAN communication. However the handoff techniques discussed cover the cases where the mobile joins the WLAN and establishes communication through the WLAN with its Service Controller before disconnecting the WWAN (the ultimate soft handoff) as well as the case where the mobile loses WWAN connection and only some time later succeeds in establishing communication with the WLAN and re-establishing its sessions.

Embodiments are included in which handoff between WLAN and WWAN requires additional supportive actions beyond establishment of regular communication protocols of the medium to which the mobile unit is handed off. An example of these supportive actions may be a WWAN registration or a different security process, since the acceptance of the mobile by the WWAN may depend on authentication and security that cannot be transferred from the WLAN communication processes.

Handoff Between Wireless Wide Area Network and Internet

The concept of handoff is expanded to cases where a WWAN-equipped mobile, e.g. a GPRS unit, may at some time access the WWAN Service Controller as well as WWAN services through the Internet or other wireline network.

The embodiments include simultaneous connection to both WWAN and Internet networks as well as to the case where one connection is made after another one has been dropped.

For the above embodiments, variations may use all of the previous handoff methods.

Furthermore, logic installed within the mobile client or within the Service/Communication Controller may provide priority of connectivity when both WWAN and Internet links are available. In the preferred embodiment, the Internet connection is preferred and the WWAN traffic is in this case tunneled to the Service/Controller through the Internet.

The handoff techniques suitable for switching between the two networks include the following:

1. Brute Force Switching of Network Communication with Continuity at the Session Level.

When the mobile or the Service Controller detects that service is available within a higher priority network, e.g. the Internet in the above-mentioned preferred embodiment, the mobile drops the communication through the lower priority network. Then the mobile attempts to join the other network and connect with the Service Controller. Once communication is re-established, the Service Controller logic identifies that there is one or more pending sessions with the mobile unit and the session or sessions are automatically continued.

2. Hard Network Controlled Handoff with No Mobile Assistance

In the embodiment, the mobile unit establishes communication through both networks without taking control over session routing. The Service Controller may control a drop in service level through the lower priority network, thereby forcing the mobile to try and establish service through the higher priority network. The Service Controller then notifies the mobile of its decision, and a number of variations are possible for what follows.

The decision to hand off the mobile from one network to another is thus only dependent on the Service Controller.

The mobile is handed off from one network connection to the other in one of two ways:
  a) If the mobile is capable of accepting network selection controls from its Service/Communication Controller, it may be commanded to hand off to the selected (receiving) network. It may additionally be sent communication parameters to speed up the hand off process;
  b) If the mobile is not capable of accepting wireless network selection controls, it is simply dropped off the servicing network by refusing service; forcing it to try and log onto the other network.

3. Mobile Assisted Hard Network Controlled Handoff

In this implementation, the local wireless mobile searches for alternative service possibilities and determines communication conditions within the alternate network. It then sends the information gathered to the Service/Communication Controller (SCC) 128 or 140.

The mobile unit searches for the alternate network when any one of the following conditions are met:
  a) The mobile unit is programmed to perform the search at regular intervals. The search interval may be pre-programmed or controlled through commands from the SCC 128.
  b) A hardware indication is provided to signal that an alternate service may be available. One example may be a hardware identification of 100BaseT availability.
  c) The mobile is commanded by the SCC 128 to search for an alternate network. This may typically occur when an external service determines that there is a possibility of such availability per information provided by the mobile The mobile is handed off from its previous servicing network to the selected network in one of two ways:
  a) If the mobile is capable of accepting SCC controls, it is commanded to hand off to the selected network, including if possible transfer of the communication parameters to speed up the hand off process;
  b) If the mobile is not capable of accepting wireless network selection controls, it is dropped off the servicing network by discontinuing service. In such a case the mobile tries to connect through the other network until it reaches the SCC and sessions are re-established.

4. Mobile Controlled Hard Handoff.

In mobile controlled hard handoff, the mobile searches for an alternate network connection when
  (i) it detects availability of a higher priority network,
  (ii) the quality of service it is getting is not satisfactory, or
  (iii) when it receives a command to hand-off to another network of the types defined above.

The mobile unit performs the search and obtains measurements of alternate network availability, from which it determines handoff priority. In one example of this measurement, the mobile may ping a defined IP and measure the delay in response.

The mobile then drops off the network that has been servicing it and connects through the selected alternate network.

In a variation, the mobile sends a notification before dropping off its present servicing network in order to speed up the handoff process.

When the mobile attempts to join the network it has selected for handoff, the system determines that the mobile has been handed off from its previous servicing network to the new one and wishes to resume its existing session or sessions, which it is able to identify.

Although in the preferred embodiment of this handoff method no network assistance is required, a variant is included which carries out this handoff with network assistance. Network assistance may be provided for any of the following:

(i) identification of potentially available networks or network parameters, including preferred access channels for the WWAN and proxy IP's for Internet access that may support a better distributed SCC architecture.

(ii) information on loading conditions or other availability parameters of various access networks or points of entry (e.g. different phone numbers for Internet access); and (iii) information on expected loading conditions of the servicing network (e.g. for some Intranet connections)

5. Network Commanded, Mobile Controlled Hard Handoff

Network commanded mobile controlled hard handoff is implemented when the SCC 128 or 140 either finds communication conditions unacceptable or has logic that requires periodic checks for higher priority connectivity. Network control may or may not determine potential alternate networks that have the capability to support service. If such capability is determined, the SCC 128 sends information on the communication parameters of available networks or network accesses to the mobile unit.

The mobile then searches for networks that may support its service requirements. In the preferred embodiment of this method, the mobile searches for alternate networks without disrupting its present connection, thus minimizing the handoff service impact. An example would be to dial several Internet access numbers to determine availability before dropping off a wireless GPRS connection. When this is not feasible, an option provides that the mobile first drops its servicing network access and only then searches for alternate networks. In both embodiments the mobile may use data previously provided by the network or engage in a blind search.

Based on this search, the mobile determines which network to hand off to and attempts to access this network.

If the mobile does not succeed in accessing the selected network, then it may attempt to access the next best network according to its search results, and so on. Such initial and subsequent access attempts are preferably controlled by programmable or pre-programmed timers.

After access is successfully completed and connection with the SCC 128, 140 has been re-established, the SCC recognizes that the new connection is a resumption of a previous session or sessions, preferably in one of the ways hereinbefore described, thereby ensuring continuity of the session.

6. Soft Handoff

Four of the previous five methods described above with hard handoff may also be implemented using soft handoff. As mentioned above, the term "soft handoff" as used herein refers to maintaining seamless continuity of communication when transitioning from one network access to another, with no impact whatsoever on the sessions active within the local wireless mobile including those that depend on time bounded continuity of communication.

Soft handoff as supported by the present embodiments may be implemented by establishing mobile communication with the SCC 128, 140 through a new serving network before dropping it from the presently serving network. Alternatively, soft handoff may be achieved by switching network connection fast enough so there is no discontinuity in session communication.

Several methods are discussed below to implement soft handoff:

a) Mobile Assisted Soft Network Controlled Handoff

In a first soft handoff embodiment, the local wireless mobile searches for the alternate network and determines communication conditions. It then sends availability information to the SCC 128, 140.

The SCC subsequently makes the decision as to which network, and when, to perform the handoff. It provides the handoff parameters to the mobile; and optionally may provide handoff controls to a proxy IP node or to control entities within the WWAN. The latter may be required if there is advanced data suggesting that the connection is about to be lost, either due to identification of a deterioration in conditions or there is information that one of the entities supporting the communication is about to be taken down, thereby to ensure continuous communication. Thus, in order to ensure uninterrupted communication, the mobile preferably now establishes communication within the new serving network without disconnecting its current network communication. Once communication with the new network is established all the way to the SCC 128, 140, the mobile drops off the network that has been servicing it. In a variation, the mobile sends a notification before dropping off this network.

b) Mobile Controlled Soft Handoff.

In a second soft handoff embodiment, this time controlled by the mobile unit, the mobile searches additional channels when (i) a higher priority network condition is detected;
(ii) the quality of service it is getting is not satisfactory, or
(iii) when it receives a command to hand-off to an alternate network.

The mobile unit itself performs a search in the course of which it carries out measurements of alternate networks per pre-defined or programmable priorities and rates them per determined priority to select a preferred network to switch to. In a variant, the mobile need not search all possible alternate networks, but only the top n out of m available networks. In a specific embodiment, m=1. The criteria to determine the best network to switch to may include measured communication characteristics as well as network loading.

The mobile unit notifies the SCC as to which network has been selected for the handoff and waits either for an acknowledgment or a time out to expire, upon which it establishes communication with the new network without disconnecting from the present serving network. After communication is established, the mobile drops off the network that has been servicing it. In a variant, the mobile sends a notification before dropping off its current serving network.

c) Network Commanded, Mobile Controlled Soft Handoff

A further embodiment comprises a soft handoff that is network commanded but subsequently mobile controlled. The handoff is carried out when the SCC determines that the servicing network cannot support the mobile service communication conditions. The SCC may or may not identify potential alternate networks that currently have the capability to support communication service to the mobile. If such capability is identified, the SCC then sends information on the communication parameters of the thus identified networks to the mobile unit.

Once the mobile is in possession of the access data for potential alternate networks, the process continues as in the previous embodiment of mobile controlled soft handoff.

Summary of Handoff

All the embodiments described above provide functionality that is presently not available within wireless local area networks.

The soft handoff solutions have the potential to provide smoother continuous service, however since all solutions are packet based at the mobile end, continuous service may be attained with both soft and hard handoff embodiments.

Mixed Network Authentication

Mobile communication provides a high degree of personalization. For example, GSM phones provide a SIM card which provides each user with personalized communication associated with his/her account with his/her mobile telephone service provider. CDMA based mobile also entails similar personalization. In accordance with the embodiments of the present invention, a user is enabled to set up a transaction over any unsecured or secured means at his disposal, following which the transaction is confirmed or authorized via his/her mobile telephone. Authorization may for example be via an SMS message sent to his mobile telephone to which he sends a simple reply. Alternatively, the user may send an SMS message from his own mobile telephone to a number indicated to him. The transaction may then be charged to the mobile telephone account. The advantage of charging to a mobile telephone account is that, unlike credit card and like other accounts, the telephone account is uniquely set up for charging small amounts at a time. The embodiments thus provide a means of providing low cost products and services on the Internet, previously made difficult because of minimum charges by credit card companies.

The embodiment can also be used to provide binding between a non-authenticatable and an authenticatable device. Once the non-authenticatable device has been authorized, secret authentication data can be installed in it. This authentication data may be further used to prove the linkage between the non-authenticatable device, and the PLMN authenticatable device. This method can be used to initialize a virtual SIM (see above)

Figure 27:
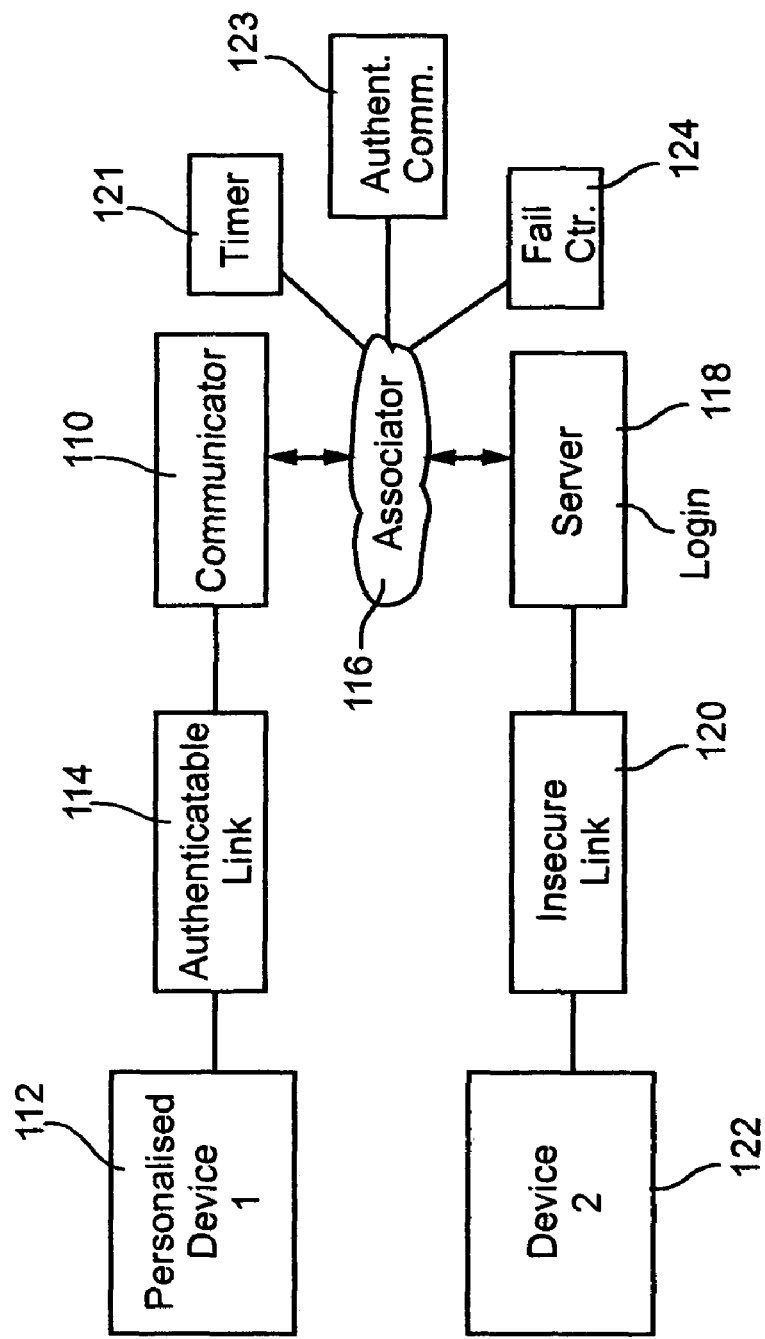
FIG. 27 is a simplified block diagram showing an authentication mechanism according to a further preferred embodiment of the present invention.

Reference is now made to FIG. 27, which is a simplified block diagram showing an authentication mechanism according to a first preferred embodiment of the present invention. In FIG. 27, there is shown a communicator 110, typically part of a cellular Internet portal including an SMS portal. Optionally this Internet portal may include a WAP portal, in addition to or instead of the SMS portal. The communicator is able to communicate with a first personalized device 112 via an authenticatable link 114 such as a GSM or CDMA link as well as any extension thereof (GPRS, UMTS, etc.). GSM etc, links provide not only authentication but also encryption, which is preferred but is not a requirement of the present invention. A basic embodiment requires only authentication and non-repudiation of the transmission. Generally, the communication is a digital communication such as an SMS or GPRS data message, although, as will be explained below, voice can also be used.

The communication preferably takes advantage of user authentication, which is a feature of GSM or CDMA. Additional authentication can be provided by a link 114 and the device 112, additionally supporting encryption. The personalization preferably enables the first personalized device to be positively identified. In addition there is provided an associator 116, which is able to carry out the positive identification of the first personalized device 112 and to associate the authentication with a separate activity or request for activity received by a server 118 or like device through an non-authenticatable link 120 from a requesting device 122. In the present context, a non-authenticatable link is a link through which users or requesting devices cannot be positively identified, and particularly includes general Internet connections. The inability to identify the requesting device may be due to there being no strong authentication mechanism such a SIM card, or because the link itself is insecure, allowing eavesdropping and impersonation or for any other reason.

The mechanism of FIG. 27 thus solves the problem of the insecure link by requiring an extra leg of communication via an authenticable link. Generally, mobile telephone devices are authenticatable personalized devices, and by requiring an extra leg of the communication via a mobile telephone link, a provider can determine that a request is genuine. In addition, the mobile telephone is associated with a charging account, and provision is made to allow for billing to be directed to the customer thus identified. As will be explained below, the authenticatable link leg of the communication may precede or follow the non-authenticatable leg, as long as the two legs can be successfully associated, and a non-exhaustive list of alternative procedures is described hereinbelow. In addition several non-authenticatable legs can be associated with a single authenticatable leg. Of course, the invention is not limited to mobile telephones and any securely personalized device that communicates over a secure link such that it cannot be impersonated may be used.

The associator 116 is preferably connected to an authentication communicator 123 for indicating to the server 118 that a given activity request is approved. Alternatively, the authentication communicator 123 may communicate the authentication to an external proxy server or gateway associated with the non-authenticatable device. As a further alternative, the authentication communicator may communicate the authentication to any device or network node responsible for managing the activity which is the subject of the request. In a further embodiment, the authentication communicator 123 may communicate the authentication by applying a change to a routing table on a router.

In addition to GSM and CDMA, a non-exhaustive list of other systems currently available that provide secure links includes IS-136, PDC, EDGE, WCDMA, GPRS, Iridium, and GlobalStar. The term CDMA covers the IS-95 standard and the 2.5 and 3G versions thereof are known respectively as 1XRTT and 3XRTT.

Figure 28:
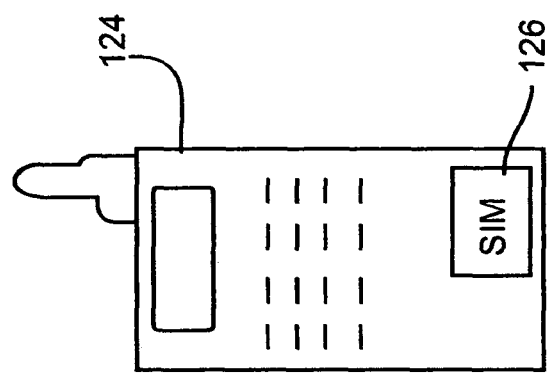
FIG. 28 is a simplified pictorial diagram showing a device for use in the secure link of FIG. 27.

Reference is now made to FIG. 28, which is a simplified diagram showing a GSM device 124 such as a mobile telephone. The GSM device comprises a SIM which consists of one or more integrated circuits where at least one of those contains personalized data that supports authentication, encryption and decryption for the secure link 114. The SIM both identifies the mobile telephone and makes it impossible for other devices to impersonate that telephone, thus providing authentication and secure access to a charge account corresponding to the respective mobile telephone user.

Although in the above, the assumption has been that the messaging itself is data messaging, the invention is in no way limited thereto. The secure link 114 is also secure for voice communication and it is possible to provide automatic voice message construction functionality at the communicator 110 to construct messages from pre-recorded message sections. Additionally it is possible to provide an artificial voice. Either way a voice message may be sent to the personalized device over the secure link. The voice message may for example identify the transaction and may request that the user presses one of the keys by way of an affirmative reply.

In a particularly preferred embodiment of the present invention, a device corresponding to a potential user of a service requests the service via the insecure link 120. The insecure link 120 may be any kind of network, particularly an open network such as the Internet, or other digital or analogue networks, and may include a LAN, a Wireless LAN (WLAN), in particular any WLAN corresponding to the IEEE 802.11 standards, including 802.11, 802.11b, 802.11a . . . g, etc.

During the log-in process it identifies its secure link, for example by giving an associated mobile telephone number. The identification may be retrieved from storage or entered manually by the user. The associator 116 receives the identification (e.g. mobile telephone number). It may need to translate the received identification into a different identification appropriate to the communicator 110, and the translation may be carried out by the associator 116 itself or through external translation services, for example by accessing a home location register (HLR). The associator 116 then uses the communicator 10 to contact the mobile telephone in any appropriate way. A timer 123 is operated, giving the owner of the mobile telephone a fixed time to reply and confirm the identity of the user. Additionally or alternatively, a failure counter 124 counts unsuccessful attempts to establish the authentication, stopping the authentication operation when a predetermined threshold is reached.

In an alternative embodiment the operation is initiated both at the non-authenticatable device 122, which makes contact with the server 18 and at the personalized device 112, which makes contact with the communicator 110. The associator 116 makes a link between the two communications, and the service to the non-authenticatable device is authorized. One way of assuring that the authorization by the user was not inadvertent is to provide a password in the reply to the authenticatable device 112. The password is then entered by the user at the non-authenticatable device 122, thus making clear that the user of the non-authenticatable device 122 is the same as the user of the authenticatable device and that this action is intentional. If such a password embodiment is used, the authenticating link is preferably encrypted, so as not to reveal the password. Alternatively the password may only be used a limited number of times, for example only once, in which case the authenticating link need not be encrypted.

As will be explained below, since the log-on name used by the non-authenticatable device is the MSISDN, that is to say the mobile telephone number, it is possible for fraudulent users to probe different MSISDN values. Such probes may cause the mobile phone to receive a request for service and, if the user is not vigilant, the user could inadvertently authorize service for these fraudulent users. The problem may be reduced by requiring the non-secure device to use a password, in addition to the MSISDN. An alternative solution starts the authentication sequence from the Mobile Unit: The user sends an SMS to the communicator, which in turn responds to the mobile with a temporary password for the session. The user uses the PDA or other non-authenticatable device to connect, via the Internet, to the server 118, and enters his user name (MSISDN) and the temporary password. Alternatively, the communicator provides a temporary identifier and password pair, to ensure user anonymity and the user enters this temporary identifier and password pair.

Transfer of the identifiers from the authenticatable device to the non-authenticatable device may be manual or through some local wired or wireless communication link.

The associator or communicator recognize the access data provided, such as the temporary password and identity, as associated with the MSISDN and service is authorized.

Preferably, in such an embodiment, SMS transmissions are completed prior to the logon sequence of the mobile terminal (PDA, laptop, etc.) being started.

As a further alternative to the above, the SMS may comprise a quasi-random number, which the user is required to copy or that is otherwise transferred into his non-authenticatable device to complete the authentication, thereby reducing the risk of inadvertent authentication. The requested activity may be an Internet browsing activity. Use of the secure link, which is associated with a charging account, allows for small amounts to be charged, hitherto a problem with Internet browsing which has tended to rely on credit cards. The requested activity may be the browsing itself, or it may include activities associated with browsing such as purchasing, using pay services, etc. Thus the user may arrive at an Internet bookstore or the like and make a purchase by entering his mobile telephone number rather than his credit card number. He then receives a message on his mobile telephone and replies to that message to complete the transaction. The Internet activity may additionally be ftp type activity or an activity that does not involve browsing, such as streaming data based applications, email, etc.

Figure 29:
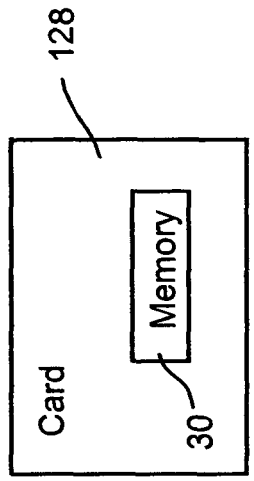
FIG. 29 is a simplified pictorial diagram showing a device for use in the insecure link of FIG. 27.

In an alternative embodiment, the non-authenticatable device 122 may be a credit card or a smart card and the requested activity may be a point of sale activity such as use of an ATM. In this connection, reference is made to FIG. 29, which is a simplified diagram showing a card 128, such as a smart card or credit card, with a memory unit 130. The memory unit 130 may be part of an integrated circuit as with a smart card, or it may be a magnetic strip as with a conventional credit card. Preferably, the memory unit 130 comprises the standard transaction information such as an ATM number, and in addition a further number that allows for identification of the mobile telephone number. In one embodiment, the number encoded on the card is the mobile telephone number, however this has the disadvantage that a false telephone number could be entered. In another embodiment the further number is an encoded version of the mobile telephone number. The encoded version could be an enciphered version, in which a function is available to decipher the telephone number. Alternatively, a code could be used, which is simply an entry in a lookup table. The latter version is particularly secure since a hacker can only substitute a different telephone number if he knows its code in the lookup table. The user enters his card into the ATM in the normal way. The card transfers the user's telephone number, or a code related to it, which is used to generate a call to the user's mobile telephone. The user completes the transaction by replying to the mobile telephone or by entering into the ATM a uniquely generated PIN number provided in the communication. In a preferred embodiment, the user both replies and enters the PIN number.

The requested activity may for example be access to a network, that is to say the user requests access to a LAN or to the Internet or the like. It thus enables the provision of roaming Internet, the ability to log on to the Internet using local resources when traveling and not in the proximity of one's own Internet provider.

In particular, the network to which access may be requested may be a network accessed via Wireless LAN access points or infra-red access points or via Bluetooth access points. The idea of Wireless LAN or infra-red or Bluetooth is to provide flexible network access to all devices in proximity of the access points and the present embodiments allow for potential users to be identified and charged for the service.

As a further alternative, after the user has transferred the quasi-random number or the password to his non-authenticatable device, the number or the password can be used multiple times to authorize an activity. Since multiple transmissions of the number or password are exposed to replay attacks, the multiple authorization can use the quasi-number/password as a seed key to a challenge-response protocol. For example—if a virtual SIM is installed in the non-authenticable device, then Ki of the virtual SIM (see above in the SIM description) can be set to be the quasi-number/password (Ki is used in the generation of SRES and Kc from RAND).

Another alternative, that has a higher security level, is to use the above quasi-number/password to authenticate the establishment of a secure channel (by IPsec, TLS, SSL, SSH etc.). The key Ki may be transferred between the associator and the non-authenticatable device, and may then be used as the seed for the challenge-response execution.

As discussed above, the communicator preferably obtains a telephone number, in either plaintext, or as an encoded or enciphered version of the telephone number from the non-authenticatable device. The number is preferably used for establishing a communication with the secure mobile device. However, in those embodiments in which communication is initiated from the secure mobile device, the telephone number is preferably used to associate the secured and non-authenticatable links that have already been established.

In accordance with the above, the non-authenticatable device may be a credit card, a smart card, an infra-red device, a Bluetooth device, a PDA, a wearable computer, a mobile computer, a fixed computer, and a network of computers or any other device that is able to establish a communication using infra-red or Bluetooth or Wireless LAN or HomeRF or wired or any other type of communication.

Figure 30:
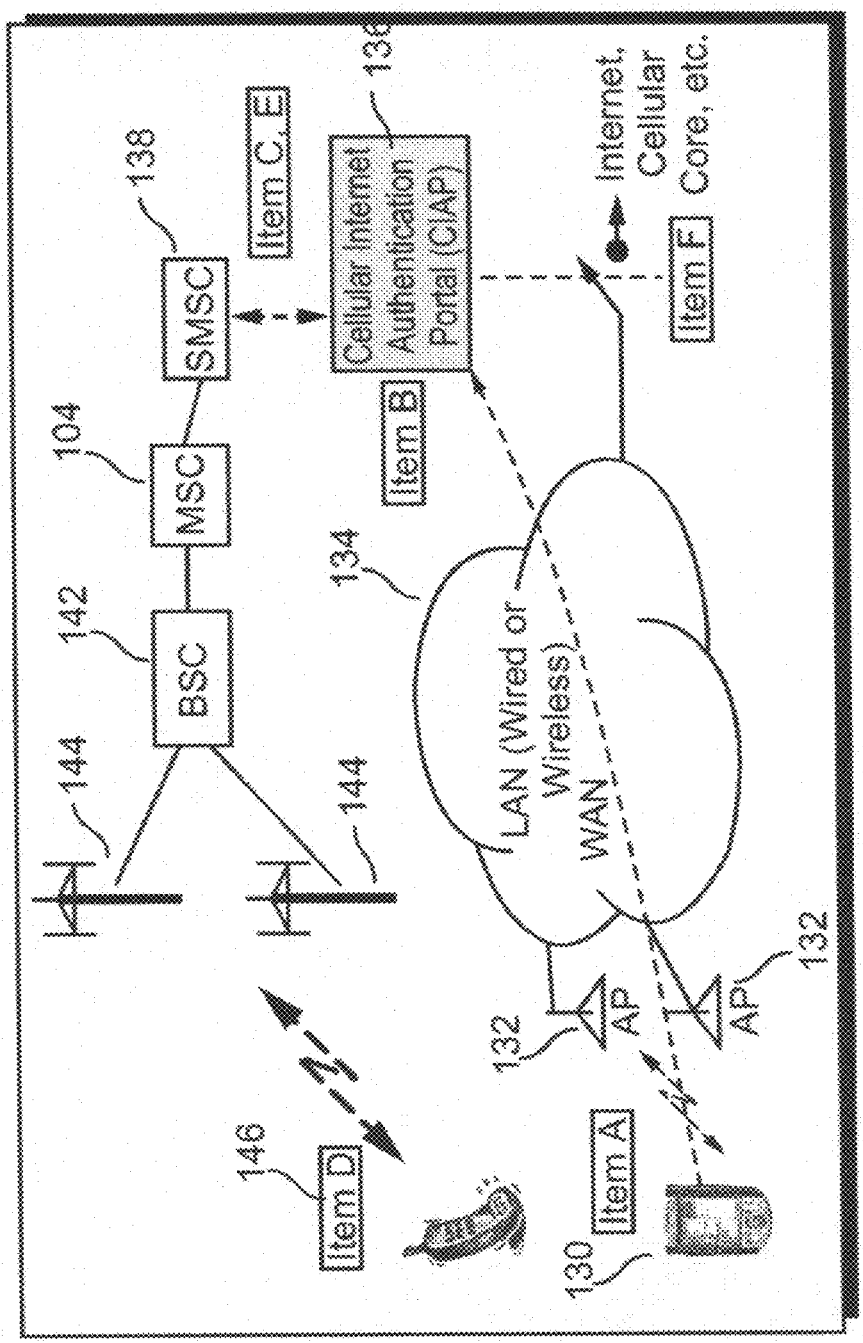
FIG. 30 is a simplified block diagram showing another embodiment of an authentication mechanism according to the present invention, specifically for allowing controlled access to a wired or wireless LAN.

Reference is now made to FIG. 30 which is a simplified block diagram showing a further embodiment of verification apparatus according to the invention, with component parts shown in greater detail. A non-authenticatable device such as a PDA 130 communicates wirelessly via network access points 132, to a LAN/WAN 134, which itself may be wired or wireless. The LAN may be connected directly (or indirectly) to a cellular Internet authentication portal 136, and may be a means of providing the user with access to the Internet or any other data network or services. The portal 136 preferably appears to the PDA 130 as a standard Internet authentication device to which it logs in as normal. The login process can be carried out manually or can be automated as desired. The number of the user's mobile telephone may be supplied as the login username or as a separate part of the login procedure. The portal begins to run a timer to timeout the authentication after a predetermined time limit. Optionally the portal may also set up a counter to limit the number of login attempts to reduce the risk of hacking. The portal is connected directly or indirectly to a short message service center SMS-C 138, the network element that manages SMS messaging. The SMS-C 138 sends an SMS message via MSC 140, BSC 142 and cellular base stations 144 to SIM protected mobile telephone 146. The user thus receives a request telling him to press reply in order to activate his network connection. In a further enhancement, the user may be asked to provide a password. The SMS itself is usually encrypted and the SIM supports authentication to make it clear that it is only the intended mobile telephone that is replying. The mobile telephone replies to the SMS. All SMS messages have an address of origin, which is usually not passed on in Internet-based SMS. In order to enable a reply, the SMS message as sent may be provided with a telephone number of the authenticator to allow a reply to reach the authenticator. The user is then authorized to access the Internet or other data network via the LAN and his use of the LAN may then be charged to his mobile telephone.

Figure 31:
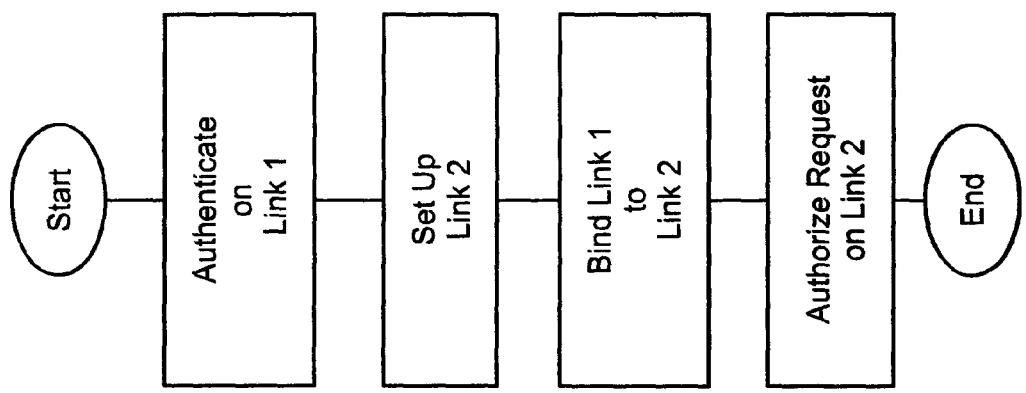
FIG. 31 is a simplified flow chart showing operation of the authentication mechanism of FIG. 27, where the setup may start from any device, secure or unsecured, including setup from a different device.

Reference is now made to FIG. 31, which is a simplified flow chart showing verification of a non-authenticatable channel via an authenticatable channel according to an embodiment of the present invention. In FIG. 31, authenticating the link comprises steps of communicating via an authenticatable link with an authenticatable device, verifying, using the authentication procedures of the link, that the communication is with an intended mobile device, setting up a second link via a non-authenticable second channel or link. A stage follows of binding or associating the verification with an activity request via a non-authenticatable device. Once the two channels or links have been bound then the authentication on the one link may be used to allow the request on the other link, as explained above, thereby to permit the activity request of the non-authenticatable device. The step of binding may be carried out by use of an identifying telephone number provided by the non-authenticatable device. The step of authenticating preferably includes sending a message to the authenticatable mobile device, to which a reply is expected as explained above.

As discussed above, it is not crucial to the invention which of the two links is made first or whether they are made simultaneously. Each possibility provides a legitimate embodiment of the invention with attendant advantages and disadvantages.

In one version, communication starts with the non-authenticable device. The system sends a message to the related authenticatable device requesting approval. The device user sends back his approval and either the authentication is completed at that point or the system sends a password to the authenticatable device. The user receives the password and enters or copies or otherwise transfers the password to the non-authenticatable device, thus to complete the authentication.

In another version, a communication request originates from the authenticatable device. The system sends a password or temporary username and password to the authenticable device. The password, or username and password, is copied or transferred to the non-authenticatable device, and the non-authenticable device relays the password etc. back to the system to establish the authentication.

The above procedures are only used on initial communication establishment, or in a particularly preferred embodiment only on an initiating communication. Thereafter, a secure communication channel is established between the system and the non-authenticatable device using additional identity/identities provided to access the system the next time(s). During future accesses, the system adds additional identities/passwords, with optional notification to the authenticatable device. Such a preferred embodiment saves the delay needed to set up the authenticable channel with the authenticatable device, after the first communication.

In the preferred embodiment, the authentication method does not require any special hardware or software to be installed on the PDA 130. The PDA works with a standard browser and standard network interface units.

In an alternative embodiment, software is installed to support the defined processes and assist in or save manual user actions such as entry of addresses and transfer of data between the authenticatable and non-authenticatable units.

The subscriber does not need to learn any new numbers or passwords, and the mobile phone number (MSISDN) may be provided as a user name.

The mobile terminal 46 is a standard authenticable unit. The terminal may be voice only, SMS only, WAP only, GPRS only, 3G only, any other data communication standard or a combination.

Authorization for the requested service requires possession of the user specific SIM or USIM or similar device., thus binding the service to the SIM or USIM or similar device.

The service need not be provided with any special provisioning database. The user identification is the MSISDN or similar identifier (such as IMSI). No new passwords are required to be provided for or memorized by the user. However, an alternative embodiment requires provision of data bases, for example when used with a RADIUS Server. A RADIUS server is a server used to authenticate users who access a communication system, which authentication is based on the RADIUS or remote authentication dial-in user server protocol.

A single network server 122 may be used to support many carriers.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

There is thus provided an authentication system which comprises the use of a mobile telephone secure channel to securely transfer an authorization code that may be used to authorize some other service.

SUMMARY OF EMBODIMENTS

In the above there are provided a series of embodiments that between them provide for a seamless interface between the cellular or PLMN environment and the wireless LAN environment. The interface allows cellular enabled units able to move from one environment to the other without the user being aware of it, so as to take advantage of the higher data rates and local resources of the wireless LAN when available. Non-cellular enabled units are enabled to connect to the wireless LAN and to have access to the cellular environment via the LAN.

Features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A simulated SIM gateway (SSG) that interfaces between a public land mobile network (PLMN) network and a non-PLMN network, wherein the PLMN network is configured to recognize cellular base stations as nodes of the PLMN network through which the PLMN network can mediate connections to cellular mobile devices, wherein the non-PLMN networks each comprises a plurality of access points for mediating connections to a plurality of non-PLMN network compatible mobile devices (NCMDs), wherein the plurality of NCMDs are not cellular devices, the SSG comprising:
a memory
a PLMN server that from the perspective of the PLMN network, operates as a base station of a cellular network;
an authentication database comprising authentication information of the plurality of NCMDs users and, per each NCMD, the authentication database stores an associated authentication token for PLMN identities of the user of the NCMD as a subscriber of the PLMN; and
an access server that is communicatively coupled via a secured communication with the plurality of NCMDs through the non-PLMN network, wherein each of the plurality of NCMDs request access to the PLMN network, and per each requesting NCMD, the access server identifies the requesting user of the NCMD, retrieves from the authentication database an associated authentication token for the identified requesting user, and transfers the authentication token with the received request to the PLMN server; and
wherein the PLMN server processes the received request and the associated authentication token and transfers to the PLMN network the processed request and the associated authentication token as a request received from a cellular device of that user,
wherein the associated authentication token identifies the requesting user as the subscriber of the PLMN.

2. The SSG of claim 1, further comprising a circuit-switched interface for telephony and a packet interface for data and control.

3. The SSG of claim 2, wherein the PLMN network is a GSM network having an A interface and a Gb interface and wherein the circuit-switched interface is operable to use the A interface and the packet interface is operable to use the Gb interface.

4. The SSG of claim 2, wherein the PLMN network is a UMTS network having an IuCS interface and an IuPS interface and wherein the circuit switch interface is operable to use the IuCS interface and the packet interface is operable to use the IuPS interface.

5. The SSG of claim 1, wherein the PLMN server, after determining that a connecting device has been authenticated by the access server, responds to a PLMN network authentication query by indicating that the authentication has been successful.

6. The SSG of claim 1, wherein the associated authentication token simulates a SIM and the PLMN network is a GSM network.

7. The SSG of claim 1, wherein the associated authentication token simulates an ESN gateway and the PLMN network is a CDMA network.

8. The SSG of claim 5, wherein the secured communication of the access server with the plurality of NCMDs is based on a security layer selected from a group comprising SSL, Ipsec, TLS, SRP, and SSH, and wherein authentication of each one of the plurality of NCMDs is required to permit the PLMN server to provide the authentication response to the PLMN network.

9. The SSG of claim 8, wherein the security layer is configurable to set a desired security level.

10. The SSG of claim 1, further comprising a vocoder for receiving voice signals from the non-PLMN network for vocoding, and receiving vocoded voice signals from the PLMN network for decoding.

11. The SSG of claim 1, further comprising a vocoder for receiving partly vocoded signals from the non-PLMN network for vocoding, and receiving vocoded voice signals from the PLMN network for part decoding.

12. The SSG of claim 1, wherein the PLMN server operates as both a serving GPRS support node (SGSN) for packet data and as a base station for circuit switched data from the perspective of the PLMN network.

13. The SSG of claim 12, wherein the access server authenticates the requesting NCMD connected to the non-PLMN network.

14. The SSG of claim 13, wherein the access server further registers the requesting NCMD connecting to the non-PLMN network.

15. The interface of claim 12, wherein the access server further updates the location of the requesting NCMD connecting to the non-PLMN network.

16. The SSG of claim 12, wherein the PLMN server supports the requesting NCMD to generate service requests from the PLMN network.

17. The SSG of claim 1, wherein the PLMN server further provides the PLMN network with connection control data formatted for the PLMN network to be able to integrate corresponding activity of the requesting NCMD into a consolidated bill.

18. The SSG of claim 12, wherein the PLMN server further operates together with the access server, thereby to obtain from the non-PLMN network details of connecting parties and quantity of data exchanged.

19. The SSG of claim 18, wherein the PLMN server further formats the obtained details into the PLMN compatible format.

20. The SSG of claim 1, wherein, the base station is a base station controller.

* * * * *